United States Patent [19]
Fogel

[11] Patent Number: 5,241,608
[45] Date of Patent: Aug. 31, 1993

[54] METHOD FOR ESTIMATING VELOCITY VECTOR FIELDS FROM A TIME-VARYING IMAGE SEQUENCE

[75] Inventor: Sergei V. Fogel, Rochester, N.Y.
[73] Assignee: Eastman Kodak Company, Rochester, N.Y.
[21] Appl. No.: 631,750
[22] Filed: Dec. 20, 1990

Related U.S. Application Data

[63] Continuation-in-part of Ser. No. 275,859, Nov. 25, 1988, abandoned.

[51] Int. Cl.$^5$ .............................................. G06K 9/00
[52] U.S. Cl. .................................. 382/16; 358/105; 364/174; 364/565; 382/37; 382/41; 382/54
[58] Field of Search ................ 382/16, 37, 56, 54; 364/565, 570, 715.02, 421, 174; 358/105, 136

[56] References Cited

U.S. PATENT DOCUMENTS

| | | | |
|---|---|---|---|
| 4,244,026 | 1/1981 | Dickey, Jr. | 364/565 |
| 4,502,109 | 2/1985 | Delmege et al. | 364/174 |
| 4,841,444 | 6/1989 | Chittineni | 382/16 |
| 4,910,608 | 3/1990 | Whiteman et al. | 382/56 |

*Primary Examiner*—Leo H. Boudreau
*Attorney, Agent, or Firm*—Edward Dugas

[57] ABSTRACT

Changes in successive images from a time-varying image sequence of a scene are characterized by velocity vector fields. As estimate of the velocity vector field is determined as a compromise in the attempt to satisfy the following two sets of constraints in addition to a regularization constraint: the optical flow constraints which relate to the values of the time-varying images function at corresponding points of the successive image of the sequence, and the directional smoothness constraints, which relate the values of the neighboring velocity vectors. To achieve such a compromise, a system of nonlinear equations of the unknown estimate of the velocity vector field is used. A stable iterative method is used to solve this system. The optical flow and smoothness constraints are selectively suppressed in the neighborhoods of the occlusion boundaries. The last is accomplished by attaching a weight to each constraint. The spatial variations in the values of the time-varying image function near corresponding points of the successive images of the sequence, with the correspondence specified by a current estimate of the velocity vector field, and variation in the current estimate of the velocity vectors themselves are implicitly used to adjust the weighting function.

14 Claims, 17 Drawing Sheets

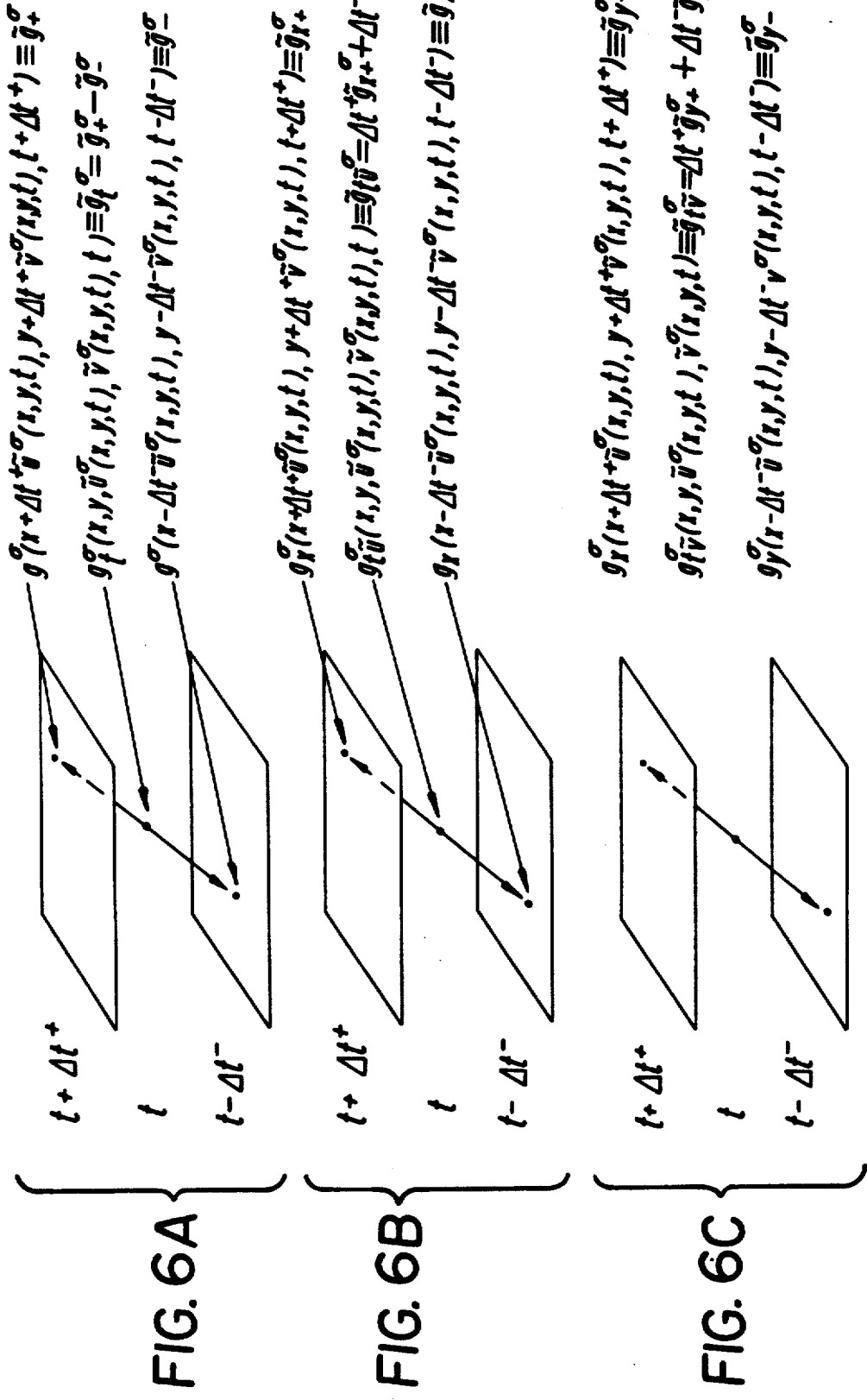

> OBTAIN THE IMPROVED ESTIMATE OF THE VELOCITY VECTOR FIELD BY AN ITERATIVE PROCESS APPLIED TO THE INITIAL ESTIMATE OF THE VELOCITY VECTOR FIELD

> OBTAIN EACH SUCCESSIVE IMPROVEMENT OF THE INITIAL ESTIMATE OF THE VELOCITY VECTOR FIELD BY ADDING AN INCREMENT OF THE VELOCITY VECTOR FIELD TO THE PRECEDING IMPROVEMENT OF THE INITIAL ESTIMATE OF THE VELOCITY VECTOR FIELD WITH THE INCREMENT BEING EQUAL TO A SCALED FACTOR OF A SOLUTION OF A SYSTEM OF LINEAR EQUATIONS

> USE A BASIC ITERATIVE METHOD TO OBTAIN THE SOLUTION OF THE SYSTEM OF LINEAR EQUATIONS

FIG. 8

> OBTAIN THE IMPROVED ESTIMATE OF THE VELOCITY VECTOR FIELD BY AN ITERATIVE PROCESS APPLIED TO THE INITIAL ESTIMATE OF THE VELOCITY VECTOR FIELD

> OBTAIN EACH SUCCESSIVE IMPROVEMENT OF THE INITIAL ESTIMATE OF THE VELOCITY VECTOR FIELD BY ADDING AN INCREMENT OF THE VELOCITY VECTOR FIELD TO THE PRECEDING IMPROVEMENT OF THE INITIAL ESTIMATE OF THE VELOCITY VECTOR FIELD WITH THE INCREMENT BEING EQUAL TO A SCALED FACTOR OF A SOLUTION OF A SYSTEM OF LINEAR EQUATIONS

> USE A CONJUGATE GRADIENT POLYNOMIAL ACCELERATION ITERATIVE METHOD TO OBTAIN THE SOLUTION OF THE SYSTEM OF LINEAR EQUATIONS

FIG. 9

```
┌─────────────────────────────────────────────┐
│ DIGITIZE A TIME-VARYING IMAGE SEQUENCE TAKEN│
│ AT A FIRST FRAME RATE                       │
└─────────────────────────────────────────────┘
                      │
                      ▼
┌─────────────────────────────────────────────┐
│ ESTIMATE A VELOCITY VECTOR FIELD FROM THE   │
│ TIME-VARYING IMAGE SEQUENCE                 │
└─────────────────────────────────────────────┘
                      │
                      ▼
┌─────────────────────────────────────────────┐
│ PREDICT FROM TWO SUCCESSIVE FRAMES OF THE   │
│ TIME-VARYING IMAGE SEQUENCE AT LEAST ONE    │
│ INTERMEDIATE FRAME FROM THE DETERMINED      │
│ ESTIMATE OF THE VELOCITY VECTOR FIELD FOR   │
│ THE TWO SUCCESSIVE FRAMES                   │
└─────────────────────────────────────────────┘
                      │
                      ▼
┌─────────────────────────────────────────────┐
│ MODIFY THE TIME-VARYING IMAGE SEQUENCE TO   │
│ INCLUDE THE INTERMEDIATE FRAME              │
└─────────────────────────────────────────────┘
```

FIG. 11

METHOD FOR ESTIMATING VELOCITY VECTOR FIELDS FROM A TIME-VARYING IMAGE SEQUENCE

This application is a continuation-in-part of U.S. patent application Ser. No. 07/275,859 filed on Nov. 25, 1988, now abandoned.

1. Technical Field of the Invention

The present invention relates to the field of image processing and, more particularly, to a method for modifying a time-varying image sequence by estimating the velocity vector field based on the analysis of at least two sequences of images of a given scene.

2. Background of the Invention

A portion of the disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

A time-varying image sequence is a sequence of images of a given scene with each successive image taken some time interval apart from the one preceding it. If the scene being imaged changes gradually with time and, if the changes are mostly due to the relative movement of the physical objects in space, then the corresponding changes in the successive images of the sequence can be characterized by velocity vector fields.

The reliable estimation of the velocity vector fields is very important for the analysis of time-varying image sequences. There are two principal approaches to the problem of estimation of the velocity vector field: the feature-based matching approach and the spatio-temporal gradient approach. In the feature-based matching approach, the image points with significant variations in the values of the time-varying image functions, called feature points, are identified in both images. The estimation of the velocity vector field is accomplished by matching the feature points of one image to the feature points of the other image. The spatio-temporal gradient approach is based on the constraint imposed on each velocity vector relating the spatial gradient of the time-varying image functions to the temporal derivative of the time-varying image function.

The spatial variations in the time-varying image function, utilized in the above approaches, do not provide sufficient information to determine the estimate of the velocity vector field. If the first approach, the velocity vectors can only be estimated on a sparse set of image points, while in the second approach, at most one constraint is imposed on two components of each velocity vector. To overcome these difficulties, it has been proposed that velocity fields should vary smoothly from point-to-point on the image plane. This requirement enables the estimation of both components of the velocity vector at each image point; however, it forces the estimate of the velocity vector field to vary smoothly across the occlusion boundaries. Several approaches have been proposed to overcome this difficulty, which are based on the selective application of a smoothness requirement.

In the present method, the estimate of the velocity vector field is determined as a compromise in the attempt to satisfy the following two sets of constraints in addition to the regularization constraints; the optical flow constraints, which relate the values of the time-varying image function at corresponding points of the successive image of the sequence, and the directional smoothness constraints, which relate the values of the neighboring velocity vectors.

These constraints are selectively suppressed in the neighborhoods of the occlusion boundaries. The last in accomplished by attaching a weight to each constraint. The spatial variations in the values of the time-varying image function near corresponding points of the successive images of the sequence, with the correspondence specified by a current estimate of the velocity vector field, and variations in the current estimate of the velocity vectors themselves are implicitly used to adjust the weight functions.

SUMMARY OF THE INVENTION

The present invention provides a method for modifying a time-varying image sequence comprising the steps of estimating a velocity vector field from a time-varying image sequence and modifying the image based on the estimate of the velocity vector field. The step of estimating includes forming a matrix of image irradiance function values for each image of a time-varying image sequence, forming a multilevel resolution pyramid for each image of a time-varying image sequence by correlating on each level the matrix of image irradiance function values with a matrix of weights obtained by sampling a measurement function corresponding to that level, and then by sampling on each level the function resulting from the correlation at specific image locations, defining these specific image locations of each coarser level of the resolution pyramid by subsampling the specific image locations of the preceding finer level, selecting an initial estimate of the velocity vector field for the coarsest level of said multilevel pyramid and determining an improved estimate of the velocity vector field based on the initial estimate of the velocity vector, projecting the improved estimate of the velocity vector field from the coarsest level of said multilevel pyramid to the next finer level of said multilevel resolution pyramid to obtain the initial estimate for that level and determining the improved estimate of the velocity vector of this level based on the initial estimate of the velocity vector, continuing the projection and determining step for each of the remaining levels of the multilevel resolution pyramid, and utilizing the improved estimate of the velocity vector field from the finest level of said multilevel resolution pyramid as the determined estimate of the velocity vector field. After this, the determined estimate is applied to modify at least one image of the time-varying image sequence.

Another embodiment of the present invention provides a method for converting a time-varying image sequence from a first frame rate to a second frame rate. The method comprises digitizing a time-varying image sequence taken at a first frame rate and estimating a velocity vector field from the time-varying image sequence as done in the first embodiment described above. The determined estimate of the velocity vector field for two successive frames is then used to predict at least one intermediate frame field for the two successive frames. The time-varying image sequence is then modified to include this predicted intermediate frame.

Another embodiment of the present invention provides a method for converting a time-varying image sequence from a first frame rate to a second frame rate.

The method comprises digitizing a time-varying image sequence taken at a first frame rate and estimating a velocity vector field from the time-varying image sequence as done in the first embodiment described above. Frames of the time-varying image sequence are then deleted and the remaining frames of the time-varying image sequence are modified based on the determined estimate of the velocity vector field to account for the deleted frames.

Another embodiment of the present invention provides a method for enhancing a time-varying image sequence. The method comprises the steps of digitizing a time-varying image sequence and estimating a velocity vector field from the time-varying image sequence as done in the first embodiment described above. The determined estimate of the velocity vector field for three successive images in the time-varying image sequence is averaged and an intermediate image of the three successive images is enhanced. This enhancing step is repeated for each of the images in the time-varying image sequence and the time-varying image sequence is regenerated with the enhanced images.

Another embodiment of the present invention provides a method for motion compensated restoration a time-varying image sequence. The method comprises the steps of digitizing a time-varying image sequence and estimating a velocity vector field from the time-varying image sequence as done in the first embodiment described above. From the determined estimate of the velocity vector field and a frame rate of the time-varying image sequence an amount of motion blur for an image int he time-varying image sequence is determined. The image is then restored using the determined amount of motion blur for that image.

Another embodiment of the present invention provides a method for modifying a time-varying image sequence in which a velocity vector field is estimated from a time-varying image sequence. This step of estimating a velocity vector field includes forming a parametric system of nonlinear equations utilizing the image irradiance values for each image of a time-varying image sequence, selecting an initial estimate of the velocity vector field for the parameter value corresponding to the coarsest level of the parametric system of nonlinear equations, computing an improved estimate from the system of nonlinear equations, projecting the improved estimate of the velocity vector field as the initial estimate of the velocity vector field for each of the finer levels, and determining successive improvements of the estimate of the velocity vector field by solving the system of linear equations derived in the linearization of the system of nonlinear equations around the previous improvements. The determined successive improvements of the estimate of the velocity vector field is then applied to modify at least one image in the time-varying sequence.

SUMMARY OF THE INVENTION

The method of the present invention operates upon pixel matrices of a sequence of time-varying image scenes. A resolution level pyramid is formed for the pixel matrix. Starting with the coarsest level of the resolution pyramid and proceeding to the progressively finer levels the estimate of the velocity vector for each level is obtained using the estimate of the velocity vector field of the coarser level as the initial estimate of the velocity vector field for the finer levels.

On each level of the resolution pyramid two image functions and their first-order partial derivatives are computed from the time-varying image sequence. The estimate of the velocity vector field is obtained by means of interative improvements of the initial estimate of the velocity vector field. Each successive improvement of the initial estimate of the velocity vector field is obtained by adding an increment of the velocity vector field to the preceding improvement of the initial estimate of the velocity vector field. Such an increment is equal to a scaled by a specific factor solution of a system of linear equations. This system, which is symmetric and positive definite, arises from the above-mentioned image functions, their first-order partial derivatives, and the preceding improvement of the initial estimate of the velocity vector field.

Either the conjugate gradient or the Chebyshev iterative method is then used to obtain the solution of the system of linear equations.

From the foregoing, it can be seen that it is a primary object of the present invention to provide a method for estimating a velocity vector fields from a time-varying image sequence.

It is another object of the present invention to provide an improved method for analyzing time varying image sequences.

A further object of the present invention is to provide a method for reliably estimating a velocity vector field.

These and other objects of the present invention will become more apparent when taken in conjunction with the following description and drawings wherein like characters indicate like parts and which drawings form a part of the present description.

DESCRIPTION OF THE DRAWINGS

FIGS. 6A through 6C illustrate the values of points at one time moment being projected to points at a second time moment.

FIG. 8 illustrates a flow chart of a method of obtaining an improved estimate of the velocity vector field according to an embodiment of the present invention usable in the method of FIG. 7.

FIG. 9 illustrates a flow chart of a method of obtaining an improved estimate of the velocity vector field according to another embodiment of the present invention usable in the method of FIG. 7.

FIG. 11 illustrates a flow chart illustrating a method of modifying a time-varying image sequence according to an embodiment of the present invention.

DESCRIPTION OF THE PREFERRED EMBODIMENT

Formulation of the Estimation Problem

Figure 1:
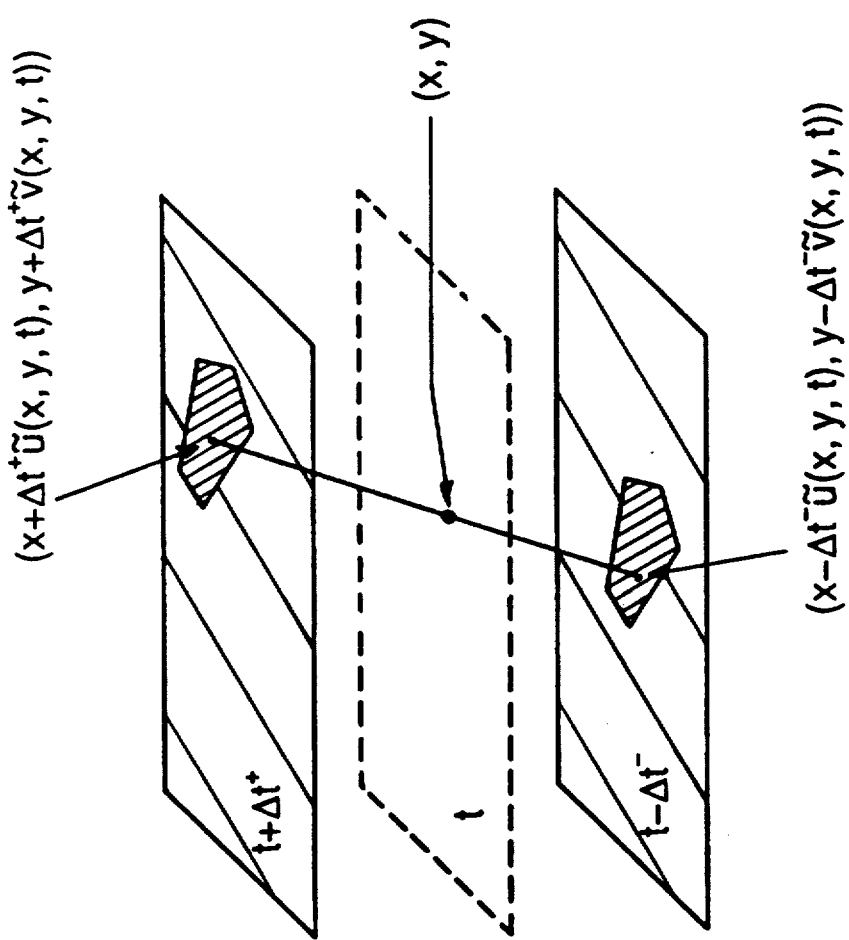
FIG. 1 illustrates an image point taken at one time moment being projected to an image point at a second time moment.

The present invention provides a number of embodiments for modifying a time-varying image sequence based on an estimation of the velocity vector field for at least two sequences of image of a given scene. Before describing these exemplary embodiments, a method for estimating the velocity vector field that is useful in performing these embodiments of the present invention will be described.

The present method invention is particularly directed towards images of a three-dimensional scene taken within some time interval T. For a given moment of time $t \in R$ (here R is a one-dimensional Euclidean space), a sensed image of a scene can be constructed by projecting the light reflected by the objects in the scene at the time t onto a two-dimensional Euclidean space $R^2$, called the image plane, and then identifying the irradiance $g^*(x,y,t)$ of each point (x,y) in the image plane $R^2$. The function $g^*(x,y,t)$ defined as above will be called the image irradiance function.

We shall assume that the image irradiance function $g^*(x,y,t)$, $(x,y,t) \in R^3$ forms a linear continuous (bounded) functional defined on the set of the test functions $\phi(R^3)$. The set $\phi(R^3)$ consists of all infinitely differentiable functions having compact supports in the set $R^3$. The latter means that for each function $\phi \in (R^3)$ there exists a closed bounded subset $S_\phi \in R^3$ such that the function $\phi$ is equal to zero at the points that are outside the subset $S_\phi$.

We assume that there is a given fixed test function $\phi \in \Phi(R^3)$, which will be called the measurement function. An example of the measurement function is given int eh following form:

$$\phi(x,y,t) = \begin{cases} \zeta e^{-\tau(a_p^2 x^2 + a_p^2 y^2 + b_p^2 t^2)/(1 - a_p^2 x^2 - a_p^2 y^2 - b_p^2 t^2)}, & a_p^2 x^2 + a_p^2 y^2 + b_p^2 t^2 < 1, \\ 0, & a_p^2 x^2 + a_p^2 y^2 + b_p^2 t^2 \geq 1, \end{cases}$$

where $\zeta$, $\tau$, $a_p^2$, $b_p^2$, are positive constants. Then for every point (x,y) of some convex bounded subset $\Omega \subset R^2$ (such points will be called image points), and for every time moment $t \in T$, the value of g(x,y,t) of the image at the point (x,y) and the time t is determined by the following relation:

$$g(x,y,t) = \qquad (1\text{-}2)$$

$$\int \int_{R^3} \int g^*(x',y',t')\phi((x'-x),(y'-y),(t'-t)) dx'dy'dt'.$$

The function g(x,y,t) defined on the set $\Omega \times T$ as above (here the symbol $\Omega \times T$ denotes the Cartesian product of the set $\Omega$ on the set T) will be called the time-varying image function.

The time-varying image function g(x,y,t) is infinitely differentiable everywhere in the domain $\Omega \times T$, and its partial derivatives can be obtained through integration by parts. For example, the first-order partial derivatives $g_x(x,y,t)$ and $g_y(x,y,t)$ are given by the following relations:

$$g_x(x,y,t) = \qquad (1\text{-}3)$$

$$-\int \int_{R^3} \int g^*(x',y',t')\phi_x((x'-x),(y'-y),(t'-t)) dx'dy'dt'.$$

$$g_y(x,y,t) = \qquad (1\text{-}4)$$

$$-\int \int_{R^3} \int g^*(x',y',t')\phi_y((x'-x),(y'-y),(t'-t)) dx'dy'dt'.$$

for every $(x,y,t) \in \Omega \times T$.

Let t be a time moment from the time interval T, let $\{(u(x,y,t), v(x,y,t)) | (x,y) \in \Omega\}$ be a velocity vector field of the image taken at the time t, and let $\Delta t^-$, $\Delta t^+$ be two non-negative time increments, such that $t - \Delta t^-$, $t + \Delta t^+ \in T$, and $t - \Delta t^- < t + \Delta t^+$. The preferred method embodiment solves the following problem: given time-varying image functions $g(x,y,t-\Delta t^-)$, $g(x,y,t+\Delta t^+)$, $(x,y) \in \Omega$, find an estimate $\{(\bar{u}(x,y,t), \bar{v}(x,y,t)) | (x,y) \in \Omega\}$ of the velocity vector field $\{(u(x,y,t), v(x,y,t)) | (x,y) \in \Omega\}$ of the image taken at the time t.

The computational processing forming the basis for the estimation of the velocity vector field is defined in terms of constraints imposed on the estimate of the velocity vector field.

Constraints for Estimation of the Velocity Vector Field

Let $(x,y) \in \Omega$ be an image point that is taken at the time t projection of some point in the scene that does not belong to the occlusion boundary. Then the points $(x - \Delta t^- u(x,y,t), y - \Delta t^- v(x,y,t))$, $(x + \Delta t^+ u(x,y,t), y + \Delta t^+ v(x,y,t))$ of the image plane Ball near the projections of the above point in the scene onto the image plane taken at time moments $t - \Delta t^-$ and $t - \Delta t^+$, respectively (see FIG. 1). This property implies that the absolute value of the function $g_t(x,y,u(x,y,t),v(x,y,t),t)$ defined by the relation $$g_t(x,y,u(x,y,t),v(x,y,t),t) = \qquad (2\text{-}1)$$

$$g(x + \Delta t^+ u(x,y,t), y + \Delta t^+ v(x,y,t), t + \Delta t^+) -$$

$$g(x - \Delta t^- u(x,y,t), y - \Delta t^- v(x,y,t), t - \Delta t^-)$$

is sufficiently small and that it is justifiable to require the estimate $(\bar{u}(x,y,t), \bar{v}(x,y,t))$ of the velocity vector $(u(x,y,t), v(x,y,t))$ to be selected in such a way that the function $$(g_t(x,y,\bar{u}(x,y,t),\bar{v}(x,y,t)))^2 \qquad (2\text{-}2)$$

is minimized. This requirement imposes a constraint on the estimate $(\bar{u}(x,y,t), \bar{v}(x,y,t))$ of the velocity vector $(\bar{u}(x,y,t), \bar{v}(x,y,t))$ at the point (x,y) and the time moment t, which will be called the optical flow constraint.

It can be easily verified that the requirement for the function (2-2) to achieve a minimum on the estimate $(\tilde{u}(x,y,t),\tilde{v}(x,y,t))$ of the velocity vector $(u(x,y,t),v(x,y,t))$ at most specifies the component of the estimate in the direction of the image gradient and leaves the component orthogonal to such gradient undetermined. This suggests that we need to impose additional constraints on the estimate of the velocity vector field in order for the computation to be well defined.

It is natural to assume that the velocity vector $(u(x,y,t),v(x,y,t))$, $(x,y) \in \Omega$ forms a smooth vector-function of the variables x, y everywhere in the domain $\Omega$ except for the points belonging to the occlusion boundary. Let $s = (s_x, s_y) \in S$ be a vector specifying a direction on the image plane, where S is a unit circle defined by the relation $$S = \{(S_x, S_y) | (S_x, S_y) \in R^2, s_x^2 + s_y^2 = 1\}. \quad (2-3)$$

and let $(x,y) \in \Omega$ be a projection of some point in the scene onto the image plane that does not cross the occlusion boundary in the direction s, meaning that for some small position constant $\omega$, the points in the scene projecting onto the points $(x - \omega s_x, y - \omega s_y)$ and $(x + \omega s_x, y + \omega s_y)$ in the image plane belong to the same object and are sufficiently close to each other. Then the argument given above implies that the absolute values of the quantities $(s, \nabla u(x,y,t))$ and $(s, \nabla v(x,y,t))$ defined by the relations $$(s, \nabla u(x,y,t)) = s_g M_x(x,y,t) + s_y M_y(x,y,t), \quad (2-4)$$

$$(s, \nabla v(x,y,t)) = s_g V_x(x,y,t) + s_y V_y(x,y,t) \quad (2-5)$$

are sufficiently small, and it is justifiable to require the estimate $(\tilde{u}(x,y,t),\tilde{v}(x,y,t))$ of the velocity vector $((u(x,y,t),v(x,y,t))$ to be selected in such a way that the functions $$(s, \nabla \tilde{u}(x,y,t))^2, \quad (2-6)$$

$$(x, \nabla \tilde{v}(x,y,t))^2 \quad (2-7)$$

are minimized. These requirements impose additional constraints on the estimate $(\tilde{u}(x,y,t),\tilde{v}(x,y,t))$ of the velocity vector $(u(x,y,t),v(x,y,t))$ at the image point $(x,y) \in \Omega$ and the time moment t which will be called the smoothness constraints in the direction s.

Finally, to make the computation of the estimate $\{(\tilde{u}(x,y,t),\tilde{v}(x,y,t))|(x,y) \in \Omega\}$ of the velocity vector field $\{(\tilde{u}(x,y,t),\tilde{v}(x,y,t))|(x,y) \in \Omega\}$ well defined, which means that the estimate is unique, we shall require that the directional component $$s_x(\tilde{u}(x,y,t) - \tilde{u}_0(x,y,t)) + s_y(\tilde{v}(x,y,t) - \tilde{v}_0(x,y,t)) \quad (2-8)$$

of the difference between the unknown estimate $(\tilde{u}(x,y,t),\tilde{v}(x,y,t))$ of the velocity vector $(\tilde{u}(x,y,t),\tilde{v}(x,y,t))$ and its initial estimate $(\tilde{u}_0(x,y,t),\tilde{v}_0(x,y,t))$ be small for every image point $(x,y) \in \Omega$ and for every direction $(s_x, s_y) \in S$ where the optical flow constraint and the smoothness constraints impose no restrictions. This can be accomplished by minimizing the following functions:

$$(\tilde{u}(x,y,t) - \tilde{u}_0(x,y,t))^2. \quad (2-9)$$

$$(\tilde{v}(x,y,t) - \tilde{v}_0(x,y,t))^2. \quad (2-10)$$

in addition to functions (2-2), (2-6), and (2-7) specifying the optical flow and smoothness constraints, provided that the weights associated with functions (2-9) and (2-10) are small relative to the weights associated with functions (2-2), (2-6), and (2-7). The constraints imposed on the estimate $(\tilde{u}(x,y,t),\tilde{v}(x,y,t))$ of the velocity vector $(u(x,y,t),v(x,y,t))$ at the image point $(x,y) \in \Omega$ and the time moment t by the above requirements will be called the regularization constraints.

System of Nonlinear Equations for Estimation of Velocity Vector Fields

To form the system of nonlinear equations let $(\tilde{u},\tilde{v}) = \{(\tilde{u}(x,y,t),\tilde{v}(x,y,t))|(x,y) \in \Omega\}$ and $(\hat{u},\hat{v}) = \{(\hat{u}(x,y,t),\hat{v}(x,y,t))|(x,y) \in \Omega\}$ be two vector fields corresponding to a time moment t, and let $f(\tilde{u},\tilde{v},\hat{u},\hat{v})$ be a functional of these vector fields defined as a weighted average of functions (2-2), (2-6), (2-7), (2-9), and (2-10), specifying optical flow, smoothness, and regularization constraints, by the following relation:

$$f(\tilde{u},\tilde{v},\hat{u},\hat{v}) = \int\int_\Omega [\alpha(x,y,\tilde{u}(x,y,t),\tilde{v}(x,y,t),||\nabla\tilde{u}(x,y,t)||,||\nabla\tilde{v}(x,y,t)||,t)\,(g_t(x,y,\hat{u}(x,y,t),\hat{v}(x,y,t),t))^2 + \quad (3-1)$$

$$\int_S \beta_s(x,y,\tilde{u}(x,y,t),\tilde{v}(x,y,t),(s,\nabla\tilde{u}(x,y,t)),(s,\nabla\tilde{v}(x,y,t)),t)((s,\nabla\hat{u}(x,y,t))^2 + (s,\nabla\hat{v}(x,y,t))^2)ds +$$

$$\gamma((\hat{u}(x,y,t) - \tilde{u}_0(x,y,t))^2 + (\hat{v}(x,y,t) - \tilde{v}_0(x,y,t))^2)]dxdy.$$

Here,
$\alpha(x,y,\tilde{u}(x,y,t),\tilde{v}(x,y,t),||\nabla\tilde{u}(x,y,t)||,||\nabla\tilde{v}(x,y,t)||,t)$ is a weight associated with an optical flow constraint;
$\beta_s(x,y,\tilde{u}(x,y,t),\tilde{v}(x,y,t),(s,\nabla\tilde{u}(x,y,t)),(x,\nabla\tilde{v}(x,y,t)),t)$ is a weight associated with a smoothness constraint in the direction s; $\gamma$ is a positive constant specifying a weight for the regularization constraint; the functions $||\nabla\tilde{u}(x,y,t)||$, $||\nabla\tilde{v}(x,y,t)||$ are the norms of the vectors $\nabla\tilde{u}(x,y,t)$, $\nabla\tilde{v}(x,y,t)$, which are the gradients with respect to the variables $(x,y) \in \Omega$ of the functions $\tilde{u}(x,y,t)$, $\tilde{v}(x,y,t)$, respectively, given by the relations;

$$||\nabla\tilde{u}(x,y,t)|| = \sqrt{\tilde{u}_x(x,y,t)^2 + \tilde{u}_y(x,y,t)^2}, \quad (3-2)$$

$$||\nabla\tilde{v}(x,y,t)|| = \sqrt{\tilde{v}_x(x,y,t)^2 + \tilde{v}_y(x,y,t)^2}; \quad (3-2)$$

the functions $(s,\nabla\tilde{u}(x,y,t))$, $(s,\nabla\tilde{v}(x,y,t))$, $(s,\nabla\hat{u}(x,y,t))$, $(s,\nabla\hat{v}(x,y,t))$ are defined as in relations (2-4) and (2-5); the function $g_t(x,y,\hat{u}(x,y,t),\hat{v}(x,y,t),t)$ is defined as in relation (2-1); and the functions $\tilde{u}_0(x,y,t)$, $\tilde{v}_0(x,y,t)$ are components of the initial estimate of the velocity vector at image point (x,y) and time t.

The estimate of the velocity vector field is then defined as the vector field $(\tilde{u},\tilde{v})$ on which the functional $f(\tilde{u},\tilde{v},\hat{u},\hat{v})$, considered as the function of the vector field $(\hat{u},\hat{v})$ and depending on the vector field $(\tilde{u},\tilde{v})$ as on the parameters, achieves a local minimum when the value of the vector field $(\hat{u},\hat{v})$ is identically equal to the value of the vector field $(\tilde{u},\tilde{v})$. Let $(\Delta\tilde{u},\Delta\tilde{v}) = \{(\Delta\tilde{u}(x,y,t),\Delta\tilde{v}(x,y,t))|(x,y) \in \Omega\}$ be the vector field defined by the relation $$(\Delta\tilde{u}(x,y,t),\Delta\tilde{v}(x,y,t)) = (\tilde{u}(x,y,t),\tilde{v}(x,y,t))$$
$$-(\bar{u}(x,y,t),\bar{v}(x,y,t)), (x,y) \in \Omega; \quad (3\text{-}4)$$

then the functional $f(\bar{u},\bar{v},\hat{u},\hat{v})$ takes the form $f(\bar{u},\bar{v},\bar{u}+\Delta\bar{u},\bar{v}+\Delta\bar{v})$. The vector field $(\Delta\bar{u},\Delta\bar{v})$ specifies a perturbation to the vector field $(\bar{u},\bar{v})$, and the functional $f(\bar{u},\bar{v},\bar{u}+\Delta\bar{u},\bar{v}+\Delta\bar{v})$ assigns the cost to each choice of the vector field $(\bar{u},\bar{v})$ and its perturbation $(\Delta\bar{u},\Delta\bar{v})$. Then the estimate of the velocity vector field is the vector field $(\bar{u},\bar{v})$, for which the locally minimal cost is achieved when the perturbation vector field is equal to zero. Using the calculus of variations applied to the function $f(\bar{u},\bar{v},\bar{u}+\Delta\bar{u},\bar{v}+\Delta\bar{v})$, we find that the above defined estimate $(\bar{u},\bar{v})$ of the velocity vector field is a solution of the following system of equations:

$$a(x,y,\bar{u}(x,y,t),\bar{v}(x,y,t),||\nabla\bar{u}(x,y,t)||,||\nabla\bar{v}(x,y,t)||,t)g_{tt}(x,y,\bar{u}(x,y,t),\bar{v}(x,y,t),t)g_x(x,y,\bar{u}(x,y,t),\bar{v}(x,y,t),t) - \quad (3\text{-}5)$$

$$\int_S (s,\nabla(\beta_s(x,y,\bar{u}(x,y,t),\bar{v}(x,y,t),(s,\nabla\bar{u}(x,y,t)),(s,\nabla\bar{v}(x,y,t)),t)(s,\nabla\bar{u}(x,y,t))))ds + \gamma(\bar{u}(x,y,t) - \bar{u}_0(x,y,t)) = 0,$$

$$a(x,y,\bar{u}(x,y,t),\bar{v}(x,y,t),||\nabla\bar{u}(x,y,t)||,||\nabla\bar{v}(x,y,t)||,t)g_{tt}(x,y,\bar{u}(x,y,t),\bar{v}(x,y,t),t)g_y(x,y,\bar{u}(x,y,t),\bar{v}(x,y,t),t) -$$

$$\int_S (s,\nabla(\beta_s(x,y,\bar{u}(x,y,t),\bar{v}(x,y,t),(s,\nabla\bar{u}(x,y,t)),(s,\nabla\bar{v}(x,y,t)),t)(s,\nabla\bar{v}(x,y,t))))ds + \gamma(v(x,y,t) - \bar{v}_0(x,y,t)) = 0,$$

where;

$$g_{tt}(x,y,\bar{u}(x,y,t),\bar{v}(x,y,t),t) = \quad (3\text{-}6)$$

$$\Delta t^+ g_x(x + \Delta t^+\bar{u}(x,y,t),y + \Delta t^+\bar{v}(x,y,t),t + \Delta t^+) + \Delta t^- g_x(x - \Delta t^-\bar{u}(x,y,t),y - \Delta t^-\bar{v}(x,y,t),t - \Delta t^-),$$

$$g_{tt}(x,y,\bar{u}(x,y,t),\bar{v}(x,y,t),t) = \quad (3\text{-}7)$$

$$\Delta t^+ g_y(x + \Delta t^+\bar{u}(x,y,t),y + \Delta t^+\bar{v}(x,y,t),t + \Delta t^+) + \Delta t^- g_y(x - \Delta t^-\bar{u}(x,y,t),y - \Delta t^-\bar{v}(x,y,t),t - \Delta t^-),$$

As has been mentioned, the weight function $a(x,y,\bar{u}(x,y,t),\bar{v}(x,y,t),||\nabla\bar{u}(x,y,t)||,||\nabla\bar{v}(x,y,t)||,t)$ is selected in such a way that the contribution of the optical flow constant $g_t(x,y,\bar{u}(x,y,t),\bar{v}(x,y,t),t)$ to the solution $\{(\bar{u}(x,y,t),\bar{v}(x,y,t))|(x,y) \in \Omega\}$ of the system of equations (3-5) becomes small for the points $(x,y)$ that are near the occlusion boundaries. Similarly, the weight function $\beta_s(x,y,\bar{u}(x,y,t),\bar{v}(x,y,t),(s,\nabla\bar{u}(x,y,t)),(s,\nabla\bar{v}(x,y,t)),t)$ $s \in S$ is chosen so that the contribution of the smoothness constraints $(s,\nabla\bar{u}(x,y,t))$, and $(s,\nabla\bar{v}(x,y,t))$, to the solution $\{(\bar{u}(x,y,t),\bar{v}(x,y,t))|(x,y) \in \Omega\}$ of the system of equations (3-5) becomes small when the point $(x,y)$ crosses the occlusion boundary in the direction s.

Let $\{(\bar{u}(x,y,t),\bar{v}(x,y,t))|(x,y) \in \Omega\}$ be an estimate of the velocity vector field, and let the point $(x,y) \in \Omega$ be near an occlusion boundary; then the following two events are likely to happen:

1. The point in the scene projecting into the point $(x,y)$ in the image plane at the time t either is visible at the time $(t-\Delta t^-)$ and is invisible at the time $(t+\Delta t^+)$, or it is visible at the time $(t+\Delta t^+)$ and is invisible at the time $(t-\Delta t^-)$. Let $(x_1,y_1)$ and $(x_2,y_2)$ be projections of such a point in the scene into the image plane taken at the time moments $(t-\Delta t^-)$ and $(t+\Delta t^+)$, respectively. If the radiance of the point in the scene projecting into the image point $(x_1,y_1)$ at the time $(t-\Delta t^-)$ is significantly different from the radiance of the point in the scene projecting into the image point $(x_2,y_2)$ at the time $(t+\Delta t^+)$, and if the radiance undergoes some changes in the neighborhoods of the above points in the scene, then the following cases are likely to be encountered:

1.1. The point in the scene projecting into the image point $(x-\Delta t^-\bar{u}(x,y,t),y-\Delta t^-\bar{v}(x,y,t))$ at the time $(t-\Delta t^-)$, and the point in the scene projecting into the image point $(x+\Delta t^+\bar{u}(x,y,t),y+\Delta t^+\bar{v}(x,y,t))$ at the time $(t+\Delta t^+)$, both belong to the occluded object, on one hand, and have different radiances, on the other hand. The later may happen if the above points occupy distinct locations on the object of the scene which, in turn, may be caused by the presence of the occlusion boundary. Under these conditions the absolute value of the function $g_t(x,y,\bar{u}(x,y,t),\bar{v}(x,y,t),t)$ becomes large.

Figure 2:
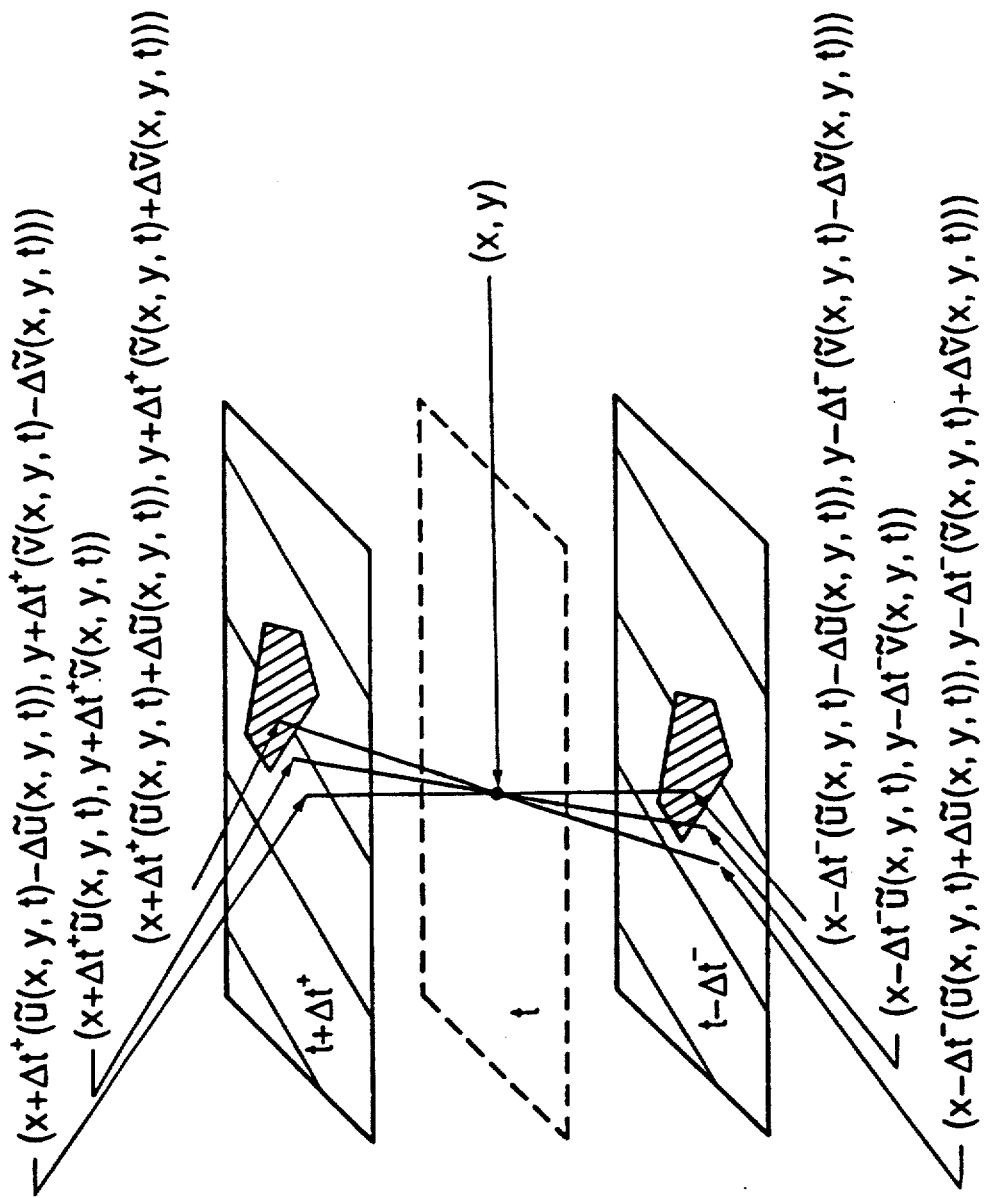
FIG. 2 illustrates the behavior of the optical flow constant near the occlusion boundary.

1.2. The point in the scene projecting into the image point $(x-\Delta t^-\bar{u}(x,y,t),y-\Delta t^-\bar{v}(x,y,t))$ at the time $(t-\Delta t^-)$ and the point in the scene projecting into the image point $(x+\Delta t^+\bar{u}(x,y,t),y+\Delta t^+\bar{v}(x,y,t))$ at the time $(t+\Delta t^+)$ both belong either to the occluding object or to the occluded one. In addition to this, for some not-too-large vector $(\Delta\bar{u}(x,y,t),\Delta\bar{v}(x,y,t))$, one of the following two points in the scene belongs to the occluding object, while the other belongs to the occluded one: the first point is the one projecting into the image point $(x-\Delta t^-(\bar{u}(x,y,t)+\Delta\bar{u}(x,y,t)),y-\Delta t^-(\bar{v}(x,y,t)+\Delta\bar{v}(x,y,t)))$ at the time $(t-\Delta t^-)$, and the second point is the one projecting into the image point $(x+\Delta t^+(\bar{u}(x,y,t)+\Delta\bar{u}(x,y,t)),y+\Delta t^+(\bar{v}(x,y,t)+\Delta\bar{v}(x,y,t)))$ at the time $(t+\Delta t^+)$. Likewise, for the same vector $(\Delta\bar{u}(x,y,t),\Delta\bar{v}(x,y,t))$, one of the following two points in the scene belongs to the occluding object, while the other belongs to the occluded one: the first point is the one projecting into the image point $(x-\Delta t^-(\bar{u}(x,y,t)-\Delta\bar{u}(x,y,t)),y-\Delta t^-(\bar{v}(x,y,t)-\Delta\bar{v}(x,y,t)))$ at the time $(t-\Delta t^-)$, and the second point is the one projecting into the image point $(x+\Delta t^+(\bar{u}(x,y,t)-\Delta\bar{u}(x,y,t)),y+\Delta t^+(\bar{v}(x,y,t)-\Delta\bar{v}(x,y,t)))$ at the time $(t+\Delta t^+)$ (see FIG. 2). In such a case the value of the function $(g_t(x,y,t,\bar{u}(x,y,t),\bar{v}(x,y,t),t))^2$ becomes relatively small, while the value of the function $(g_t(x,y,\bar{u}(x,y,t)+\Delta\bar{u}(x,y,t),\bar{v}(x,y,t)+\Delta\bar{v}(x,y,t),t))^2$, as well as the value of the function $(g_t(x,y,\bar{u}(x,y,t)-\Delta\bar{u}(x,y,t),\bar{v}(x,y,t)-\Delta\bar{v}(x,y,t),t))^2$, becomes relatively large. This implies that the value of the function $$(g_t(x,y,\bar{u}(x,y,t) + \Delta\bar{u}(x,y,t),\bar{v}(x,y,t) + \Delta\bar{v}(x,y,t),t))^2 -$$

$$(g_t(x,y,\bar{u}(x,y,t),\bar{v}(x,y,t),t))^2 + (g_t(x,y,\bar{u}(x,y,t) - \Delta\bar{u}(x,y,t),\bar{v}(x,y,t) -$$

$$\Delta\bar{v}(x,y,t),t))^2 - (g_t(x,y,\bar{u}(x,y,t),\bar{v}(x,y,t),t))^2$$

becomes large. It is not difficult to see that, if we ignore the second-order partial derivatives of the function $g_t(x,y,\bar{u}(x,y,t),\bar{v}(x,y,t),t)$ with respect to the functions $\bar{u}(x,y,t)$ and $\bar{v}(x,y,t)$, the value of the function (3-8) becomes approximately equal to the value of the function $$2.0(\Delta \bar{u}(x,y,t)g_{\bar{u}}(x,y,\bar{u}(x,y,t),\bar{v}(x,y,t),t) + \Delta \bar{v}(x,y,t)g_{\bar{v}}(x,y,\bar{u}(x,y,t),\bar{v}(x,y,t),t))^2$$

where the functions $g_{\bar{u}}(x,y,\bar{u}(x,y,t),\bar{v}(x,y,t),t)$, $g_{\bar{v}}(x,y,\bar{u}(x,y,t),\bar{v}(x,y,t),t)$ are given by the relations (3-6), (3-7), respectively. For the unit vector $s=(s_x,s_y)$ that is collinear to the vector $(\Delta\bar{u}(x,y,t),\Delta\bar{v}(x,y,t))$, the above observations imply that the absolute value of the function $(s,\nabla'g_f(x,y,\bar{u}(x,y,t),\bar{v}(x,y,t),t))$, defined by the relation $$(s,\nabla'g_f(x,y,\bar{u}(x,y,t),\bar{v}(x,y,t),t)) = s_y g_{\bar{u}}(x,y,\bar{u}(x,y,t),\bar{v}(x,y,t),t) + s_y g_{\bar{v}}(x,y,\bar{u}(x,y,t),\bar{v}(x,y,t),t),$$

becomes large.

Figure 3:
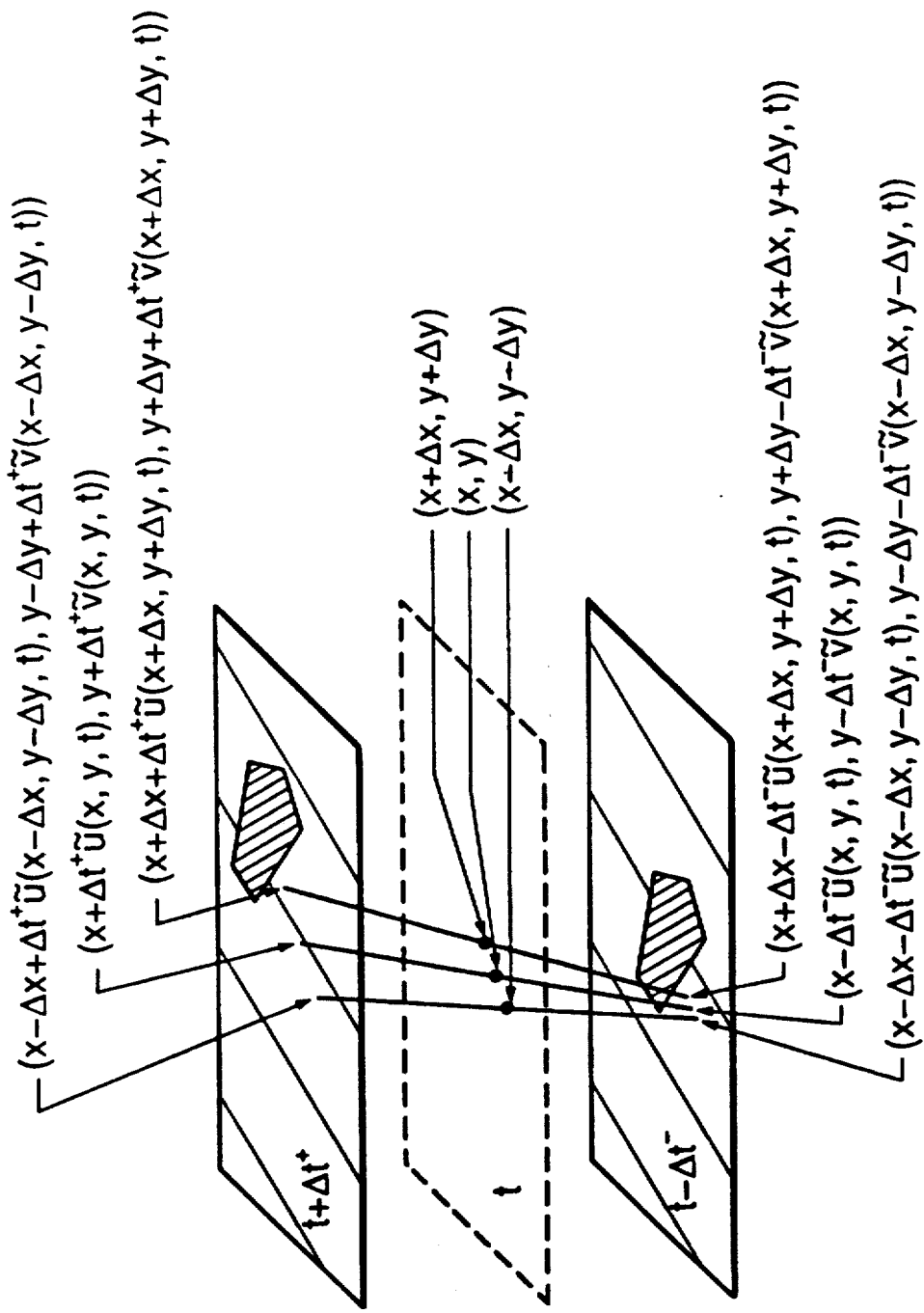
FIG. 3 illustrates the behavior of the smoothness constraint near the occlusion boundary.

2. The estimate $\{(\bar{u}(x,y,t),\bar{v}(x,y,t))|(x,y) \in \Omega\}$ of the velocity vector field changes rapidly in the vicinity of the point (x,y) (see FIG. 3), which implies the following:

2.1 The values of the functions $||\nabla\bar{u}(x,y,t)||$ and $||\nabla\bar{v}(x,y,t)||$ becomes large.

2.2 The absolute values of the functions $(s,\nabla\bar{u}(x,y,t))$ and $(s,=\bar{v}(x,y,t))$ become large, provided that the point (x,y) crosses the occlusion boundary in the direction s.

It is not difficult to see that, if appropriate conditions on the scene being imaged and on the imaging process itself are satisfied, then in the event of the absolute value of the function $g_f(x,y,\bar{u}(x,y,t),\bar{v}(x,y,t),t)$ being large, or of the values of the functions $||\nabla\bar{u}(x,y,t)||$, $||\nabla\bar{v}(x,y,t)||$ being large in addition to the absolute value of the function $g_f(x,y,\bar{u}(x,y,t),\bar{v}(x,y,t),t)$ being large, the point (x,y) is likely to be near the occlusion boundary, while in the event of the absolute values of the functions $(s,\nabla\bar{u}(x,y,t))$, $(s,\nabla\bar{v}(x,y,t))$ being large, or of the absolute value of the function $(s,\nabla'g_f(x,y,\bar{u}(x,y,t),\bar{v}(x,y,t),t))$ being large in addition to the absolute values of the functions $(s,\nabla\bar{u}(x,y,t))$, $(s,\nabla\bar{v}(x,y,t))$ being large, the point (x,y) is likely to cross the occlusion boundary in the direction s. We should note that in the case of the functions $||\nabla\bar{u}(x,y,t)||$, $||\nabla\bar{v}(x,y,t)||$ being large, the point (x,y) does not necessarily lie near the occlusion boundary. It may, for example, lie on the object of the scene whose projection onto the image plane undergoes a rotation or a location deformation. We should also note that in the case of the function $(s,\nabla'g_f(x,y,\bar{u}(x,y,t),\bar{v}(x,y,t),t))$ being large, the point (x,y) does not necessarily cross the occlusion boundary in the direction s. It may, for example, cross the radiance boundary arising from a texture or a sudden change in the illumination.

These observations suggest that the weight function $\alpha(x,y,\bar{u}(x,y,t),\bar{v}(x,y,t),||\nabla\bar{u}(x,y,t)||,||\nabla\bar{v}(x,y,t)||,t)$ should be a monotonically decreasing function relative to the absolute value of the function $g_f(x,y,\bar{u}(x,y,t),\bar{v}(x,y,t),t)$ and to the values of the functions $||\nabla\bar{u}(x,y,t)||$, $||\nabla\bar{v}(x,y,t)||$ multiplied by the absolute value of the function $g_f(x,y,\bar{u}(x,y,t),\bar{v}(x,y,t),t)$, while the weight function $\beta_f(x,y,\bar{u}(x,y,t),\bar{v}(x,y,t),(s,\nabla\bar{u}(x,y,t)),(s,\nabla\bar{v}(x,y,t)),t)$ should be a monotonically decreasing function relative to the absolute values of the functions $(s,\nabla\bar{u}(x,y,t))$, $(s,\nabla\bar{v}(x,y,t))$ and to the absolute value of the functions $(s,\nabla'g_f(x,y,\bar{u}(x,y,t),\bar{v}(x,y,t),t))$ multiplied by some combinations of the absolute values of the functions $(s,\nabla\bar{u}(x,y,t))$, $(s,\nabla\bar{v}(x,y,t))$.

It is natural to require the solution of $\{(\bar{u}(x,y,t),\bar{v}(x,y,t))|(x,y) \in \Omega\}$ of the system of equations (3-5) determining the estimate of the velocity vector field to be robust with respect to the choice of the initial vector field and with respect to the noise. One way to comply with this requirement is, in turn to require the scalar product of the variation $(\Delta\bar{u}(x,y,t),\Delta\bar{v}(x,y,t))$ of the estimate $(\bar{u}(x,y,t),\bar{v}(x,y,t))$ of the velocity vector $(\bar{u}(x,y,t),\bar{v}(x,y,t))$ with the corresponding variation of the vector function (3-5) to be positive for every image point $(x,y) \in \Omega$ and for every sufficiently small variation $\{(\Delta\bar{u}(x,y,t),\Delta\bar{v}(x,y,t))|(x,y) \in \Omega\}$ of the estimate $\{(\bar{u}(x,y,t),\bar{v}(x,y,t))|(x,y) \in \Omega\}$ of the velocity vector field $\{(\bar{u}(x,y,t),\bar{v}(x,y,t))|(x,y) \in \Omega\}$.

The following weight functions comply with the above requirements:

$$\alpha(x,y,\bar{u}(x,y,t),\bar{v}(x,y,t),||\nabla\bar{u}(x,y,t)||,||\nabla\bar{v}(x,y,t)||,t) = \left(\sqrt{r^2 + p^2(g_f(x,y,\bar{u}(x,y,t),\bar{v}(x,y,t),t))^2 + q^2(||\nabla\bar{u}(x,y,t)||^2 + ||\nabla\bar{v}(x,y,t)||^2)}\right)^{-1}, \quad (3\text{-}8)$$

$$\beta_f(x,y,\bar{u}(x,y,t),\bar{v}(x,y,t),(s,\nabla\bar{u}(x,y,t)),(s,\nabla\bar{v}(x,y,t)),t) = \left(\sqrt{a^2 + (c^2 + b^2(s,\nabla'g_f(x,y,\bar{u}(x,y,t),\bar{v}(x,y,t),t))^2)((s,\nabla\bar{u}(x,y,t))^2 + (s,\nabla\bar{v}(x,y,t))^2)}\right)^{-1}. \quad (3\text{-}9)$$

where r, p, q, a, c, b are non-negative real constants.

By expanding the above mentioned scalar product into a quadratic form of the vector field $\{(\Delta\bar{u}(x,y,t),\Delta\bar{v}(x,y,t))|(x,y) \in \Omega\}$ in the neighborhood of the vector field $\{(\bar{u}(x,y,t),\bar{v}(x,y,t))|(x,y) \in \Omega\}$, we obtain the following positive definite quadratic form:

$$\int\int_\Omega \frac{(r^2 + q^2(||\nabla\bar{u}(x,y,t)||^2 + ||\nabla\bar{v}(x,y,t)||^2)(g_{\bar{u}}(x,y,\bar{u}(x,y,t),\bar{v}(x,y,t),t)\Delta\bar{u}(x,y,t) + g_{\bar{v}}(x,y,\bar{u}(x,y,t),\bar{v}(x,y,t),t)\Delta\bar{v}(x,y,t))^2}{\left(\sqrt{r^2 + p^2(g_f(x,y,\bar{u}(x,y,t),\bar{v}(x,y,t),t))^2 + q^2(||\nabla\bar{u}(x,y,t)||^2 + ||\nabla\bar{v}(x,y,t)||^2)}\right)^3} + \quad (3\text{-}10)$$

$$\int_S \frac{(c^2 + b^2(s,\nabla'g_f(x,y,\bar{u}(x,y,t),\bar{v}(x,y,t),t))^2)((s,\nabla(\Delta\bar{u}(x,y,t)))(s,\nabla\bar{v}(x,y,t)) + (s,\nabla(\Delta\bar{v}(x,y,t)))(s,\nabla\bar{u}(x,y,t)))^2}{\left(\sqrt{a^2 + (c^2 + b^2(s,\nabla'g_f(x,y,\bar{u}(x,y,t),\bar{v}(x,y,t),t))^2)((s,\nabla\bar{u}(x,y,t))^2 + (s,\nabla\bar{v}(x,y,t))^2)}\right)^3} ds +$$

$$\int_S \frac{a^2((s,\nabla(\Delta\bar{u}(x,y,t)))^2 + (s,\nabla(\Delta\bar{v}(x,y,t)))^2)}{\left(\sqrt{a^2 + (c^2 + b^2(s,\nabla'g_f(x,y,\bar{u}(x,y,t),\bar{v}(x,y,t),t))^2)((s,\nabla\bar{u}(x,y,t))^2 + (s,\nabla\bar{v}(x,y,t))^2)}\right)^3} ds +$$

$$\gamma((\Delta\bar{u}(x,y,t))^2 + (\Delta\bar{v}(x,y,t))^2)]dx\,dy.$$

Obtaining the Estimate of the Velocity Vector Field

In the previous section the estimate $\{(\tilde{u}(x,y,t),\tilde{v}(x,y,t))|(x,y) \in \Omega\}$ of the velocity vector field $\{(u(x,y,t),v(x,y,t))|(x,y) \in \Omega\}$ is defined as a solution of the system of nonlinear equations (3-5). The approach of obtaining the estimate $\{(\tilde{u}(x,y,t),\tilde{v}(x,y,t))|(x,y) \in \Omega\}$ of the velocity vector field $\{(u(x,y,t),v(x,y,t))|(x,y) \in \Omega\}$ by solving the system of nonlinear equations (3-5) directly may encounter the difficulty that the system of equations (3-5) may, in general, have many solutions. To overcome this difficulty, the approach will be modified as follows.

For a given measurement fraction $\phi \in \phi(R^3)$ we shall consider the following one-parameter family of time-varying image functions defined on the set $\Omega \times T$ as in the relation $$g^\sigma(x,y,t) = \frac{1}{\sigma^2} \int \int_{R^3} \int g^*(x',y',t')\phi((x'-x)/\sigma, (y'-y)/\sigma, (t'-t))dx'dy'dt' \quad (4\text{-}1)$$

for every image point $(x,y) \in \Omega$, every time moment $t \in T$, and every parameter value $\sigma \in (1,\infty)$. One can easily notice that, when the value of the parameter $\sigma$ is equal to 1, the parametric time-varying image function $g^\sigma(x,y,t)$ is identically equal to the time-varying function $g(x,y,t)$ defined by the relation (1-2).

It is not difficult to see that for every parameter value $\sigma \in (1,\infty)$ the parametric time-varying image function $g^\sigma(x,y,t)$ is infinitely differentiable everywhere in the domain $\Omega \times T$ and its partial derivatives can be obtained through integration by parts. For example, the first-order partial derivatives $g_x^\sigma(x,y,t)$ and $g_y^\sigma(x,y,t)$ are given by the following relations:

$$g_x^\sigma(x',y,t) = -\frac{1}{\sigma^3} \int \int_{R^3} \int g^*(x',y',t')\phi_x((x'-x)/\sigma, (y'-y)/\sigma, (t'-t))dx'dy'dt' \quad (4\text{-}2)$$

$$g_y^\sigma(x,y,t) = -\frac{1}{\sigma^3} \int \int_{R^3} \int g^*(x',y',t')\phi_y((x'-x)/\sigma, (y'-y)/\sigma, (t'-t))dx'dy'dt' \quad (4\text{-}3)$$

for every image point $(x,y) \in \Omega$, every time moment $t \in T$, and every parameter value $\sigma \in (1,\infty)$.

Let $\sigma \in (1,\infty)$ and let $\{(\tilde{u}_0^\sigma(x,y,t),\tilde{v}_0^\sigma(x,y,t))|(x,y) \in \Omega\}$ be an initial estimate of the velocity vector field corresponding to the parameter $\sigma$. If we use the parametric time-varying image function $g^\sigma(x,y,t)$, $(x,y) \in \Omega$ instead of the time-varying function $g(x,y,t)$, $(x,y) \in \Omega$, then the system (3-5) becomes the following system of nonlinear equations relative to the unknown family of the vector fields $\{(\tilde{u}^\sigma(x,y,t),\tilde{v}^\sigma(x,y,t))|(x,y) \in \Omega\}$:

$$\frac{g_{th}^\sigma g_t^\sigma}{\sqrt{r^2 + p^2(g_t^\sigma)^2 + q^2(||\nabla \tilde{u}^\sigma||^2 + ||\nabla \tilde{v}^\sigma||^2)}} -$$

$$\int_S \left(s,\nabla \frac{(s,\nabla \tilde{v}^\sigma)}{\sqrt{a^2 + (c^2 + b^2(s,\nabla g_t^\sigma)^2)((s,\nabla \tilde{u}^\sigma)^2 + (s,\nabla \tilde{v}^\sigma)^2)}}\right)ds +$$

$$\gamma(\tilde{v}^\sigma - \tilde{v}_0^\sigma) = 0,$$

$$\frac{g_{th}^\sigma g_t^\sigma}{\sqrt{r^2 + p^2(g_t^\sigma)^2 + q^2(||\nabla \tilde{u}^\sigma||^2 + ||\nabla \tilde{v}^\sigma||^2)}} -$$

$$\int_S \left(s,\nabla \frac{(s,\nabla \tilde{v}^\sigma)}{\sqrt{a^2 + (c^2 + b^2(s,\nabla g_t^\sigma)^2)((s,\nabla \tilde{u}^\sigma)^2 + (s,\nabla \tilde{v}^\sigma)^2)}}\right)ds +$$

$$\gamma(\tilde{v}^\sigma - \tilde{v}_0^\sigma) = 0,$$

Here, for the sake of compactness of the notation, we have omitted the arguments of the functions appearing in the above system of equations.

Let $\sigma_0, \sigma_1, \ldots, \sigma_n$ be a decreasing, not too sparse sequence of the parameters from the interval $(1,\infty)$ such that the parameter $\sigma_n$ is equal to 1, while the parameter $\sigma_0$ is equal to $\infty$, and let $\{(\tilde{u}^{\sigma_0}(x,y,t),\tilde{v}^{\sigma_0}(x,y,t))|(x,y) \in \Omega\}$ be the vector field that is identically equal to a given vector constant; then the process of computing the estimate $\{(\tilde{u}(x,y,t),\tilde{v}(x,y,t))|(x,y) \in \Omega\}$ of the velocity vector field $\{(u(x,y,t),v(x,y,t))|(x,y) \in \Omega\}$ can be defined as follows.

For every integer index $i=1,\ldots,n$, find the estimate $\{(\tilde{u}^{\sigma_i}(x,y,t),\tilde{v}^{\sigma_i}(x,y,t))|(x,y) \in \Omega\}$ of the solution of the system of equations (4-4) when the value of the parameter $\sigma$ is equal to $\sigma_i$, that is the closest to the estimate $\{(\tilde{u}^{\sigma_{i-1}}(x,y,t),\tilde{v}^{\sigma_{i-1}}(x,y,t))|(x,y) \in \Omega\}$ of the solution of the system of equations (4-4) when the value of the parameter $\sigma$ is equal to $\sigma_{i-1}$ in the case if the index $i>1$, and that is the closest to a given constant vector field $\{(\tilde{u}^{\sigma_0}(x,y,t),\tilde{v}^{\sigma_0}(x,y,t))|(x,y) \in \Omega\}$ otherwise. In the case when the value of the parameter $\sigma$ is equal to $\sigma_i$ the vector field $\{(\tilde{u}_0^\sigma(x,y,t),\tilde{v}_0^\sigma(x,y,t))|(x,y) \in \Omega\}$ appearing in the system of equations (4-4) is defined to be equal to the vector field $\{(\tilde{u}^{\sigma_{i-1}}(x,y,t),\tilde{v}^{\sigma_{i-1}}(x,y,t))|(x,y) \in \Omega\}$, which is an estimate of the solution of the system of equations (4-4) when the value of the parameter $\sigma$ is equal to $\sigma_{i-1}$ in the case if the index $i>1$, and which is a given constant vector field $\{(\tilde{u}^{\sigma_0}(x,y,t),\tilde{v}^{\sigma_0}(x,y,t))|(x,y) \in \Omega\}$ otherwise. The vector field $\{(\tilde{u}^{\sigma_n}(x,y,t),\tilde{v}^{\sigma_n}(x,y,t))|(x,y) \in \Omega\}$ is defined as the estimate $\{(\tilde{u}(x,y,t),\tilde{v}(x,y,t))|(x,y) \in \Omega\}$ of the velocity vector field $\{(u(x,y,t),v(x,y,t))|(x,y) \in \Omega\}$.

The vector field $\{(\tilde{u}^{\sigma_{i-1}}(x,y,t),\tilde{v}^{\sigma_{i-1}}(x,y,t))|(x,y) \in \Omega\}$ is used as an initial estimate for the solution $\{(\tilde{u}^{\sigma_i}(x,y,t),\tilde{v}^{\sigma_i}(x,y,t))|(x,y) \in \Omega\}$ of the system of equations (4-4) when the value of the parameter $\sigma$ is equal to $\sigma_i$; then an iterative procedure can be used to find the solution of the system of equations (4-4) that is the closest to the initial estimate. The quasi-Newton method for solving a system of nonlinear equations gives a good choice for the iterative procedure. This method can be described as follows.

Let $(\tilde{u}^\sigma,\tilde{v}^\sigma) = \{(\tilde{u}^\sigma(x,y,t),\tilde{v}^\sigma(x,y,t))|(x,y) \in \Omega\}$ be an estimate of the solution of the system of the nonlinear equations (5-4), which can be expressed in the following form:

$$F^\sigma(\tilde{u}^\sigma,\tilde{v}^\sigma) = 0; \quad (4\text{-}5)$$

then, if the vector field $(\Delta\tilde{u}^\sigma,\Delta\tilde{v}^\sigma) = \{(\Delta\tilde{u}^\sigma(x,y,t),\Delta\tilde{v}^\sigma(x,y,t))|(x,y) \in \Omega\}$ is not too large, the operator $F^\sigma$ can be linearly expanded as follows:

$$F^\sigma(\tilde{u}^\sigma+\Delta\tilde{u}^\sigma,\tilde{v}^\sigma+\Delta\tilde{v}^\sigma) = F^\sigma(\tilde{u}^\sigma,\tilde{v}^\sigma) + J^\sigma(\tilde{u}^\sigma,\tilde{v}^\sigma,\Delta\tilde{u}^\sigma,\Delta\tilde{v}^\sigma), \quad (4\text{-}6)$$

where $J^\sigma(\tilde{u}^\sigma,\tilde{v}^\sigma,\Delta\tilde{u}^\sigma,\Delta\tilde{v}^\sigma)$ is the Jacobian operator relative to the vector field $(\Delta\tilde{u}^\sigma,\Delta\tilde{v}^\sigma)$, which implies that it is linear and bounded with respect to such vector field.

In the quasi-Newton method the vector field $(\Delta \bar{u}^\sigma, \Delta \bar{v}^\sigma)$ is defined as a solution to the following system of linear equations:

$$M^\sigma(\bar{u}^\sigma, \bar{v}^\sigma, \Delta \bar{u}^\sigma, \Delta \bar{v}^\sigma) = -F^\sigma(\bar{u}^\sigma, \bar{v}^\sigma) \quad (4\text{-}7)$$

relative to such vector field $(\Delta \bar{u}^\sigma, \Delta \bar{v}^\sigma)$, having the following explicit form $$\frac{(\bar{g}_n^\sigma)^2 (r^2 + q^2(||\nabla \bar{u}^\sigma||^2 + ||\nabla \bar{v}^\sigma||^2)) \Delta \bar{u}^\sigma}{(\sqrt{r^2 + p^2(\bar{g}_t^\sigma)^2 + q^2(||\nabla \bar{u}^\sigma||^2 + ||\nabla \bar{v}^\sigma||^2)})^3} - \quad (4\text{-}8)$$

$$\int_S \left( s, \nabla \frac{(a^2 + (c^2 + b^2(s,\nabla \bar{g}_t^\sigma)^2)(s,\nabla \bar{v}^\sigma)^2)(s,\nabla(\Delta \bar{u}^\sigma))}{(\sqrt{a^2 + (c^2 + b^2(s,\nabla \bar{g}_t^\sigma)^2)((s,\nabla \bar{u}^\sigma)^2 + (s,\nabla \bar{v}^\sigma)^2)})^3} \right) ds + \gamma_{1,1} \Delta \bar{u}^\sigma +$$

$$\frac{\bar{g}_m^\sigma \bar{g}_n^\sigma (r^2 + q^2(||\nabla \bar{u}^\sigma||^2 + ||\nabla \bar{v}^\sigma||^2)) \Delta \bar{v}^\sigma}{(\sqrt{r^2 + p^2(\bar{g}_t^\sigma)^2 + q^2(||\nabla \bar{u}^\sigma||^2 + ||\nabla \bar{v}^\sigma||^2)})^3} +$$

$$\int_S \left( s, \nabla \frac{(c^2 + b^2(s,\nabla \bar{g}_t^\sigma)^2)(s,\nabla \bar{u}^\sigma)(s,\nabla \bar{v}^\sigma)(s,\nabla(\Delta \bar{v}^\sigma))}{(\sqrt{a^2 + (c^2 + b^2(s,\nabla \bar{g}_t^\sigma)^2)((s,\nabla \bar{u}^\sigma)^2 + (s,\nabla \bar{v}^\sigma)^2)})^3} \right) ds + \gamma_{1,2} \Delta \bar{v}^\sigma =$$

$$\frac{-\bar{g}_m^\sigma \bar{g}_t^\sigma}{(\sqrt{r^2 + p^2(\bar{g}_t^\sigma)^2 + q^2(||\nabla \bar{u}^\sigma||^2 + ||\nabla \bar{v}^\sigma||^2)})^3} +$$

$$\int_S \left( s, \nabla \frac{(s,\nabla \bar{u}^\sigma)}{\sqrt{a^2 + (c^2 + b^2(s,\nabla \bar{g}_t^\sigma)^2)((s,\nabla \bar{u}^\sigma)^2 + (s,\nabla \bar{v}^\sigma)^2)}} \right) ds - \gamma(\bar{u}^\sigma - \bar{u}_0^\sigma),$$

$$\frac{(\bar{g}_n^\sigma)^2 (r^2 + q^2(||\nabla \bar{u}^\sigma||^2 + ||\nabla \bar{v}^\sigma||^2)) \Delta \bar{v}^\sigma}{(\sqrt{r^2 + p^2(\bar{g}_t^\sigma)^2 + q^2(||\nabla u^\sigma||^2 + ||\nabla v^\sigma||^2)})^3} -$$

$$\int_S \left( s, \nabla \frac{(a^2 + (c^2 + b^2(s,\nabla \bar{g}_t^\sigma)^2)(s,\nabla \bar{v}^\sigma)^2)(s,\nabla(\Delta \bar{v}^\sigma))}{(\sqrt{a^2 + (c^2 + b^2(s,\nabla \bar{g}_t^\sigma)^2)((s,\nabla u^\sigma)^2 + (s,\nabla v^\sigma)^2)})^3} \right) ds + \gamma_{2,2} \Delta \bar{v}^\sigma +$$

$$\frac{\bar{g}_m^\sigma \bar{g}_t^\sigma (r^2 + q^2(||\nabla \bar{u}^\sigma||^2 + ||\nabla \bar{v}^\sigma||^2)) \Delta \bar{v}^\sigma}{(\sqrt{r^2 + p^2(\bar{g}_t^\sigma)^2 + q^2(||\nabla \bar{u}^\sigma||^2 + ||\nabla \bar{v}^\sigma||^2)})^3} +$$

$$\int_S \left( s, \nabla \frac{(c^2 + b^2(s,\nabla \bar{g}_t^\sigma)^2)(s,\nabla \bar{u}^\sigma)(s,\nabla \bar{v}^\sigma)(s,\nabla(\Delta \bar{u}^\sigma))}{(\sqrt{a^2 + (c^2 + b^2(s,\nabla \bar{g}_t^\sigma)^2)((s,\nabla \bar{u}^\sigma)^2 + (s,\nabla \bar{v}^\sigma)^2)})^3} \right) ds + \gamma_{2,1} \Delta \bar{u}^\sigma =$$

$$\frac{-\bar{g}_m^\sigma \bar{g}_n^\sigma}{(\sqrt{r^2 + p^2(\bar{g}_t^\sigma)^2 + q^2(||\nabla \bar{u}^\sigma||^2 + ||\nabla \bar{v}^\sigma||^2)})^3} +$$

$$\int_S \left( s, \nabla \frac{(s,\nabla \bar{v}^\sigma)}{\sqrt{a^2 + (c^2 + b^2(s,\nabla \bar{g}_t^\sigma)^2)((s,\nabla \bar{u}^\sigma)^2 + (s,\nabla \bar{v}^\sigma)^2)}} \right) ds - \gamma(\bar{v}^\sigma - \bar{v}_0^\sigma).$$

The linear, with respect to the vector field $(\Delta \bar{u}^\sigma, \Delta \bar{v}^\sigma)$, operator $M^\sigma(\bar{u}^\sigma, \bar{v}^\sigma, \Delta \bar{u}^\sigma, \Delta \bar{v}^\sigma)$ appearing in the system of linear equations (4-7) was obtained from the Jacobian operator $J^\sigma(\bar{u}^\sigma, \bar{v}^\sigma, \Delta \bar{u}^\sigma, \Delta \bar{v}^\sigma)$ by omitting the terms involving second-order partial derivatives of the image functions and by substituting the linear term $\gamma \Delta \bar{u}^\sigma$ with the linear term $\gamma_{1,1} \Delta \bar{u}^\sigma + \gamma_{1,2} \Delta \bar{v}^\sigma$, and the linear term $\gamma \Delta \bar{v}^\sigma$ with the linear term $\gamma_{2,1} \Delta \bar{u}^\sigma + \gamma_{2,2} \Delta \bar{v}^\sigma$, where the functions $\gamma_{i,j} = \gamma_{i,j}(x,y,t)$, i,j = 1,2 are defined in such a way that the following quadratic form $$\gamma_{1,1}(x,y,t) \Delta \bar{u}^\sigma(x,y,t) \Delta \bar{u}^\sigma(x,y,t) + \gamma_{1,2}(x,y,t) \Delta \bar{u}^\sigma(x,y,t) \Delta \bar{v}^\sigma(x,y,t) \quad (4\text{-}9)$$
$$+$$
$$\gamma_{2,1}(x,y,t) \Delta \bar{v}^\sigma(x,y,t) \Delta \bar{u}^\sigma(x,y,t) + \gamma_{2,2}(x,y,t) \Delta \bar{v}^\sigma(x,y,t) \Delta \bar{v}^\sigma(x,y,t)$$

is symmetric and positive definite for every $(x,y) \in \Omega$. It is not difficult to see that the system of linear equations (4-8) is the symmetric one. Also, taking into account that the quadratic form obtained as the result of the scalar product of the vector field $\{(\Delta \bar{u}^\sigma(x,y,t), \Delta \bar{v}^\sigma(x,y,t)) | (x,y) \in \Omega\}$ and the vector field given by the left-hand side of the relation (4-8) is identically equal to the quadratic form (3-10) if the linear term $\gamma_{1,1} \Delta \bar{u}^\sigma + \gamma_{1,2} \Delta \bar{v}^\sigma$ is substituted with the linear term $\gamma \Delta \bar{u}^\sigma$ in the first equation, while the linear term $\gamma_{2,1} \Delta \bar{u}^\sigma + \gamma_{2,2} \Delta \bar{v}^\sigma$ is substituted with the linear term $\gamma \Delta \bar{v}^\sigma$ in the second equation, and is, therefore, positive definite, we can conclude that the system of linear equations (4-8) is the positive definite one.

The following relations are used to define the updated estimate $\{(\hat{u}^\sigma(x,y,t),\hat{v}^\sigma(x,y,t))|(x,y) \in \Omega\}$ of the solution of the system of nonlinear equations (4-4):

$$\hat{M}^\sigma(x,y,t) = \bar{u}^\sigma(x,y,t) + \omega \Delta \bar{u}^\sigma(x,y,t), \quad (4\text{-}10)$$

$$\hat{v}^\sigma(x,y,t) = \bar{v}^\sigma(x,y,t) + \omega \Delta \bar{v}^\sigma(x,y,t), \quad (4\text{-}11)$$

where the parameter $\omega$ is selected in such a way that the following function is minimized:

$$f^\sigma(\omega) = \int\int_\Omega [F^\sigma(\bar{u}^\sigma + \omega\Delta\bar{u}^\sigma, \bar{v}^\sigma + \omega\Delta\bar{v}^\sigma)]^2 dx\, dy. \quad (4\text{-}12)$$

The updated estimate $\{(\hat{u}^\sigma(x,y,t),\hat{v}^\sigma(x,y,t))|(x,y) \in \Omega\}$ is taken as a new estimate $\{(\bar{u}^\sigma(x,y,t),\bar{v}^\sigma(x,y,t))|(x,y) \in \Omega\}$ of the solution of the system of nonlinear equations (4-4) and the process is repeated until the convergence criterion is met.

Finite-Difference Discretization of the System of Nonlinear Equations

Although the theoretical analysis for the computation of the estimate of the velocity vector field can be effectively performed in the case when the irradiance function $g^*(x,y,t)$ is given for every point $(x,y)$ of the image plane $R^2$ and every time moment $t$ of the real line $R$, while the velocity vector $(u(x,y,t),v(x,y,t))$ is defined for every image point $(x,y) \in \Omega$ and every time moment $t \in T$, the actual computation can only be accomplished on finite subsets of the above data sets. In this section a finite-difference discretization of the system of nonlinear equations (4-4) is described. The estimate of the velocity vector field is then defined as a solution of the resulted system of a finite number of nonlinear equations.

We shall assume that for every $t \in T$, and for every $\sigma = \sigma_0, \sigma_1, \ldots, \sigma_n$, the irradiance function $g^*(x,y,t)$ is given at the points $(x,y)$ belonging to the following subset of the image plane:

$$R^2(h'_{\sigma,1},h'_{\sigma,2}) = \{(x',y')|(x',y') = i_1 h'_{\sigma,1}\, i_2 h'_{\sigma,2},\, i_1,i_2 \in Z\}. \quad (5\text{-}1)$$

Here, $Z$ is the set of integers; $h'_{\sigma,1}, h'_{\sigma,2}$ are two-dimensional real vectors; and $i_1 h'_{\sigma,1} + i_2 h'_{\sigma,2}$ is a linear combination of such vectors with integer coefficients $i_1, i_2$. The points from the subset $R^2(h'_{\sigma,1},h'_{\sigma,2})$ will be called sampled points corresponding to the parameter $\sigma$.

We shall restrict ourselves to the case when each subset $R^2(h'_{\sigma,1},h'_{\sigma,2})$, $\sigma = \sigma_0, \sigma_1, \ldots, \sigma_n$, forms a square grid of points on the image plane. In other words, we shall require that the vectors $h'_{\sigma,1}, h'_{\sigma,2}$ be of equal length and orthogonal to each other for every $\sigma = \sigma_0, \sigma_1, \ldots, \sigma_n$. We shall also require that such grids of points constitute a pyramid on the image plane, which means that the following relation is satisfied:

$$R^2(h'_{\sigma_n,1},h'_{\sigma_n,2}) \subset R^2(h'_{\sigma_n,1},h'_{\sigma_n,2}) \subset \cdots \subset R^2(h'_{\sigma_0,1},h'_{\sigma_0,2}). \quad (5\text{-}2)$$

The grid rotation method is a commonly used sampling method that complies with the above requirements. In this method the vectors $h'_{\sigma_0,1}, h'_{\sigma_0,2}$ are selected to be of equal length and orthogonal to each other; then for every $k=1, \ldots, n$ the vectors $h'_{\sigma_k,1}, h'_{\sigma_k,2}$ are defined as in the relations $$h'_{\sigma_k,1} = 0.5(h'_{\sigma_{k-1},1} + h'_{\sigma_{k-1},2}), \quad (5\text{-}3)$$

$$h'_{\sigma_k,2} = 0.5(h'_{\sigma_{k-1},1} - h'_{\sigma_{k-1},2}). \quad (5\text{-}4)$$

It is not difficult to see that the above defined vectors $h'_{\sigma_k,1}, h'_{\sigma_k,2}$ are of equal length and are orthogonal to each other for every $k=0, 1, \ldots, n$, and that the relation (5-2) is satisfied.

Let $k'$ be a positive-interger constant and $\phi \in \phi(R^3)$ be a given measurement function. Then for every time moment $t \in T$, and for every parameter value $\sigma = \sigma_0, \sigma_1, \ldots, \sigma_n$, the parametric time-varying image function $g^\sigma(x,y,t)$ and its partial derivatives $g_x^\sigma(x,y,t), g_y^\sigma(x,y,t)$ are defined on the set $\Omega$ as follows.

Let us, first, assume that the image point $(x,y) \in \Omega''(h''_{\sigma,1},h''_{\sigma,2}) \cap R^2(h''_{\sigma,1},h''_{\sigma,2})$. Here the two-dimensional real vectors $h''_{\sigma,1}, h''_{\sigma,2}$ are defined as in relations $$h''_{\sigma,1} = \kappa' h'_{\sigma,1}, \quad (5\text{-}5)$$

$$h''_{\sigma,2} = \kappa' h'_{\sigma,2}, \quad (5\text{-}6)$$

while the subset $\Omega''(h''_{\sigma,1},h''_{\sigma,2}) \subset R^2$ is defined as in the relation $$\Omega''(h_{\sigma,1}'',h_{\sigma,2}'') = \quad (5\text{-}7)$$

$$\bigcup_{\substack{-1.0s\,\theta_1\,s+1.0 \\ -1.0s\,\theta_2\,s+1.0}} \{(x,y) + \theta_1 h''_{\sigma,1} + \theta_2 h''_{\sigma,2} \theta | (x,y) \in \Omega\}.$$

Then the values of the parametric time-varying image function $g^\sigma(x,y,t)$ and its partial derivatives $g_x^\sigma(x,y,t), g_y^\sigma(x,y,t)$ are given by the following relations:

$$g^\sigma(x,y,t) = \quad (5\text{-}8)$$

$$\frac{1}{\sigma^2} \sum\sum_{(x',y') \in R^2(h_{\sigma,1}',h_{\sigma,2}')} g^*(x',y',t)\phi((x'-x)/\sigma,(y'-y)/\sigma,0),$$

$$g_x^\sigma(x,y,t) = \quad (5\text{-}9)$$

$$-\frac{1}{\sigma^3} \sum\sum_{(x',y') \in R^2(h_{\sigma,1}',h_{\sigma,2}')} g^*(x',y',t)\phi_x((x'-x)/\sigma,(y'-y)/\sigma,0),$$

$$g_y^\sigma(x,y,t) = \quad (5\text{-}10)$$

$$-\frac{1}{\sigma^3} \sum\sum_{(x',y') \in R^2(h_{\sigma,1}',h_{\sigma,2}')} g^*(x',y',t)\phi_y((x'-x)/\sigma,(y'-y)/\sigma,0).$$

Figure 4:
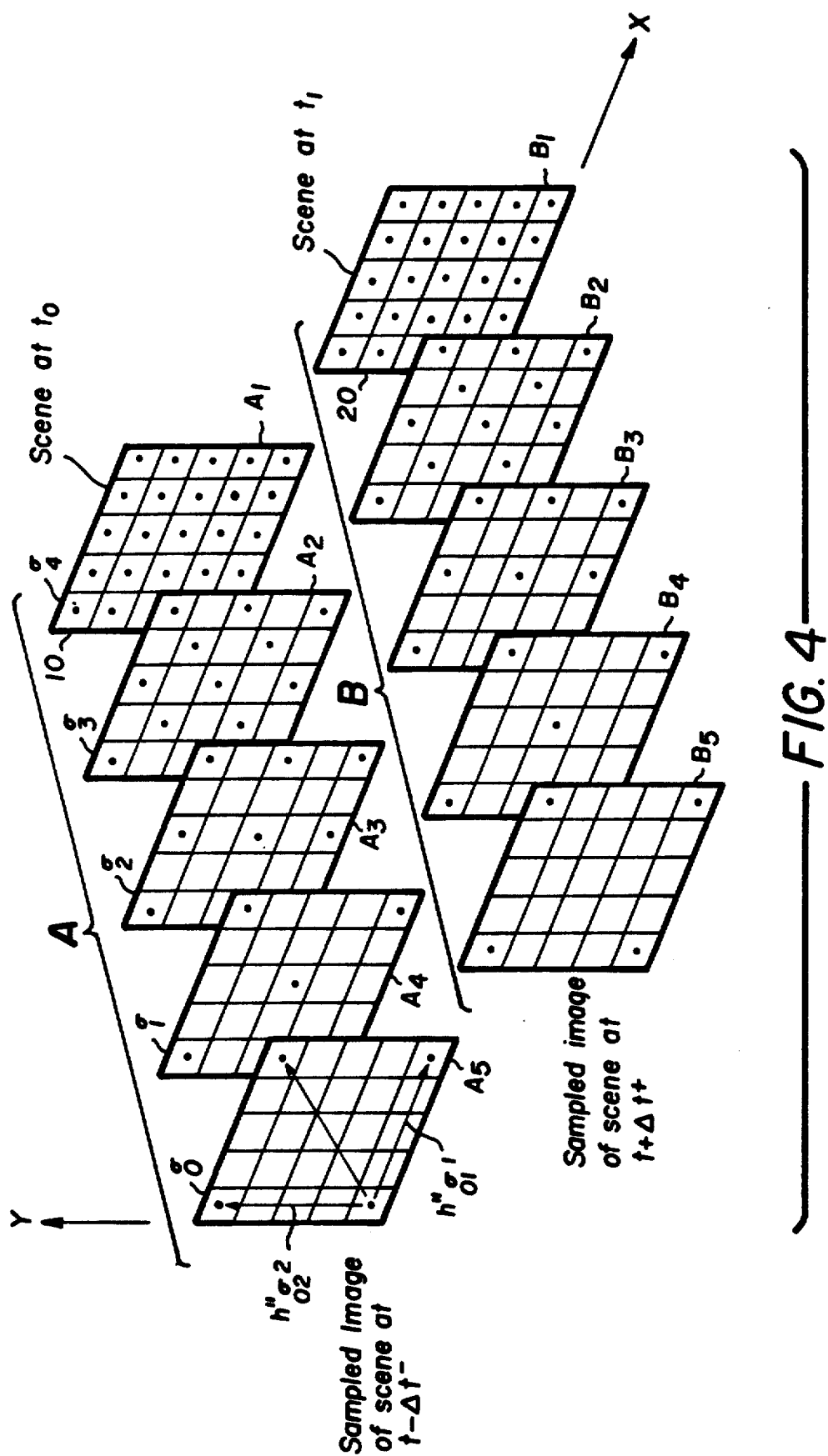
FIG. 4 illustrates levels of a resolution pyramid useful in understanding the operation of the preferred embodiment.

In FIG. 4 two resolution pyramids specifying the sampling of the two successive images of the time-varying image sequence are shown. The resolution pyramid A corresponds to the image at time $t - \Delta t^-$ and the resolution pyramid B corresponds to the image at time $t + \Delta t^+$. Each coarser level of the resolution pyramid is defined by subsampling the finer level. Each resolution pyramid is shown having five levels of resolution, the coarsest being $A_5$ and the finest being $A_1$ for the A pyramid and likewise $B_5$ being the coarsest with $B_1$ being the finest for the B pyramid. Although only five levels are shown, more or less can be used dependent on the magnitudes of the motions to be resolved. More levels provide the ability to resolve a layer motion with a high degree of accuracy. With a lesser number of levels a limitation is placed on the magnitude of the motions and the accuracy of their resolution. The value of the image at each sampled point is defined by correlating the array of weights representing the measurement function with the digitized image irradiance function and stored in a computer memory.

Let (x,y) be any image point from the set $\Omega$; then for some integer numbers $i_1$, $i_2$ and for some real numbers $\theta_1$, $\theta_2$ from the interval [0,1] the following relation is satisfied:

$$(x,y) = (i_1 + \theta_1)h''_{\sigma,1} + (i_2 + \theta_2)h''_{\sigma,2}. \quad (5\text{-}11)$$

Then the values of the parametric time-varying image function $g^\sigma(x,y,t)$ and its partial derivatives $g_x^\sigma(x,y,t)$, $g_y^\sigma(x,y,t)$ are obtained through the following bilinear interpolations:

$$g^\sigma(x,y,t) = (1-\theta_2)((1-\theta_1)g^\sigma(x_{1,1},y_{1,1},t) + \theta_1 g^\sigma(x_{1,2},y_{1,2},t)) + \quad (5\text{-}12)$$
$$\theta_2((1-\theta_1)g^\sigma(x_{2,1},y_{2,1},t) + \theta_1 g^\sigma(x_{2,2},y_{2,2},t)),$$

$$g_x^\sigma(x,y,t) = (1-\theta_2)((1-\theta_1)g_x^\sigma(x_{1,1},y_{1,1},t) + \theta_1 g_x^\sigma(x_{1,2},y_{1,2},t)) + \quad (5\text{-}13)$$
$$\theta_2((1-\theta_1)g_x^\sigma(x_{2,1},y_{2,1},t) + \theta_1 g_x^\sigma(x_{2,2},y_{2,2},t)),$$

$$g_y^\sigma(x,y,t) = (1-\theta_2)((1-\theta_1)g_y^\sigma(x_{1,1},y_{1,1},t) + \theta_1 g_y^\sigma(x_{1,2},y_{1,2},t)) + \quad (5\text{-}14)$$
$$\theta_2((1-\theta_1)g_y^\sigma(x_{2,1},y_{2,1},t) + \theta_1 g_y^\sigma(x_{2,2},y_{2,2},t)),$$

of the specified by the relations (5-8), (5-9), (5-10) values of the parametric time-varying image function $g^\sigma(x,y,t)$ and, respectively, its partial derivatives $g_x^\sigma(x,y,t)$, $g_y^\sigma(x,y,t)$ at the points from the subset $\Omega''(h''_{\sigma,1}, h''_{\sigma,2}) \cap R^2(h''_{\sigma,1}, h''_{\sigma,2})$ given as in the relations $$(x_{1,1}, y_{1,1}) = i_1 h_{\sigma,1}'' + i_2 h_{\sigma,2}'', \quad (5\text{-}15)$$
$$(x_{1,2}, y_{1,2}) = (i_1+1)h_{\sigma,1}'' + i_2 h_{\sigma,2}'', \quad (5\text{-}16)$$
$$(x_{2,1}, y_{2,1}) = i_1 h_{\sigma,1}'' + (i_2+1) h_{\sigma,2}'', \quad (5\text{-}17)$$
$$(x_{2,2}, y_{2,2}) = (i_1+1)h_{\sigma,1}'' + (i_2+1) h_{\sigma,2}''. \quad (5\text{-}18)$$

Figure 5:
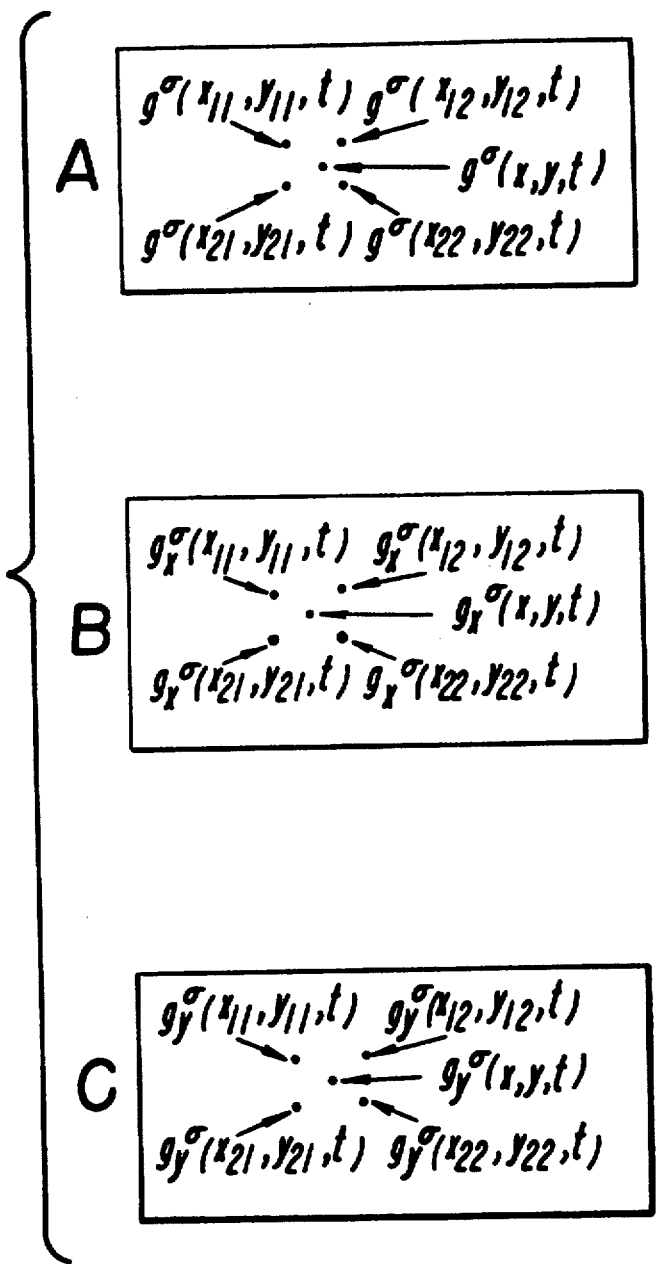
FIG. 5 illustrates points corresponding to parametric time-varying image function.
Figure 7A:
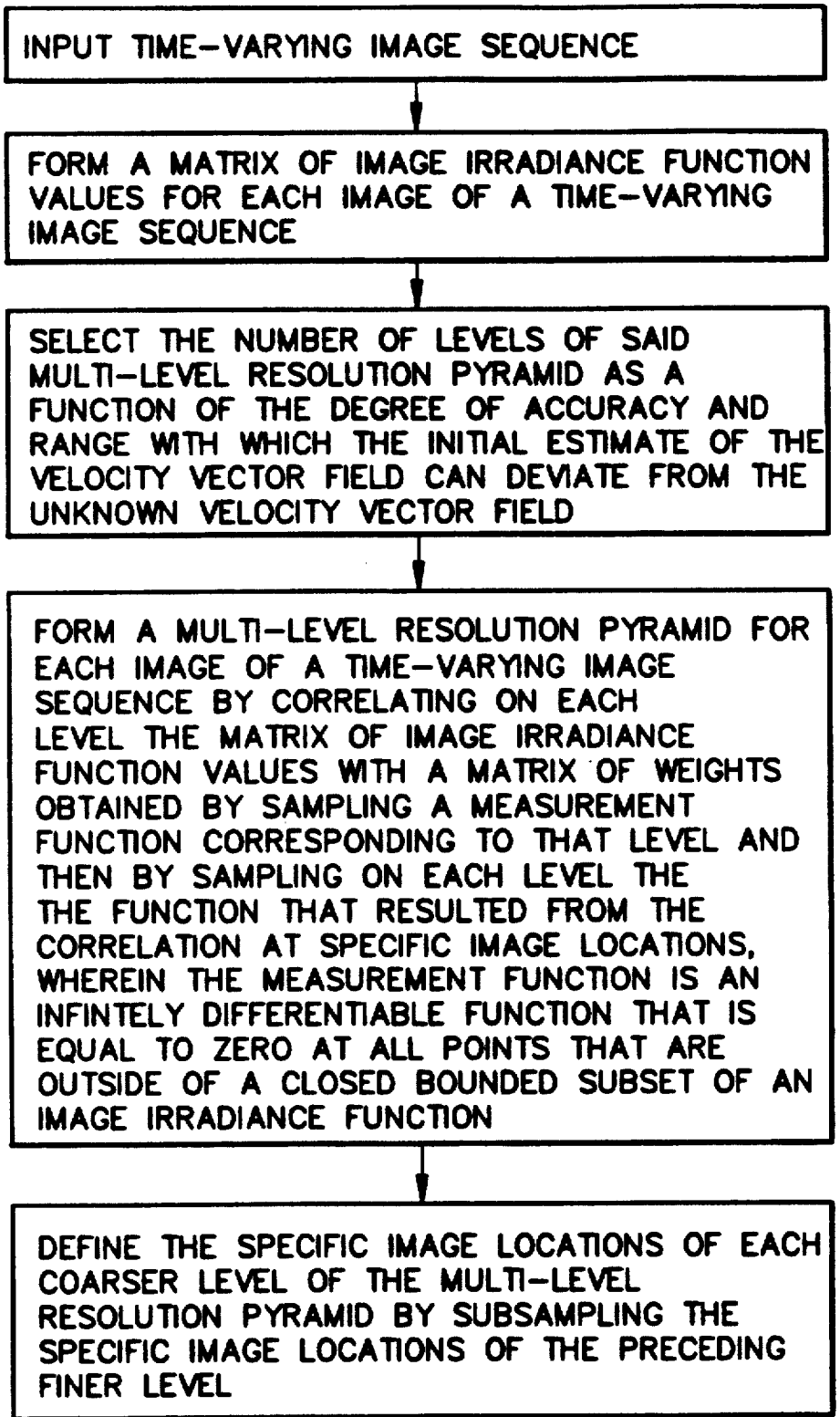
FIGS. 7A through 7C illustrate a flow chart of an embodiment of the method of the present invention.
Figure 7B:
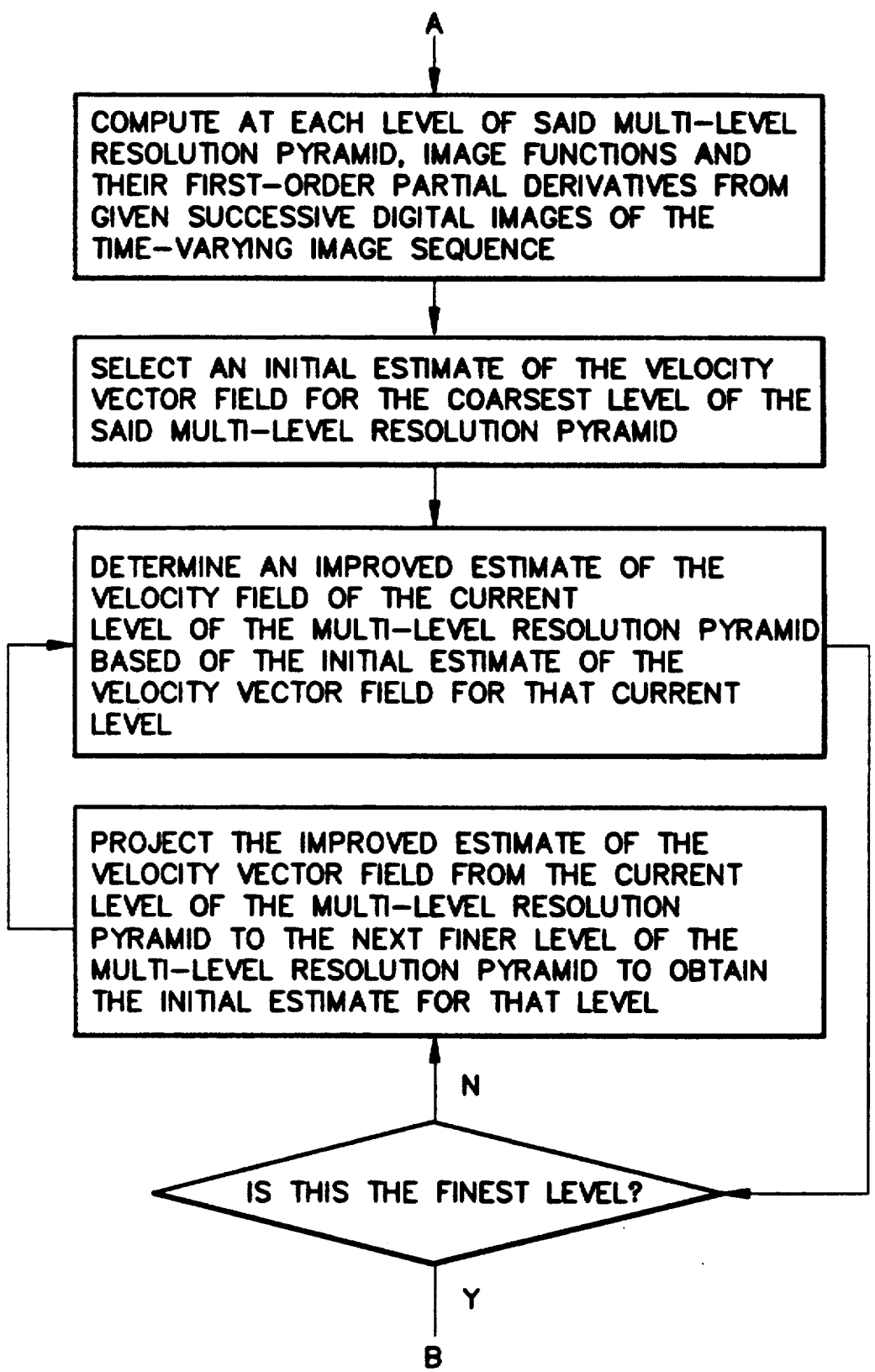
Figure 7C:
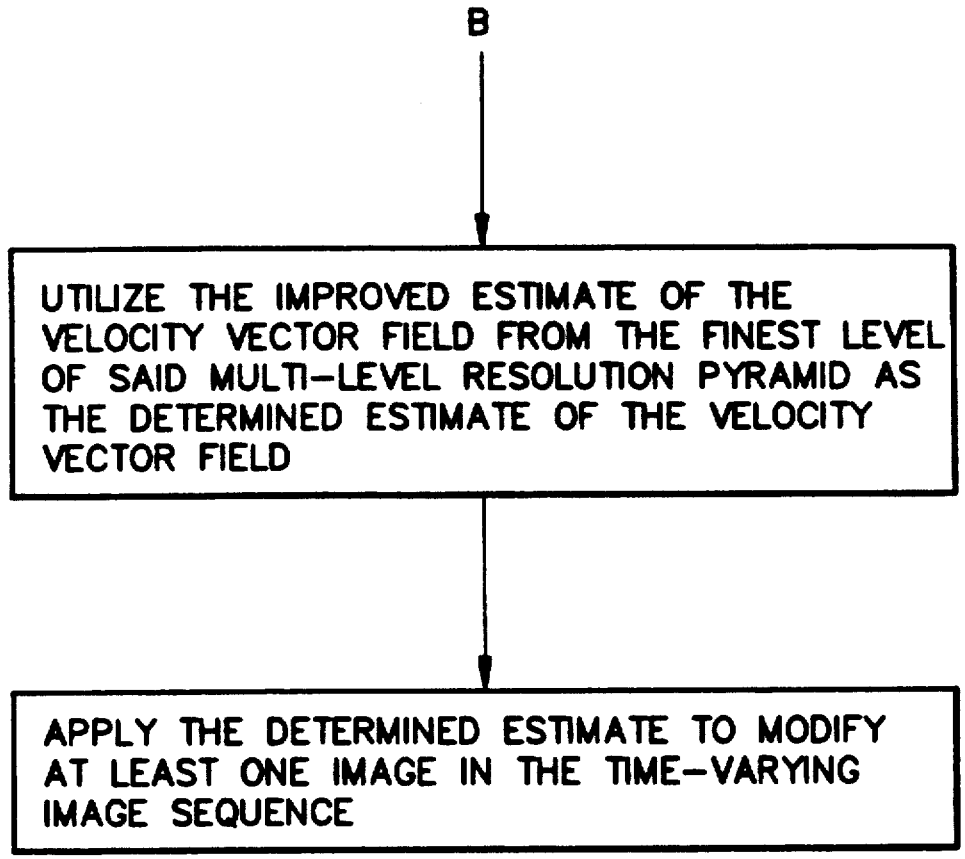

FIGS. 5A, 5B and 5C represent the Equations 6-12, 6-13 and 6-14, respectively.

Let $k''$ be a positive-integer constant, and let $h_{\sigma,1}$, $h_{\sigma,2}$ be two-dimensional real vectors defined as in the relations $$h_{\sigma,1} = \kappa'' h''_{\sigma,1}, \quad (5\text{-}19)$$

$$h_{\sigma,2} = \kappa'' h''_{\sigma,2}, \quad (5\text{-}20)$$

while the subset $\Omega(h_{\sigma,1}, h_{\sigma,2}) \subset \Omega$ will be defined as in the relation $$\Omega(h_{\sigma,1}, h_{\sigma,2}) = \Omega \cap R^2(h_{\sigma,1}, h_{\sigma,2}). \quad (5\text{-}21)$$

The finite-difference discretizations of the system of nonlinear equations (4-4) and of the system of linear equations (4-8), both corresponding to the parameter $\sigma = \sigma_0, \sigma_1, \ldots, \sigma_n$ and to the time moment $t \in T$, are defined on the set $\Omega(h_{\sigma,1}, h_{\sigma,2})$ as, respectively, the system of nonlinear equations relative to the unknown vector field $\{(\bar{u}^\sigma(x,y,t), \bar{v}^\sigma(x,y,t)) | (x,y) \in \Omega(h_{\sigma,1}, h_{\sigma,2})\}$ and its finite differences, and the system of linear equations relative to the unknown vector field $\{(\Delta \bar{u}^\sigma(x,y,t), \Delta \bar{v}^\sigma(x,y,t)) | (x,y) \in \Omega(h_{\sigma,1}, h_{\sigma,2})\}$ and its finite differences, as follows.

The expressions appearing under the integral signs over the set S in the system of nonlinear equations (4-4) and in the system of linear equations (4-8) have the following general form $$(s, \nabla f(x,y,t,s)). \quad (5\text{-}22)$$

where $f(x,y,t,s)$ is a function of the variables $(x,y) \in \Omega$, $t \in T$, $s \in S$, which is continuously differentiable with respect to the variables $(x,y)$.

The circle S on the image plane $R^2$ defined by the relation (2-3) will be replaced with a finite subset, denoted by the same symbol S, of the set $R^2(h_{\sigma,1}, h_{\sigma,2})$ having the following properties: the set S does not contain the origin, and for every element s belonging to the set S the element $-s$ also belongs to the set S. The measure ds will be replaced with the point measure associating the value 0.5 to every element $s \in S$.

As a consequence of the above actions, an integral over the set S of values of any expression of the form (5-22) becomes a finite sum over the set S of values of such expression. In other words, the following relation is satisfied:

$$\int_S (s, \nabla f(x,y,t,s)) ds = \sum_{s \in S} 0.5(s, \nabla f(x,y,t,s)). \quad (5\text{-}23)$$

Given a function $f(x,y,t,s)$ that is continuously differentiable with respect to the variable $(x,y) \in \Omega$ for every fixed value of the time variable $t \in T$, and given an element $s \in S$, the expression (5-22) will be defined on the set $R^2(h_{\sigma,1}, h_{\sigma,2})$ in terms of the finite-difference approximations to the partial derivatives as follows:

$$(s, \nabla f(x,y,t,s)) = p_s(f(x+0.5s_x, y+0.5s_y, t, s) - f(x-0.5s_x, y-0.5s_y, t, s)). \quad (5\text{-}24)$$

where: $p_s$ is a real positive constant depending on the length of the vector s as a parameter, and the values $s_x$, $s_y$ are the components of the vector s as shown below $$s = (s_x, s_y). \quad (5\text{-}25)$$

If we take into account the relation (5-24) and the fact that the set S has a property that for every element $s \in S$ the element $-s \in S$, the sum appearing in the relation (5-23) can be expressed as $$\sum_{s \in S} 0.5(s, \nabla f(x,y,t,s)) = \sum_{s \in S} p_s f(x + 0.5s_x, y + 0.5s_y, t, s) \quad (5\text{-}26)$$

in the case when $f(x,y,t,s)$ is an odd function with respect to the variable s.

Based on the above discussion, the system of nonlinear equations (4-4) can be defined on the set $R^2(h_{\sigma,1}, h_{\sigma,2})$ as follows:

$$\frac{\bar{g}_t^\sigma \bar{g}_j^\sigma}{\sqrt{r^2 + p^2 (g_t^\sigma)^2 + q^2(||\nabla \bar{u}^\sigma||^2 + ||\nabla \bar{v}^\sigma||^2)}} - \quad (5\text{-}27)$$

$$\sum_{s \in S} \frac{p_s(s, \nabla \bar{u}^\sigma)}{\sqrt{a^2 + (c^2 + b^2(s, \nabla \bar{g}_j^\sigma)^2)((s, \nabla \bar{u}^\sigma)^2 + (s, \nabla \bar{v}^\sigma)^2)}} +$$

$$\gamma(\bar{u}^\sigma - \bar{u}_0^\sigma) = 0,$$

-continued $$-\frac{\tilde{g}_{t^{\sigma}}\tilde{g}_{t^{\sigma}}}{\sqrt{r^2 + p^2(\tilde{g}_{t^{\sigma}})^2 + q^2(||\nabla\tilde{u}^{\sigma}||^2 + ||\nabla\tilde{v}^{\sigma}||^2)}} -$$

$$\sum_{s\in S}\frac{\rho_s(s,\nabla\tilde{v}^{\sigma})}{\sqrt{a^2 + (c^2 + b^2(s,\nabla\tilde{g}_{t^{\sigma}})^2)((s,\nabla\tilde{u}^{\sigma})^2 + (s,\nabla\tilde{v}^{\sigma})^2)}} +$$

$$\gamma(\tilde{v}^{\sigma} - \tilde{v}_0^{\sigma}) = 0,$$

and the system of linear equations (4-8) can be defined on the set $R^2(h_{\sigma,1}, h_{\sigma,2})$ as follows:

$$\frac{(\tilde{g}_{t^{\sigma}})^2(r^2 + q^2(||\nabla\tilde{u}^{\sigma}||^2 + ||\nabla\tilde{v}^{\sigma}||^2))\Delta\tilde{u}^{\sigma}}{(\sqrt{r^2 + p^2(\tilde{g}_{t^{\sigma}})^2 + q^2(||\nabla\tilde{u}^{\sigma}||^2 + ||\nabla\tilde{v}^{\sigma}||^2)})^3} - \tag{5-28}$$

$$\sum_{s\in S}\frac{\rho_s(a^2 + (c^2 + b^2(s,\nabla\tilde{g}_{t^{\sigma}})^2)(s,\nabla\tilde{v}^{\sigma})^2)(s,\nabla(\Delta\tilde{u}^{\sigma}))}{(\sqrt{a^2 + (c^2 + b^2(s,\nabla\tilde{g}_{t^{\sigma}})^2)((s,\nabla\tilde{u}^{\sigma})^2 + (s,\nabla\tilde{v}^{\sigma})^2)})^3} +$$

$$\gamma_{1,1}\Delta\tilde{u}^{\sigma} + \frac{\tilde{g}_{t^{\sigma}}\tilde{g}_{t^{\sigma}}(r^2 + q^2(||\nabla\tilde{u}^{\sigma}||^2 + ||\nabla\tilde{v}^{\sigma}||^2))\Delta\tilde{v}^{\sigma}}{(\sqrt{r^2 + p^2(\tilde{g}_{t^{\sigma}})^2 + q^2(||\nabla\tilde{u}^{\sigma}||^2 + ||\nabla\tilde{v}^{\sigma}||^2)})^3} +$$

$$\sum_{s\in S}\frac{\rho_s(c^2 + b^2(s,\nabla\tilde{g}_{t^{\sigma}})^2)(s,\nabla\tilde{u}^{\sigma})(s,\nabla\tilde{v}^{\sigma})(s,\nabla(\Delta\tilde{v}^{\sigma}))}{(\sqrt{a^2 + (c^2 + b^2(s,\nabla\tilde{g}_{t^{\sigma}})^2)((s,\nabla\tilde{u}^{\sigma})^2 + (s,\nabla\tilde{v}^{\sigma})2)})^3} +$$

$$\gamma_{1,2}\Delta\tilde{v}^{\sigma} = \frac{-\tilde{g}_{t^{\sigma}}\tilde{g}_{t^{\sigma}}}{(\sqrt{r^2 + p^2(\tilde{g}_{t^{\sigma}})^2 + q^2(||\nabla\tilde{u}^{\sigma}||^2 + ||\nabla\tilde{v}^{\sigma}||^2)})} +$$

$$\sum_{s\in S}\frac{\rho_s(s,\nabla\tilde{u}^{\sigma})}{(\sqrt{a^2 + (c^2 + b^2(s,\nabla\tilde{g}_{t^{\sigma}})^2)((s,\nabla\tilde{u}^{\sigma})^2 + (s,\nabla\tilde{v}^{\sigma})^2)})} -$$

$$\gamma(\tilde{u}^{\sigma} - \tilde{u}_0^{\sigma}),$$

$$\frac{(\tilde{g}_{t^{\sigma}})^2(r^2 + q^2(||\nabla\tilde{u}^{\sigma}||^2 + ||\nabla\tilde{v}^{\sigma}||^2))\Delta\tilde{v}^{\sigma}}{(\sqrt{r^2 + p^2(\tilde{g}_{t^{\sigma}})^2 + q^2(||\nabla\tilde{u}^{\sigma}||^2 + ||\nabla\tilde{v}^{\sigma}||^2)})^3} -$$

$$\sum_{s\in S}\frac{\rho_s(a^2 + (c^2 + b^2(s,\nabla\tilde{g}_{t^{\sigma}})^2)(s,\nabla\tilde{v}^{\sigma})^2)(s,\nabla(\Delta\tilde{v}^{\sigma}))}{(\sqrt{a^2 + (c^2 + b^2(s,\nabla\tilde{g}_{t^{\sigma}})^2)((s,\nabla\tilde{u}^{\sigma})^2 + (s,\nabla\tilde{v}^{\sigma})^2)})^3} +$$

$$\gamma_{2,2}\Delta\tilde{v}^{\sigma} + \frac{\tilde{g}_{t^{\sigma}}\tilde{g}_{t^{\sigma}}(r^2 + q^2(||\nabla\tilde{u}^{\sigma}||^2 + ||\nabla\tilde{v}^{\sigma}||^2))\Delta\tilde{u}^{\sigma}}{(\sqrt{r^2 + p^2(\tilde{g}_{t^{\sigma}})^2 + q^2(||\nabla\tilde{u}^{\sigma}||^2 + ||\nabla\tilde{v}^{\sigma}||^2)})^3} +$$

$$\sum_{s\in S}\frac{\rho_s(c^2 + b^2(s,\nabla\tilde{g}_{t^{\sigma}})^2)(s,\nabla\tilde{u}^{\sigma})(s,\nabla\tilde{v}^{\sigma})(s,\nabla(\Delta\tilde{u}^{\sigma}))}{(\sqrt{a^2 + (c^2 + b^2(s,\nabla\tilde{g}_{t^{\sigma}})^2)((s,\nabla\tilde{u}^{\sigma})^2 + (s,\nabla\tilde{v}^{\sigma})^2)})^3} +$$

$$\gamma_{2,1}\Delta\tilde{u}^{\sigma} = \frac{-\tilde{g}_{t^{\sigma}}\tilde{g}_{t^{\sigma}}}{(\sqrt{r^2 + p^2(\tilde{g}_{t^{\sigma}})^2 + q^2(||\nabla\tilde{u}^{\sigma}||^2 + ||\nabla\tilde{v}^{\sigma}||^2)})^3} +$$

$$\sum_{s\in S}\frac{\rho_s(s,\nabla\tilde{v}^{\sigma})}{(\sqrt{a^2 + (c^2 + b^2(s,\nabla\tilde{g}_{t^{\sigma}})^2)((s,\nabla\tilde{u}^{\sigma})^2 + (s,\nabla\tilde{v}^{\sigma})^2)})} -$$

$$\gamma(\tilde{v}^{\sigma} - \tilde{v}_0^{\sigma}).$$

The arguments of the functions appearing in the relations (5-27), (5-28) have been omitted for the sake of simplicity of notation. The functions appearing under the summation signs with respect to s are evaluated at the points $(x+0.5s_x, y+0.5s_y, t)$, while the rest of functions are evaluated at the points $(x,y,t)$, for $(x,y) \in R^2(h_{\sigma,1}, h_{\sigma,2})$, $t \in T$, $s=(s_x,s_y) \in S$. The functions $\tilde{g}_t^{\sigma}$, $\tilde{g}_{t\tilde{u}}^{\sigma}$, $\tilde{g}_{t\tilde{v}}^{\sigma}$ are defined, respectively, as in the relations (2-1), (3-6), (3-7) shown in FIGS. 6A, 6B and 6C, respectively. The functions $||\nabla\tilde{u}^{\sigma}||^2$, $||\nabla\tilde{v}^{\sigma}||^2$ are defined as in the relations $$||\nabla\tilde{u}^{\sigma}||^2 = ||\nabla\tilde{u}^{\sigma}(x,y,t)||^2 = \tag{5-29}$$

$$\sum_{s\in S}\rho_s^2(\tilde{u}^{\sigma}(x + s_x, y + s_y, t) - \tilde{u}^{\sigma}(x,y,t))^2.$$

$$||\nabla\tilde{v}^{\sigma}||^2 = ||\nabla\tilde{v}^{\sigma}(x,y,t)||^2 = \tag{5-30}$$

$$\sum_{s\in S}\rho_s^2(\tilde{v}^{\sigma}(x + s_x, y + s_y, t) - \tilde{v}^{\sigma}(x,y,t))^2.$$

The functions $(s,\nabla\tilde{u}^{\sigma})$, $(s,\nabla\tilde{v}^{\sigma})$ are defined by the relations $$(s,\nabla\tilde{u}^{\sigma}) = (s,\nabla\tilde{u}^{\sigma}(x+0.5s_x,t)) = \rho_s(\tilde{u}^{\sigma}(x+s_x,y+s_y,t) - \tilde{u}^{\sigma}(x,y,t)). \tag{5-31}$$

$$(s,\nabla\tilde{v}^{\sigma}) = (s,\nabla\tilde{v}^{\sigma}(x+0.5s_x,t)) = \rho_s(\tilde{v}^{\sigma}(x+s_x,y+s_y,t) - \tilde{v}^{\sigma}(x,y,t)). \tag{5-32}$$

and the functions $(s,\nabla(\Delta\tilde{u}^{\sigma}))$, $(s,\nabla(\Delta\tilde{v}^{\sigma}))$ are defined as in the following relations:

$$(s,\nabla(\Delta\tilde{u}^{\sigma})) = (s,\nabla(\Delta\tilde{u}^{\sigma}(x+0.5s_x,y+0.5s_y,t))) = \rho_s(\Delta\tilde{u}^{\sigma}(x+s_x,y+s_y,t) - \Delta\tilde{u}^{\sigma}(x,y,t)). \tag{5-33}$$

$$(s,\nabla(\Delta\tilde{v}^{\sigma})) = (s,\nabla(\Delta\tilde{v}^{\sigma}(x+0.5s_x,y+0.5s_y,t))) = \rho_s(\Delta\tilde{v}^{\sigma}(x+s_x,y+s_y,t) - \Delta\tilde{v}^{\sigma}(x,y,t)). \tag{5-34}$$

The function $(s,\nabla'\tilde{g}_t^{\sigma})^2$ is determined as follows:

$$(s,\nabla\tilde{g}_t^{\sigma})^2 = (s,\nabla'g_t^{\sigma}(x + 0.5s_x, y + \tag{5-35}$$

$$0.5s_y, \tilde{u}^{\sigma}(x + 0.5s_x, y + 0.5s_y, t), \tilde{v}^{\sigma}(x + 0.5s_x, y + 0.5s_y, t)))^2 =$$

$$(s,\nabla'g_t^{\sigma}(x,y,\tilde{u}^{\sigma}(x,y,t),\tilde{v}^{\sigma}(x,y,t)))^2 + (s,\nabla'g_t^{\sigma}(x + s_x, y +$$

$$s_y, \tilde{u}^{\sigma}(x + s_x, y + s_y, t), \tilde{v}^{\sigma}(x + s_x, y + s_y, t)))^2.$$

Above, for each value $(x',y',t)$, equal either to $(x,y,t)$ or to $(x+s_x, y+s_y, t)$, the value of the function $(s,\nabla'g_t^{\sigma}(x',y',u^{\sigma}(x',y',t),v^{\sigma}(x',y',t),t))^2$ is given by the relation $$(s,\nabla'g_t^{\sigma}(x',y',\tilde{u}^{\sigma}(x',y',t),\tilde{v}^{\sigma}(x',y',t)))^2 = \tag{5-36}$$

$$(0.5g_t^{\sigma}(x',y',\tilde{u}^{\sigma}(x',y',t) + ds_x,\tilde{v}^{\sigma}(x',y',t) + ds_y,t))^2 +$$

$$0.5g_t^{\sigma}(x',y',\tilde{u}^{\sigma}(x',y',t) - ds_x,\tilde{v}^{\sigma}(x',y',t) - ds_y,t))^2 -$$

$$g_t^{\sigma}(x',y',\tilde{u}^{\sigma}(x',y',t),\tilde{v}^{\sigma}(x',y',t),t))^2)/d^2$$

for some small positive constant d.

The restriction of the system of nonlinear equations (5-27) and the restriction of the system of linear equations (5-28) on the subset $\Omega(h_{\sigma,1}, h_{\sigma,2})$ of the set $R^2(h_{\sigma,1}, h_{\sigma,2})$ are both accomplished through introduction of the boundary condition as follows. For every image point $(x,y) \in \Omega(h_{\sigma,1}, h_{\sigma,2})$ and for every element $s=(s_x,s_y) \in S$ such that the point $(x+s_x, y+s_y)$ is outside the subset $\Omega(h_{\sigma,1}, h_{\sigma,2})$, the value of the estimate of the velocity vector $(\tilde{u}^{\sigma}(x+s_x,y+s_y,t), \tilde{v}^{\sigma}(x+s_x,y+s_y,t))$ is defined to be identically equal to the value of the estimate of the velocity vector $(\tilde{u}^{\sigma}(x,y,t), \tilde{v}^{\sigma}(x,y,t))$. Under these conditions the system of nonlinear equations (5-27) and the system of linear equations (5-28) are well defined for every image point $(x,y)$ from the set $\Omega(h_{\sigma,1}, h_{\sigma,2})$ and therefore form, respectively, the system of nonlinear equations relative to the unknown vector field $\{(\bar{u}^\sigma(x,y,t),\bar{v}^\sigma(x,y,t))|(x,y)\in\Omega\}(h_{\sigma,1},h_{\sigma,2})$ and its finite differences, and the system of linear equations relative to the unknown vector field $\{(\Delta\bar{u}^\sigma(x,y,t),\bar{v}^\sigma(x,y,t))|(x,y)\in\Omega\}(h_{\sigma,1},h_{\sigma,2})\}$ and its finite differences.

Let us denote by the symbol $|S|$ the number of elements of the set $S$; then for every $s=(x_x,s_y)\in S$ the constant $P_s$ can be defined as in the following relation:

$$p_s = \sqrt{(s_x^2 + s_y^2)/|S|}. \quad (5\text{-}37)$$

The following are two commonly used way of selecting the set $S$:

$$S=\{h_{\sigma,1},-h_{\sigma,1},h_{\sigma,2}-h_{\sigma,2}\}, \quad (5\text{-}38)$$

$$S=\{h_{\sigma,1},-h_{\sigma,1},h_{\sigma,2},h_{\sigma,1}+h_{\sigma,2}, \\ -h_{p,1}-h_{\sigma,2},h_{\sigma,1}-h_{\sigma,2},-h_{\sigma,1}+h_{\sigma,2}\}. \quad (5\text{-}39)$$

If the set $S$ is selected as in relation (5-38), we shall say that the five-points finite-difference discretization is used, whereas for the selection specified by relation (5-39) we shall say that the nine-points finite-difference discretization is used.

Let $k=0$, $n-1$ and let $\{(\bar{u}^{\sigma k}(x,y,t),\bar{v}^{\sigma k}(x,y,t))|(x,y)\in\Omega(h_{\sigma k,1},h_{\sigma k,2})\}$ be an estimate of the solution of the system of nonlinear equations (5-27) when the value of the parameter $\sigma$ is equal to $\sigma_k$. Then the initial estimate $\{(\bar{u}^{\sigma k+1}(x,y,t),\bar{v}^{\sigma k+1}(x,y,t))|(x,y)\in\Omega(h_{\sigma k+1,1},h_{\sigma k+1,2})\}$ of the solution of the system of nonlinear equations (5-27) when the value of the parameter $\sigma$ is equal to $\sigma_{k+1}$ is defined as follows. For every $(x,y)\in\Omega(h_{\sigma k+1,1},h_{\sigma k+1,2})$ such that $(x,y)\in\Omega(h_{\sigma k,1},h_{\sigma k,2})$, the value of the estimate $(\bar{u}^{\sigma k+1}(x,y,t),\bar{v}^{\sigma k+1}(x,y,t))$ is given by the relation $$(\bar{u}^{\sigma k+1}(x,y,t),\bar{v}^{\sigma k+1}(x,y,t)) = (\bar{u}^{\sigma k}(x,y,t),\bar{v}^{\sigma k}(x,y,t)), \quad (5\text{-}40)$$

whereas for every $(x,y)\in\Omega(h_{\sigma k+1,1},h_{\sigma k+1,2})$ such that $(x,y)\notin\Omega(h_{\sigma k,1},h_{\sigma k,2})$ the value of the estimate $(\bar{u}^{\sigma k+1}(x,y,t),\bar{v}^{\sigma k+1}(x,y,t))$ is given as in the relation $$(\bar{u}^{\sigma k+1}(x,y,t),\bar{v}^{\sigma k+1}(x,y,t)) = \quad (5\text{-}41)$$
$$\sum_{i_1,i_2=-1,+1} 0.25(\bar{u}^{\sigma k}(x_{i_1,i_2},y_{i_1,i_2},t),\bar{v}^{\sigma}(x_{i_1,i_2},y_{i_1,i_2},t))$$

where $$(x_{i_1,i_2},y_{i_1,i_2})=(x,y)+i_1 h_{\sigma k+1,1}+i_2 h_{\sigma k-1,2}. \quad (5\text{-}42)$$

If we introduce an ordering on the set $\Omega(h_{\sigma,1},h_{\sigma,2})$, then the system of linear equations (5-28) can be expressed in the matrix notation as follows:

$$M^\sigma(\bar{u}^\sigma,\bar{v}^\sigma)(\Delta\bar{u}^\sigma,\Delta\bar{v}^\sigma)^T = -F^\sigma(\bar{u}^\sigma,\bar{v}^\sigma), \quad (5\text{-}43)$$

where $(\Delta\bar{u}^\sigma,\Delta\bar{v}^\sigma)^T$ is the transpose vector of the row-vector $(\Delta\bar{u}^\sigma,\Delta\bar{u}^\sigma)$, corresponding to the vector field $\{(\Delta\bar{u}^\sigma(x,y,t),\Delta\bar{v}^\sigma(x,y,t))|(x,y)\in\Omega(h_{\sigma,1},h_{\sigma,2})\}$, which is obtained by first listing the elements of the set $\{(\bar{u}^\sigma(x,y,t)|(x,y)\in\Omega(h_{\sigma,1},h_{\sigma,2})\}$ according to the specified ordering, and then listing the elements of the set $\{(\bar{v}^\sigma(x,y,t)|(x,y)\in\Omega(h_{\sigma,1},h_{\sigma,2})\}$ according to the same ordering. The natural ordering on the set $\Omega(h_{\sigma,1},h_{\sigma,2})$ can be defined as follows. Relations (5-1) and (5-21) imply that every element $(x,y)\in\Omega(h_{\sigma,1},h_{\sigma,2})$ can be uniquely represented in the form $(x,y)=i_1 h_{\sigma,1}+i_2 h_{\sigma,2}$, where $i_1$ and $i_2$ are integer numbers. Then the element $(x,y)=i_1 h_{\sigma,1}+i_2 h_{\sigma,2}\in\Omega(h_{\sigma,1},h_{\sigma,2})$ follows the element $(x'y')=i'_1 h_{\sigma,1}+i'_2 h_{\sigma,2}\in\Omega(h_{\sigma,1},h_{\sigma,2})$ if $i_2>i'_2$ or if $i_2=i'_2$ and $i_1>i'_1$.

If we partition the square matrix $M^\sigma(\bar{u}^\sigma,\bar{v}^\sigma)$ into four square submatrices corresponding to the vectors $(\Delta\bar{u}^\sigma)$ and $(\Delta\bar{v}^\sigma)$, and partition the vector $-F^\sigma(\bar{u}^\sigma,\bar{v}^\sigma)$ into two subvectors, relation (5-43) becomes $$\begin{pmatrix} M^\sigma_{1,1}(\bar{u}^\sigma,\bar{v}^\sigma) & M^\sigma_{1,2}(\bar{u}^\sigma,\bar{v}^\sigma) \\ M^\sigma_{2,1}(\bar{u}^\sigma,\bar{v}^\sigma) & M^\sigma_{2,2}(\bar{u}^\sigma,\bar{v}^\sigma) \end{pmatrix}(\Delta\bar{u}^\sigma,\Delta\bar{v}^\sigma)^T = \begin{pmatrix} -F_1^\sigma(\bar{u}^\sigma,\bar{v}^\sigma) \\ -F_2^\sigma(\bar{u}^\sigma,\bar{v}^\sigma) \end{pmatrix} \quad (5\text{-}44)$$

where $$M^\sigma(\bar{u}^\sigma,\bar{v}^\sigma) = \begin{pmatrix} M^\sigma_{1,1}(\bar{u}^\sigma,\bar{v}^\sigma) & M^\sigma_{1,2}(\bar{u}^\sigma,\bar{v}^\sigma) \\ M^\sigma_{2,1}(\bar{u}^\sigma,\bar{v}^\sigma) & M^\sigma_{2,2}(\bar{u}^\sigma,\bar{v}^\sigma) \end{pmatrix}. \quad (5\text{-}45)$$

$$-F^\sigma(\bar{u}^\sigma,\bar{v}^\sigma) = \begin{pmatrix} -F_1^\sigma(\bar{u}^\sigma,\bar{v}^\sigma) \\ -F_2^\sigma(\bar{u}^\sigma,\bar{v}^\sigma) \end{pmatrix}.$$

Let the matrix $D_{i,j}^\sigma(\bar{u}^\sigma,\bar{v}^\sigma)$ be the diagonal part of the matrix $M_{i,j}^\sigma(\bar{u}^\sigma,\bar{v}^\sigma)$ and the matrix $-B_{i,j}^\sigma(\bar{u}^\sigma,\bar{v}^\sigma)$ the off-diagonal part of the matrix $M_{i,j}^\sigma(\bar{u}^\sigma,\bar{v}^\sigma)$ so that the following relation is satisfied:

$$M_{i,j}^\sigma(\bar{u}^\sigma,\bar{v}^\sigma)=D_{i,j}^\sigma(\bar{u}^\sigma,\bar{v}^\sigma)-B_{i,j}^\sigma(\bar{u}^\sigma,\bar{v}^\sigma) \quad (5\text{-}46)$$

for every $i,j=1,2$, and let the matrices $D^\sigma(\bar{u}^\sigma,\bar{v}^\sigma)$, $B^\sigma(\bar{u}^\sigma,\bar{v}^\sigma)$ be defined as in the relations $$D^\sigma(\bar{u}^\sigma,\bar{v}^\sigma) = \begin{pmatrix} D^\sigma_{1,1}(\bar{u}^\sigma,\bar{v}^\sigma) & D^\sigma_{1,2}(\bar{u}^\sigma,\bar{v}^\sigma) \\ D^\sigma_{2,1}(\bar{u}^\sigma,\bar{v}^\sigma) & D^\sigma_{2,2}(\bar{u}^\sigma,\bar{v}^\sigma) \end{pmatrix}, \quad (5\text{-}47)$$

$$B^\sigma(\bar{u}^\sigma,\bar{v}^\sigma) = \begin{pmatrix} B^\sigma_{1,1}(\bar{u}^\sigma,\bar{v}^\sigma) & B^\sigma_{1,2}(\bar{u}^\sigma,\bar{v}^\sigma) \\ B^\sigma_{2,1}(\bar{u}^\sigma,\bar{v}^\sigma) & B^\sigma_{2,2}(\bar{u}^\sigma,\bar{v}^\sigma) \end{pmatrix}.$$

Than the relation (5-43) takes the form $$(D^\sigma(\bar{u}^\sigma,\bar{v}^\sigma)-B^\sigma(\bar{u}^\sigma,\bar{v}^\sigma))(\Delta\bar{u}^\sigma,\Delta\bar{v}^\sigma)^T = -F^\sigma(\bar{u}^\sigma,\bar{v}^\sigma). \quad (5\text{-}48)$$

Let $C^\sigma(\bar{u}^\sigma,\bar{v}^\sigma)$ be a block lower triangular matrix defined by the relations $$C^\sigma(\bar{u}^\sigma,\bar{v}^\sigma) = \begin{pmatrix} C^\sigma_{1,1}(\bar{u}^\sigma,\bar{v}^\sigma) & 0 \\ C^\sigma_{2,1}(\bar{u}^\sigma,\bar{v}^\sigma) & C^\sigma_{2,2}(\bar{u}^\sigma,\bar{v}^\sigma) \end{pmatrix} \quad (5\text{-}49)$$

where

-continued $$C_{2,2}^{\sigma}(\overline{u}^{\sigma},\overline{v}^{\sigma}) = (D_{2,2}^{\sigma}(\overline{u}^{\sigma},\overline{v}^{\sigma}))^{\frac{1}{2}},$$

$$C_{2,1}^{\sigma}(\overline{u}^{\sigma},\overline{v}^{\sigma}) = (D_{2,1}^{\sigma}(\overline{u}^{\sigma},\overline{v}^{\sigma}))(D_{2,2}^{\sigma}(\overline{u}^{\sigma},\overline{v}^{\sigma}))^{-\frac{1}{2}},$$

$$C_{1,1}^{\sigma}(\overline{u}^{\sigma},\overline{v}^{\sigma}) = (D_{1,1}^{\sigma}(\overline{u}^{\sigma},\overline{v}^{\sigma})D_{2,2}^{\sigma}(\overline{u}^{\sigma},\overline{v}^{\sigma}) -$$

$$D_{1,2}^{\sigma}(\overline{u}^{\sigma},\overline{v}^{\sigma})D_{2,1}^{\sigma}(\overline{u}^{\sigma},\overline{v}^{\sigma}))^{\frac{1}{2}}(D_{2,2}^{\sigma}(\overline{u}^{\sigma},\overline{v}^{\sigma}))^{-\frac{1}{2}}, \quad (5\text{-}50)$$

then the following relation is satisfied:

$$C^{\sigma}(\overline{u}^{\sigma},\overline{v}^{\sigma})^{T}C^{\sigma}(\overline{u}^{\sigma},\overline{v}^{\sigma}) = D^{\sigma}(\overline{u}^{\sigma},\overline{v}^{\sigma}). \quad (5\text{-}51)$$

Let $(\Delta\overline{u}^{\sigma},\Delta\overline{v}^{\sigma})$ be a vector defined by the relation $$(\Delta\overline{u}^{\sigma},\Delta\overline{v}^{\sigma})^{T} = C^{\sigma}(\overline{u}^{\sigma},\overline{v}^{\sigma})\Delta\overline{u}^{\sigma},\Delta\overline{v}^{\sigma})^{T}. \quad (5\text{-}52)$$

If both sides of the system of linear equations (5-48) of the unknown vector $(\Delta\overline{u}^{\sigma},\Delta\overline{v}^{\sigma})$ are multiplied on the matrix $C^{\sigma}(\overline{u}^{\sigma},\overline{v}^{\sigma})^{-T}$ from the left and if the unknown vector $(\Delta\overline{u}^{\sigma},\Delta\overline{v}^{\sigma})$ is substituted with the unknown vector $(\Delta\overline{u}^{\sigma},\Delta\overline{v}^{\sigma})$, the system of linear equations (5-48) becomes the following system of linear equations relative to the unknown vector $(\Delta\overline{u}^{\sigma},\Delta\overline{v}^{\sigma})$:

$$(\Delta\overline{u}^{\sigma},\Delta\overline{v}^{\sigma})^{T} = C^{\sigma}(\overline{u}^{\sigma},\overline{v}^{\sigma})^{-T}B^{\sigma}(\overline{u}^{\sigma},\overline{v}^{\sigma})C^{\sigma}(\overline{u}^{\sigma},\overline{v}^{\sigma})^{-1}$$
$$(\Delta\overline{u}^{\sigma},\Delta\overline{v}^{\sigma})^{T} - C^{\sigma}(\overline{u}^{\sigma},\overline{v}^{\sigma})^{-T}F^{\sigma}(\overline{u}^{\sigma},\overline{v}^{\sigma}). \quad (5\text{-}53)$$

The relation (3-10) implies that the $L^2$ norm of the matrix $C^{\sigma}(\overline{u}^{\sigma},\overline{v}^{\sigma})^{-T}B^{\sigma}(\overline{u}^{\sigma},\overline{v}^{\sigma})C^{\sigma}(\overline{u}^{\sigma},\overline{v}^{\sigma})^{-1}$ is less than 1, i.e., $$||C^{\sigma}(\overline{u}^{\sigma},\overline{v}^{\sigma})^{-T}B^{\sigma}(\overline{u}^{\sigma},\overline{v}^{\sigma})C^{\sigma}(\overline{u}^{\sigma},\overline{v}^{\sigma})^{-1}||_2 = \lambda < 1. \quad (5\text{-}54)$$

Let $G^{\sigma}(\overline{u}^{\sigma},\overline{v}^{\sigma})$ be a matrix defined as in the relation $$G^{\sigma}(\overline{u}^{\sigma},\overline{v}^{\sigma}) = C^{\sigma}(\overline{u}^{\sigma},\overline{v}^{\sigma})^{-T}B^{\sigma}(\overline{u}^{\sigma},\overline{v}^{\sigma})C^{\sigma}(\overline{u}^{\sigma},\overline{v}^{\sigma})^{-1}, \quad (5\text{-}55)$$

and let $h^{\sigma}(\overline{u}^{\sigma},\overline{v}^{\sigma})$ be a vector given by the relation $$h^{\sigma}(\overline{u}^{\sigma},\overline{v}^{\sigma}) = C^{\sigma}(\overline{u}^{\sigma},\overline{v}^{\sigma})^{-T}F^{\sigma}(\overline{u}^{\sigma},\overline{v}^{\sigma}); \quad (5\text{-}56)$$

then the following basic iterative method can be used to obtain an approximation to the solution of the system of linear equations (5-28).

The initial approximation $(\Delta\overline{u}_0^{\sigma},\Delta\overline{v}_0^{\sigma})$ to the solution of the system of linear equations (5-53) is defined to be identically equal to zero. For every $n=0, 1, \ldots$ the approximation $(\Delta\overline{u}_{n+1}^{\sigma},\Delta\overline{v}_{n+1}^{\sigma})$ is defined in terms of the approximation $(\Delta\overline{u}_n^{\sigma},\Delta\overline{v}_n^{\sigma})$ as in the following relation:

$$(\Delta\overline{u}_{n+1}^{\sigma},\Delta\overline{v}_{n+1}^{\sigma})^{T} = G^{\sigma}(\overline{u}^{\sigma},\overline{v}^{\sigma})(\Delta\overline{u}_n^{\sigma},\Delta\overline{v}_n^{\sigma})^{T} - k^{\sigma}(\overline{u}^{\sigma},\overline{v}^{\sigma}). \quad (5\text{-}57)$$

The process is continued until a proper approximation $(\Delta\overline{u}_N^{\sigma},\Delta\overline{v}_N^{\sigma})$ to the solution of the system of linear equation (5-53) is achieved. The approximation $(\Delta\overline{u}^{\sigma},\Delta\overline{v}^{\sigma})$ to the solution of the system of linear equation (5-28) is defined by the relation $$(\Delta\overline{u}^{\sigma},\overline{v}^{\sigma})^{T}C^{\sigma}(\overline{u}^{\sigma},\overline{v}^{\sigma})^{-1}(\Delta\overline{u}_N^{\sigma},\Delta\overline{v}_N^{\sigma})^{T}. \quad (5\text{-}58)$$

The performance of the basic iterative method (5-57) can be improved with the help of the polynomial acceleration applied to the basic iterative method. Two methods are described below: a conjugate gradient polynomial acceleration and a Chebyshev polynomial acceleration. For the sake of simplicity the following notation will be used:

$$w = (\Delta\overline{u}^{\sigma},\Delta\overline{v}^{\sigma})^{T}, \quad (5\text{-}59)$$

$$G = G^{\sigma}(\overline{u}^{\sigma},\overline{v}^{\sigma}), \quad (5\text{-}60)$$

$$h = h^{\sigma}(\overline{u}^{\sigma},\overline{v}^{\sigma}). \quad (5\text{-}61)$$

Then the basic iterative method (5-57) becomes $$w_{n+1} = Gw_n - h. \quad (5\text{-}62)$$

The polynomial acceleration of the basic iterative method (5-62) can be described as follows. We start with the initial approximation $w_0$, which is identically equal to zero; then for every $n=0,1,\ldots$ the following iterative procedure is applied:

$$w_{n+1} = \rho_n(\gamma_n(Gw_n - h) + (1-\gamma_n)w_n) + (1-\rho_n)w_{n-1}. \quad (5\text{-}63)$$

In the conjunction gradient method the coefficients $p_n$ and $\gamma_n$ are given by the relation $$\rho_n = \frac{a_{n-1} + a_n\beta_n}{a_{n-1}}, n \geq 1, \rho_0 = 1, \quad (5\text{-}64)$$

$$\gamma_n = \frac{a_n a_{n-1}}{a_{n-1} + a_n\beta_n}, n \geq 1, \gamma_0 = a_0.$$

where $$a_n = \frac{(r_n,r_n)}{(p_n,q_n)}, n \geq 0, \beta_n = \frac{(r_n,r_n)}{(r_{n-1},r_{n-1})}, n \geq 1, \beta_0 = 0, \quad (5\text{-}65)$$

$$p_n = r_n + \beta_n p_{n-1}, n \geq 1, p_0 = r_0, q_n = p_n - Gp_n, \quad (5\text{-}66)$$
$$n \geq 0.$$

$$r_n = Gw_n - w_n - h, n \geq 0, \quad (5\text{-}67)$$

while in the Chebyshev method, the coefficients $p_n$, and $\gamma_n$ are given by the following relation:

$$\rho_n = \frac{1}{1 - 0.25\lambda^2 \rho_{n-1}}, n \geq 2, \quad (5\text{-}68)$$

$$\rho_1 = \frac{1}{1 - 0.5\lambda^2}, \rho_0 = 1, \gamma_{n+1} = 1, n \geq 0.$$

The conjugate gradient method can be expressed in the following alternative form:

$$w_{n+1} = w_n + a_n p_n, r_{n+1} = r_n - a_n p_n, \quad (5\text{-}69)$$

where the coefficients $a_n$ are defined as in the relation (5-65) and the vectors $p_n$, $q_n$ are given by the relation (5-66). The alternative form for the Chebyshev method is defined as follows:

$$w_{n+1} = w_n + p_n, r_{n+1} = r_n - q_n, \quad (5\text{-}70)$$

where $$p_n p_n r_n + (\rho_n - 1)p_{n-1}, n \geq 1, p_0 = r_0, q_n = p_n - Gp_n, n \geq 0, \quad (5\text{-}71)$$

and the coefficients $p_n$ are given by the relation (5-68).

Appendix A is a listing for a program designed to run on a Sun computer with a Sun Laser Writer to perform the method of the present invention.

SUMMARY

The foregoing description of the invention discloses a method for the estimation of velocity vector fields characterizing changes in successive images from a time-varying image sequence.

The estimate of the velocity vector field is defined as a vector field in which a compromise is achieved in the attempt to satisfy two sets of generally conflicting constraints in addition to the regularization constraints. The first set is the optical flow constraints, which relate the values of the time-varying image function at the corresponding points of the successive images of the sequence. The second set is the directional smoothness constraints, which relate the values of then neighboring velocity vectors.

These constraints are linearly combined into a functional in such a way that the weighting coefficients are themselves the functions of the unknown velocity vector field. The above mentioned compromise is achieved by finding a specific solution to a variational problem arising from such as functional.

The variational problem leads to the system of nonlinear equations. A specific solution is singled out by introducing a scalar parameter into the functional in such a way that for some value of the parameter the original functional is recovered, while for the other value of the parameter the system of nonlinear equations has a unique solution, which can be easily determined. The regularization constraints requiring the solution of the parametric system of nonlinear equations to be smooth with respect to the parameter guarantee the uniqueness of the estimate of the velocity vector field.

To obtain the solution of the system of nonlinear equations a finite sequence of parameter values is selected. For each value of the parameter from the sequence the parametric system of nonlinear equations is solved using the solution of the parametric system of nonlinear equations for the previous value of the parameter as the initial estimate as well as the factor appearing in the regularization term.

The solution of the parametric system of nonlinear equations for a given value of the parameter is obtained using the quasi-Newton method for the system of nonlinear equations. The variational problem is defined in such a way that the first-order linearization of the system of nonlinear equations can be approximated with the system of linear equations that is symmetric and positive definite.

To perform the actual computations a finite-difference discretization of the system of nonlinear equations is used. The computations are done on a square grid of points on the image plane. The parameterization of the system of nonlinear equations is defined in such a way that the spatial variations of the velocity vectors diminish when the parameter approaches the value on which the system of nonlinear equations has a unique solution. As a consequence of this, the resolution pyramid is introduced with the finer sampled grid in the case of the parameter approaching the value on which the original functional is recovered, and with the coarser sampled grid in the case of the parameter approaching the value on which the system of nonlinear equations has a unique solution.

One of the difficulties arising in the estimation of the velocity vector field comes from the fact that the images are, in general, discontinuous functions, whereas the optical flow constraints are posed in terms of the values of the images and their derivatives. This difficulty is overcome by treating the images as generalized functions and their derivatives as generalized derivatives that are observed on a specified set of test functions.

The other difficulties appearing in the estimation of the velocity vector field are as follows. The directional smoothness constraints, although helping to resolve the ambiguities resulting from the optical flow constraints, are violated in the vicinities of occlusion boundaries. The optical flow constraints can be violated under the following conditions: the presence of occlusion boundaries, the wrong initial estimate of the velocity vector field, and image noise. To overcome these difficulties, on the one hand, the directional smoothness constraint is suppressed in the presence of the evidence that the occlusion boundary is crossed; on the other hand, the optical flow constraint is suppressed if there is evidence that the occlusion boundary is present or the constraint is not satisfied.

The evidence that the occlusion boundary is crossed is based on the current estimate of the velocity vector field and comes from both the directional smoothness constraint for which the evidence is used and the value that is related to the optical flow constraint. Similarly, the evidence that the occlusion boundary is present or that the optical flow constraint is not satisfied is based on the current estimate of the velocity vector field and comes from both the optical flow constraint under consideration and the value that is related to the directional smoothness constraint. In other words, there is a duel feed-back interaction between the optical flow and the directional smoothness constraints.

To achieve this compromise between the optical flow and the directional smoothness constraints, the variational calculus, as opposed to the minimization, is applied to the functional. This is a more general approach, which allows selective application of the variation to the constraints but not to the weighting coefficients, and thereby permits the use of the unknown velocity vectors as part of the variables appearing in the weighting coefficients.

Figure 10:
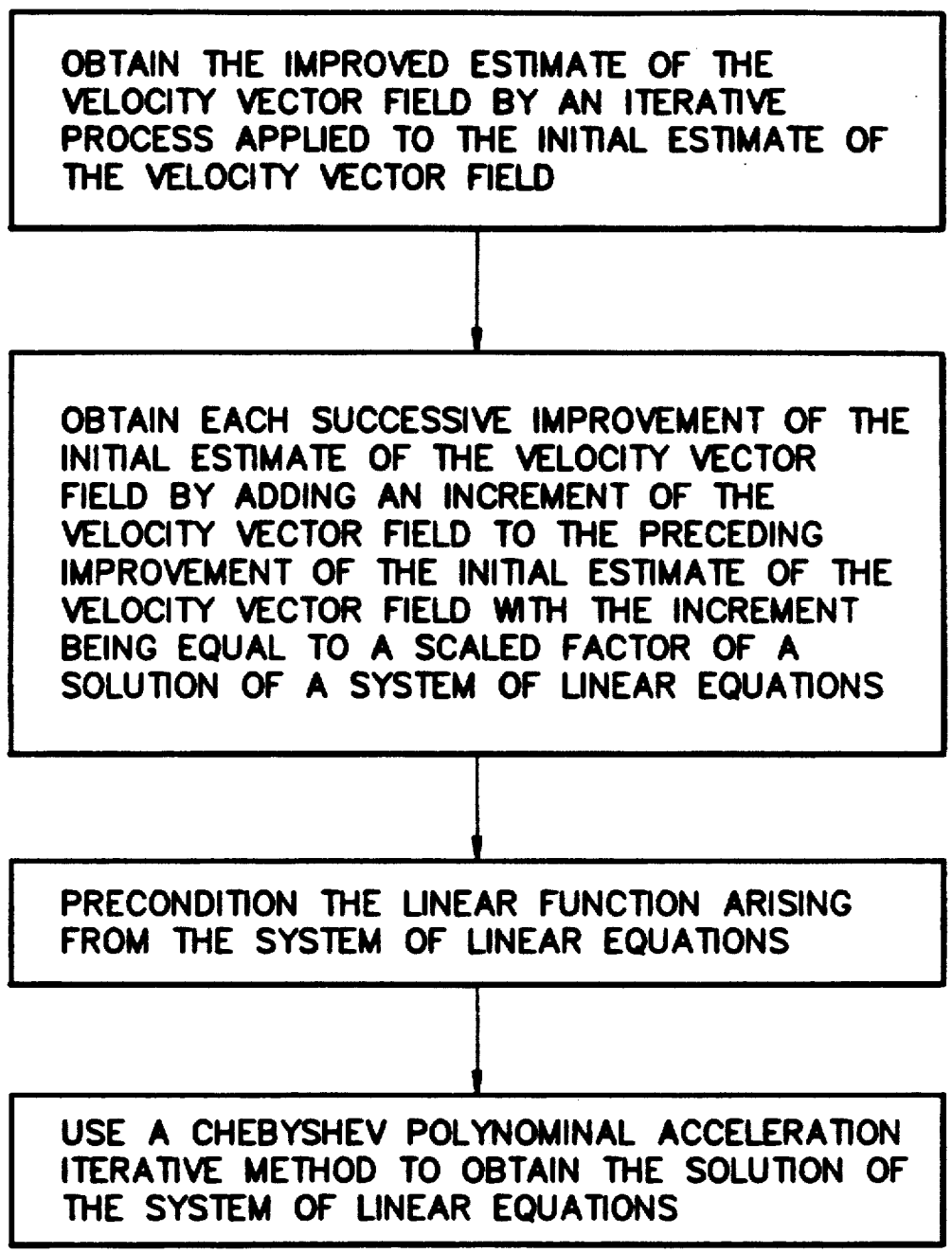
FIG. 10 illustrates a flow chart of a method of containing an improved estimate of the velocity vector field according to another embodiment of the present invention usable in the method of FIG. 7.
Figure 12:
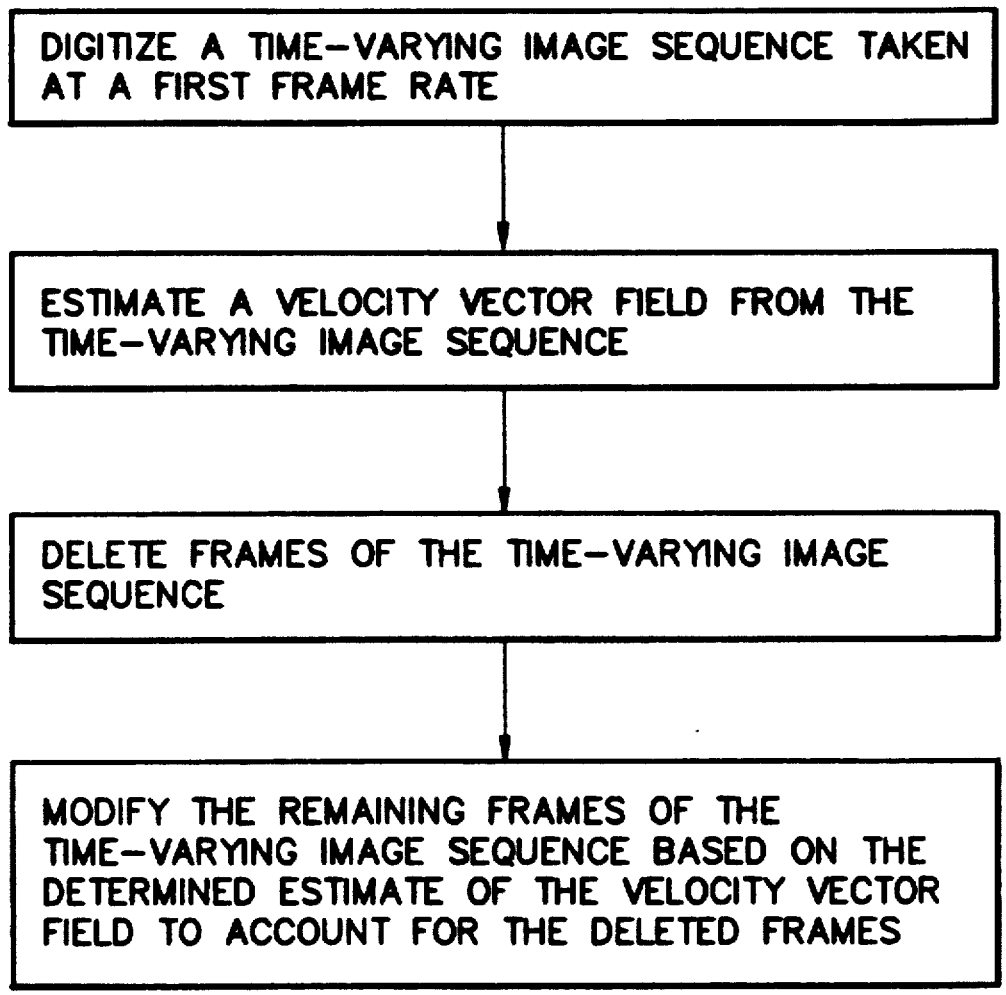
FIG. 12 illustrates a flow chart for another embodiment of the present invention.
Figure 13:
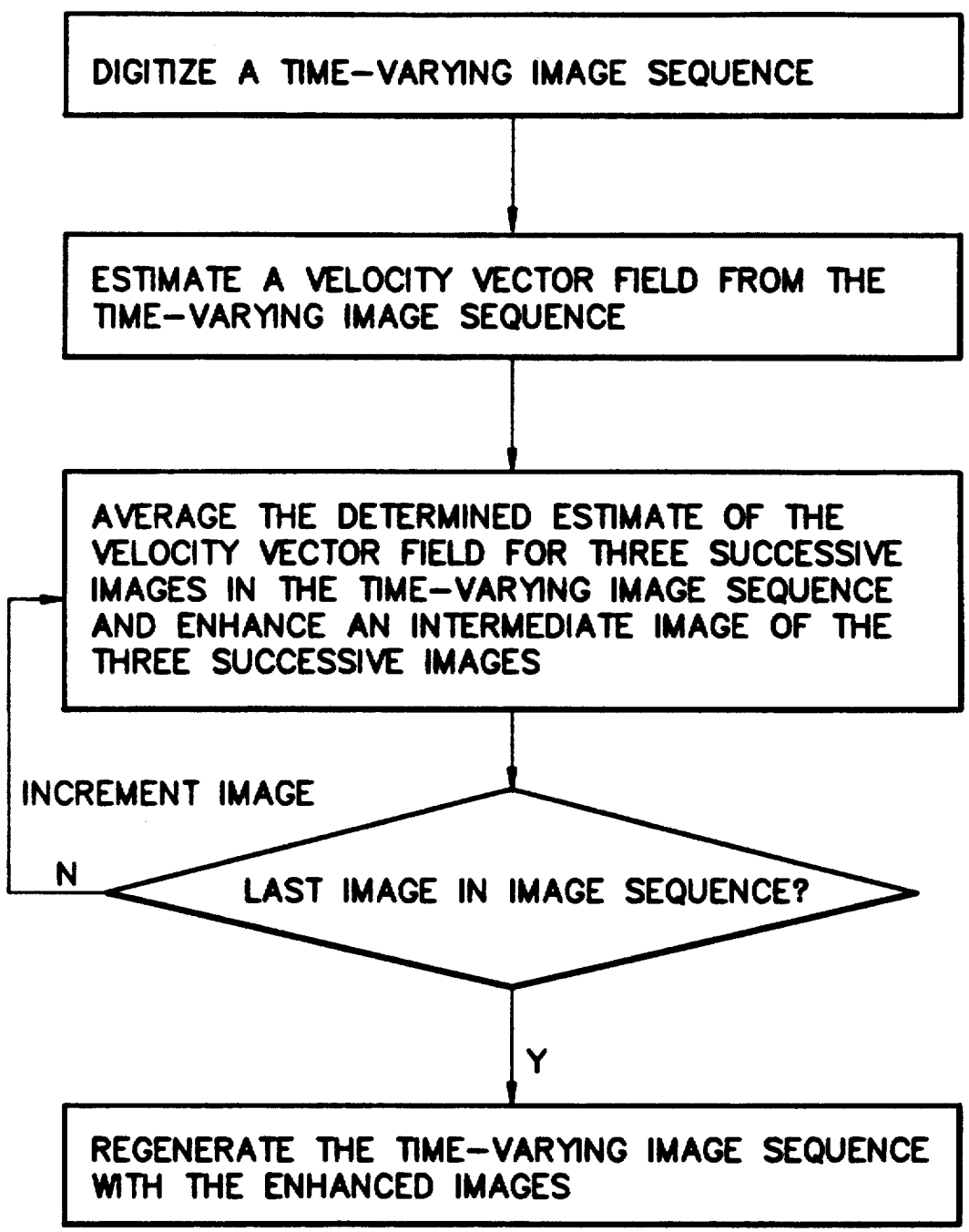
FIG. 13 illustrates a flow chart for another embodiment of the present invention.
Figure 14:
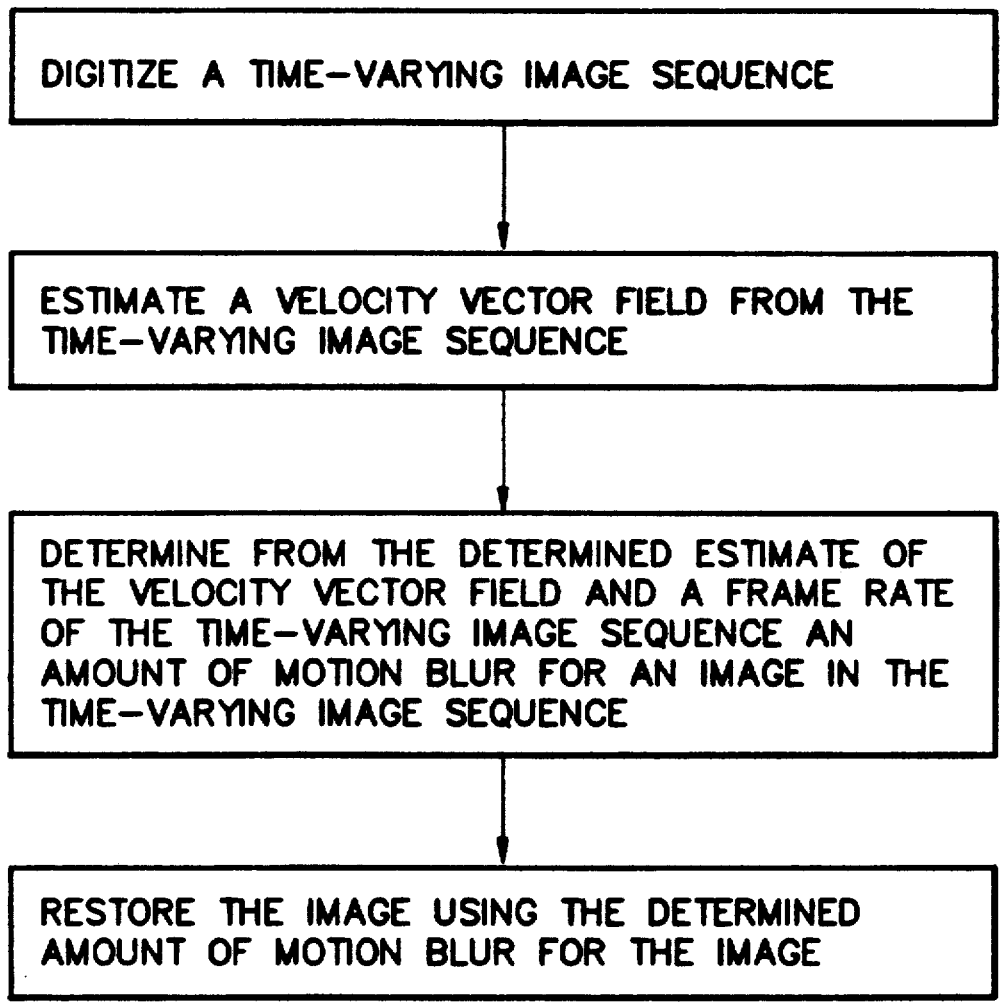
FIG. 14 illustrates a flow chart for another embodiment of the present invention.
Figure 15A:
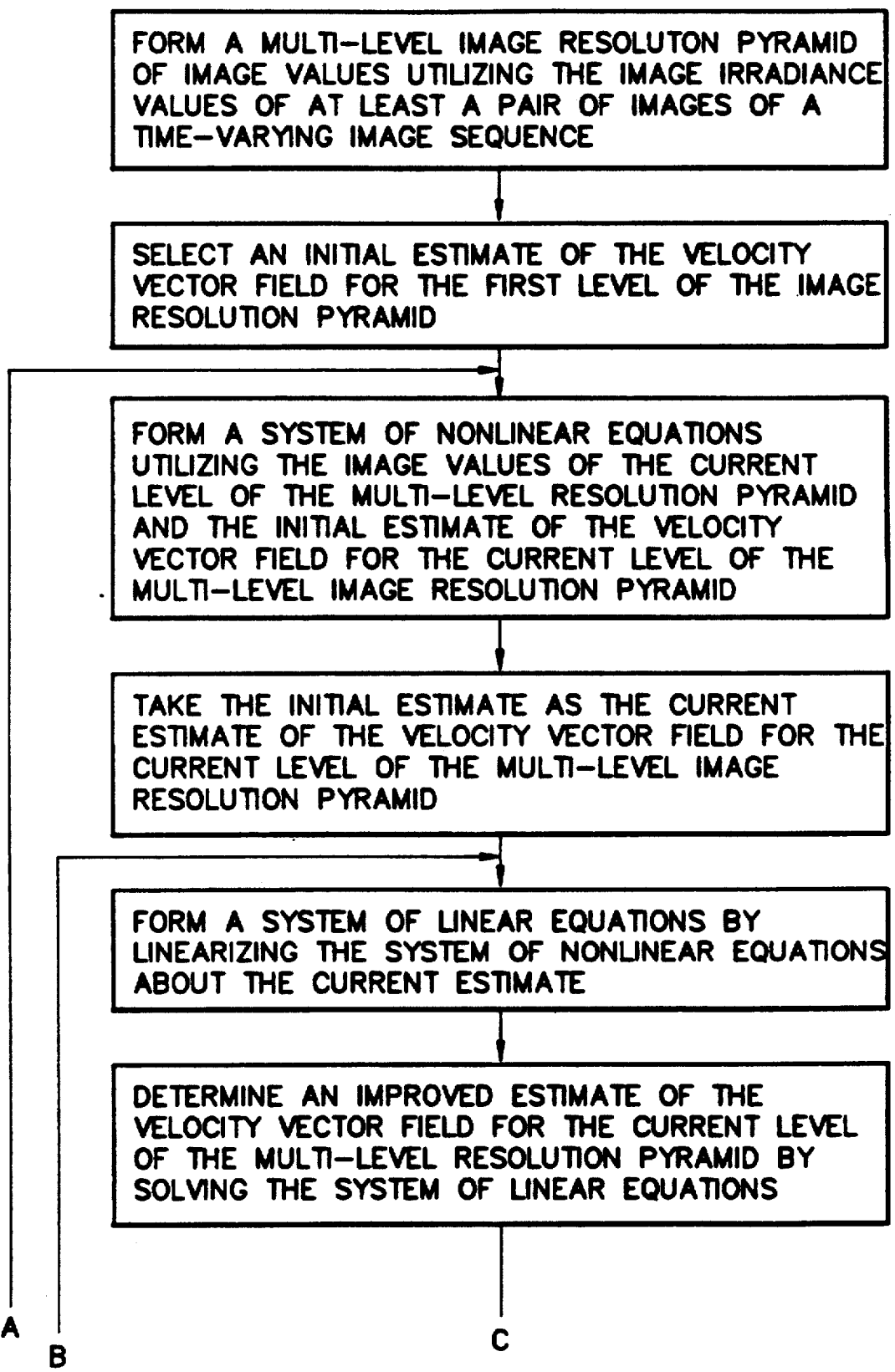
FIGS. 15A and 15B illustrate a flow chart for another embodiment of the present invention.
Figure 15B:
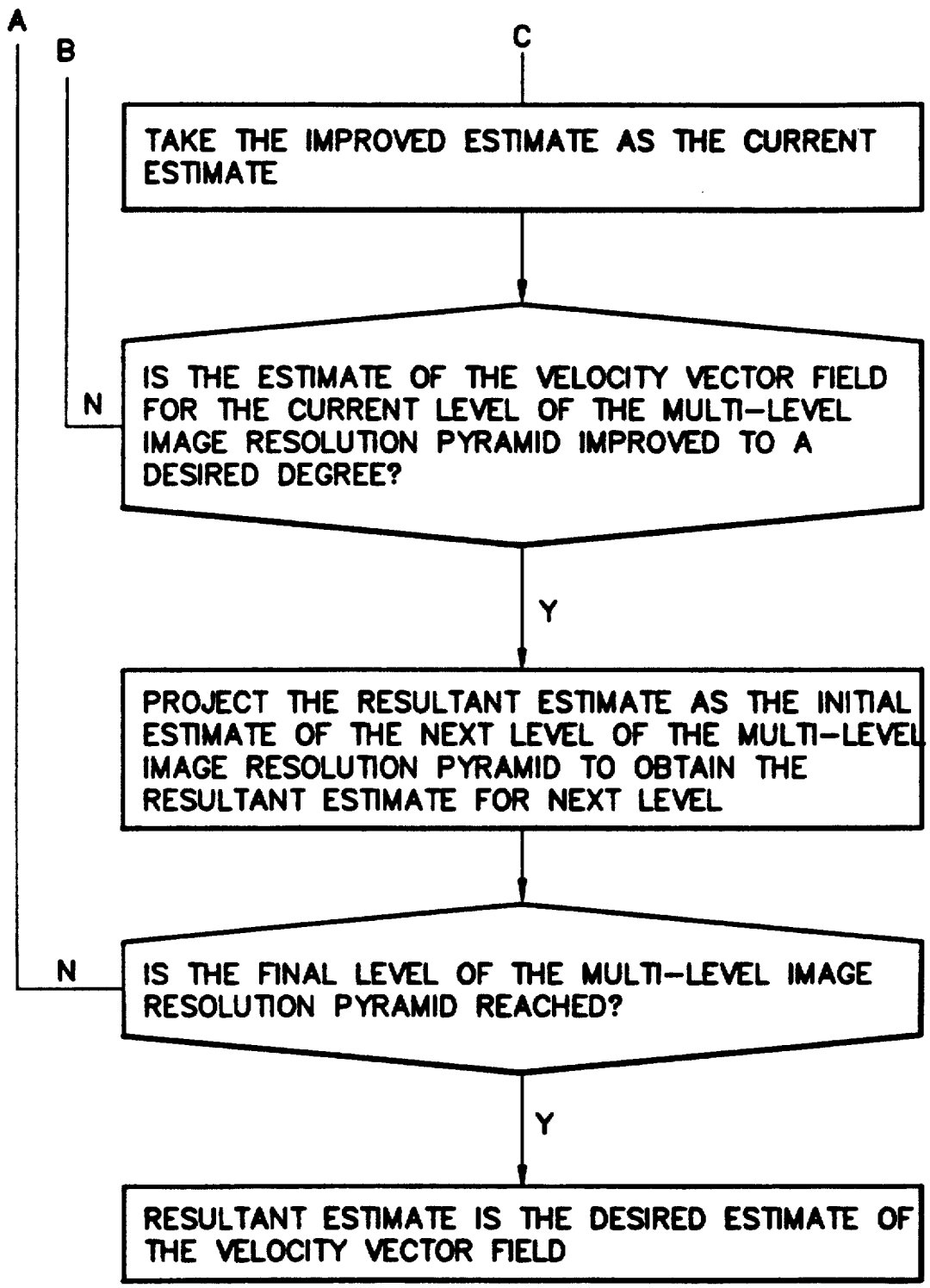

FIGS. 7 and 11-15 illustrate flow charts for different embodiments of the present invention. FIGS. 8-10 illustrate different embodiments of the method of obtaining an estimate of the velocity vector field and improving that estimate, a step provided for in the method of FIG. 7. In the embodiments of the invention illustrated in FIGS. 11-14, the step of estimating a velocity vector field from the time-varying image sequence is performed in a manner similar to that shown in FIG. 7 and is thus not repeated in these figures for purposes of clarity.

The method of estimating the velocity vector field that is described above finds use in the modification of time-varying image sequences in accordance with embodiments of the present invention, as described below.

In one embodiment of the present invention, a time-varying image sequence is converted form a first frame rate to a second frame rate. For example, it may be desired to convert an image sequence having a frame rate of 24 frames/sec to a second rate of 60 frames/sec (e.g. For video). This presents the problem of providing additional frames to fill in between the original frames of the image sequence. One way to do this is to simply repeat the frames that exist. Thus, the image of a first frame will be repeated to provide an intermediate frame between the first frame and a second frame. However, this will produce a staccato effect. Another way to fill in the frame is by averaging the images in the first and second frames to produce the intermediate frame. This averaging has the disadvantage of producing a smear in the intermediate frame.

By providing a determined estimate of the velocity vector field of the images in the first and second frames of the image sequence, this embodiment of the present invention avoids the above-noted disadvantages and provides an accurately predicted intermediate frame. The intermediate frame is then inserted into the image sequence, this process being repeated until enough intermediate frames are inserted to convert the image sequence to the desired second rate.

Instead of adding intermediate frames, another embodiment of the present invention subtracts images to compress information. Frames of the time-varying image sequence are deleted and the remaining frames in the image sequence are modified based on the determined estimate of the vector velocity field to account for the deleted frames. This embodiment of the present invention therefore provides motion compensated compression.

A different embodiment of the present invention estimates the velocity vector field as described earlier in order to enhance a time-varying image sequence. In this embodiment, after obtaining the determined estimate of the velocity vector field for three successive image in the time-varying sequence, these determined estimates are averaged. The intermediate one (i.e., the second) of these images is enhanced based on this average. This enhancement is then repeated for each of the images in the image sequence and the image sequence is regenerated with these enhanced images.

Another embodiment of the present invention uses the estimation of the velocity vector field to perform motion compensation restoration of a time-varying image sequence. After digitizing the image sequence and estimating the velocity vector field, an amount of motion blur or an image in the image sequence is then determined from the estimation of the velocity vector field and the frame rate of the image sequence. The image is then restored using the determined amount of motion blur for that image.

These various embodiments of the present invention can be implemented using conventional physical image processing equipment, such as a camera, an image digitizer, a computer, and a display, and as such, are not shown in detail in order not to obscure the present invention.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as fall within the true scope of the invention.

APPENDIX A

Copyright © EASTMAN KODAK COMPANY 1987

```
#include <math.h>
#include <stdio.h>
#include <sys/file.h>
#include "iopackage.h"
#define LEVELS     5
#define PATCHS     0
#define SCLCRS     5
#define BUFEL      4000
#define MINJ       2300000
#define NXNY       82260
#define NBNV       18226
#define KPKP       187490
/* KKI = 159, 177, 191, 139, 154, 172, 180, 186, 190; */
/* KKJ = 155, 198, 199, 179, 200, 195, 164, 201, 193; */
#define KKIM       10
#define KKJM       1
#define KKIP       16
#define KKJP       38
#define DKKI       42
#define DKKJ       42
#define KXPP       1
#define KYPP       1
#define KHPP       1
#define KVPP       1
#define NHPP       153
#define NVPP       101
#define RHOP       4
#define TAUP       2
#define AAPP       4.0
#define CCPP       0.0
#define BBPP       8.0
#define DDPP       2.0
#define RRPP       1.0
#define PPPP       0.0
```

```
#define QOPP    0.1
#define SGMP    3.0
#define DSGM    3.0
#define REPS    0.0001
#define FEPS    0.0001
#define STPD    0.8
#define STEP    0.2
#define KMAX    30
#define UOVFD   0.0
#define VOVFD   2.0
#define ITMAX0  12
#define ITMAX1  6
#define GAMA0   0.001
#define GAMA1   0.001
define IMSCL   0.05 unsigned char cgmrf[NINJ], cgmgf[NINJ], cgmbf[NINJ];
unsigned char cgprf[NINJ], cgpgf[NINJ], cgpbf[NINJ];

float ggmrf[NXNY], ggprf[NXNY], ggmgf[NXNY], ggpgf[NXNY], ggmbf[NXNY], ggpbf[NXNY];
float gxmrf[NXNY], gxprf[NXNY], gxmgf[NXNY], gxpgf[NXNY], gxmbf[NXNY], gxpbf[NXNY];
float gymrf[NXNY], gyprf[NXNY], gymgf[NXNY], gypgf[NXNY], gymbf[NXNY], gypbf[NXNY];
float hv0h0[NHNV], vv0h0[NHNV], wrk12[NHNV];

double rccvf[KPKP], rcxvf[KPKP], rcyvf[KPKP];

float uuvfd[NHNV], vvvfd[NHNV], u0vfd[NHNV], v0vfd[NHNV], udvfd[NHNV], vdvfd[NHNV];
float usvfd[NHNV], vsvfd[NHNV], g2sqf[NHNV], g3sqf[NHNV], g4sqf[NHNV], g5sqf[NHNV];
float auu1p[NHNV], auu2p[NHNV], auu3p[NHNV], auu4p[NHNV], auu5p[NHNV], ainvp[NHNV];
float cuv1p[NHNV], cuv2p[NHNV], cuv3p[NHNV], cuv4p[NHNV], cuv5p[NHNV], cinvp[NHNV];
float bvv1p[NHNV], bvv2p[NHNV], bvv3p[NHNV], bvv4p[NHNV], bvv5p[NHNV], binvp[NHNV];
float rucvf[NHNV], rvcvf[NHNV], zucvf[NHNV], zvcvf[NHNV], duufm[NHNV], dvvfm[NHNV];
float auu1m[NHNV], auu2m[NHNV], auu3m[NHNV], auu4m[NHNV], auu5m[NHNV], ainvm[NHNV];
float cuv1m[NHNV], cuv2m[NHNV], cuv3m[NHNV], cuv4m[NHNV], cuv5m[NHNV], cinvm[NHNV];
float bvv1m[NHNV], bvv2m[NHNV], bvv3m[NHNV], bvv4m[NHNV], bvv5m[NHNV], binvm[NHNV];
float pucvf[NHNV], pvcvf[NHNV], qucvf[NHNV], qvcvf[NHNV], duufp[NHNV], dvvfp[NHNV];
float wrk00[NHNV], wrk01[NHNV], wrk02[NHNV], wrk03[NHNV], wrk04[NHNV], wrk05[NHNV];
float wrk06[NHNV], wrk07[NHNV], wrk08[NHNV], wrk09[NHNV], wrk10[NHNV], wrk11[NHNV];
float asq, csq, bsq, dsq, rsq, psq, qsq, sgm, dsgm, gama, gama1, omeg, thre, zero;
long  mv0h0[NHNV], mvphp[NHNV], mv0hp[NHNV], mvmhp[NHNV], mvmh0[NHNV], mvmhm[NHNV];
long  mv0hm[NHNV], mvphm[NHNV], mvph0[NHNV], m11p[NHNV], m12p[NHNV], m21p[NHNV];
long  m22p[NHNV], m11m[NHNV], m12m[NHNV], m21m[NHNV], m22m[NHNV];
long  kv0h0, kvphp, kv0hp, kvmhp, kvmh0, kvmhm, kv0hm, kvphm, kvph0;
long  dki, dkj, kptch, kflag, rho, tau;

main(argc,argv)
int argc;
char *argv[];
{
        int fd, written, i;
        char *flinm, *flinp, *flout;
        unsigned char *cgr, *cgg, *cgb;
        long dd, dn, kki, kkj, ki, kj, ni, nj, kx, ky;
        long nx, ny, kh, kv, mh, mv, nh, nv, kp, ix, jy, k;
        long level, levels, kmax, itmax, itmax1, itest;
        float *ggr, *gxr, *gyr, *ggg, *gxg, *gyg, *ggb, *gxb, *gyb;
        float reps, feps, temp;
        itest = initpr(&dd,&dn,&ki,&kj,&ni,&nj,&kx,&ky,&nx,&ny,&kh,&kv,
         &mh,&mv,&nh,&nv,&kp,&levels,&reps,&feps,&kmax,&itmax,&itmax1);
        if ( itest == 0 ) exit(0);
        if ( argc == 4 )
        {
                flinm = argv[1];
                flinp = argv[2];
                flout = argv[3];
        } else exit(1);
        fd = open(flout,O_RDWR | O_CREAT,02644);
        if ( fd < 0 )
        {
                fprintf(stderr,"Can't open file %s\n",flout);
                exit(1);
        }
```

```
cgr = cgmrf; cgg = cgmgf; cgb = cgmbf; kki = KKIM; kkj = KKJM;
itest = rdbtim(flinm,cgr,cgg,cgb,kki,kkj,ni,nj);
if ( itest == 0 ) exit(0);
cgr = cgprf; cgg = cgpgf; cgb = cgpbf; kki = KKIP; kkj = KKJP;
itest = rdbtim(flinp,cgr,cgg,cgb,kki,kkj,ni,nj);
if ( itest == 0 ) exit(0);
for ( level = levels; level > 0; level-- )
{
        temp = sgm;
        for ( i = 1; i < level; i++ )
                temp = temp * sqrt((double)2.0);
        fprintf(stdout,"The level number %d: sigma = %f\n",level, temp);
        asq = AAPP * AAPP; csq = CCPP * CCPP; bsq = BBPP * BBPP;
        cgr = cgmrf; ggr = ggmrf; gxr = gxmrf; gyr = gymrf;
        cgg = cgmgf; ggg = ggmgf; gxg = gxmgf; gyg = gymgf;
        cgb = cgmbf; ggb = ggmbf; gxb = gxmbf; gyb = gymbf;
        setdrl(dd,dn,ki,kj,ni,nx,ny,cgr,ggr,gxr,gyr,
               cgg,ggg,gxg,gyg,cgb,ggb,gxb,gyb);
        fprintf(stdout,"          The derivatives of the images: ");
        fprintf(stdout,"cgmrf, cgmgf, cgmbf have been set.\n");
        cgr = cgprf; ggr = ggprf; gxr = gxprf; gyr = gyprf;
        cgg = cgpgf; ggg = ggpgf; gxg = gxpgf; gyg = gypgf;
        cgb = cgpbf; ggb = ggpbf; gxb = gxpbf; gyb = gypbf;
        setdrl(dd,dn,ki,kj,ni,nx,ny,cgr,ggr,gxr,gyr,
               cgg,ggg,gxg,gyg,cgb,ggb,gxb,gyb);
        fprintf(stdout,"          The derivatives of the images: ");
        fprintf(stdout,"cgprf, cgpgf, cgpbf have been set.\n");
        itest = corres(dd,dn,kx,ky,nx,ny,kh,kv,mh,mv,nh,
                       reps,feps,itmax,itmaxl,kmax);
        if ( itest == 0 ) exit(0);
        fprintf(stdout,"corres is completed.\n");
        itest = prctof(&dd,&dn,kh,kv,&mh,&mv,nh);
        if ( itest == 0 ) exit(0);
        fprintf(stdout,"The level number %d is completed.\n",level);
        sgm = sgm / sqrt((double)dsgm);
}
temp = 14.0;
written = write(fd,&temp,sizeof(float));
if ( written != sizeof(float) )
{
        fprintf(stderr,"write has failed.\n");
        exit(1);
}
temp = nh;
written = write(fd,&temp,sizeof(float));
if ( written != sizeof(float) )
{
        fprintf(stderr,"write has failed.\n");
        exit(1);
}
temp = nv;
written = write(fd,&temp,sizeof(float));
if ( written != sizeof(float) )
{
        fprintf(stderr,"write has failed.\n");
        exit(1);
}
temp = KKIM;
written = write(fd,&temp,sizeof(float));
if ( written != sizeof(float) )
{
        fprintf(stderr,"write has failed.\n");
        exit(1);
}
temp = KKJM;
written = write(fd,&temp,sizeof(float));
if ( written != sizeof(float) )
{
        fprintf(stderr,"write has failed.\n");
        exit(1);
}
temp = KKIP;
```

```c
written = write(fd,&temp,sizeof(float));
if ( written != sizeof(float) )
{
        fprintf(stderr,"write has failed.\n");
        exit(1);
}
temp = KKJP;
written = write(fd,&temp,sizeof(float));
if ( written != sizeof(float) )
{
        fprintf(stderr,"write has failed.\n");
        exit(1);
}
temp = kp;
written = write(fd,&temp,sizeof(float));
if ( written != sizeof(float) )
{
        fprintf(stderr,"write has failed.\n");
        exit(1);
}
temp = rho;
written = write(fd,&temp,sizeof(float));
if ( written != sizeof(float) )
{
        fprintf(stderr,"write has failed.\n");
        exit(1);
}
temp = tau;
written = write(fd,&temp,sizeof(float));
if ( written != sizeof(float) )
{
        fprintf(stderr,"write has failed.\n");
        exit(1);
}
temp = kx;
written = write(fd,&temp,sizeof(float));
if ( written != sizeof(float) )
{
        fprintf(stderr,"write has failed.\n");
        exit(1);
}
temp = ky;
written = write(fd,&temp,sizeof(float));
if ( written != sizeof(float) )
{
        fprintf(stderr,"write has failed.\n");
        exit(1);
}
temp = dki;
written = write(fd,&temp,sizeof(float));
if ( written != sizeof(float) )
{
        fprintf(stderr,"write has failed.\n");
        exit(1);
}
temp = dkj;
written = write(fd,&temp,sizeof(float));
if ( written != sizeof(float) )
{
        fprintf(stderr,"write has failed.\n");
        exit(1);
}
k = 1;
for ( jy = 0; jy < nv; jy++ )
{
        for ( ix = 0; ix < nh; ix++ )
        {
                written = write(fd,&hv0h0[k],sizeof(float));
                if ( written != sizeof(float) )
                {
                        fprintf(stderr,"write has failed.\n");
                        exit(1);
```

```
                    }
                    written = write(fd,&vv0h0[k],sizeof(float));
                    if ( written != sizeof(float) )
                    {
                            fprintf(stderr,"write has failed.\n");
                            exit(1);
                    }
                    written = write(fd,&uuvfd[k],sizeof(float));
                    if ( written != sizeof(float) )
                    {
                            fprintf(stderr,"write has failed.\n");
                            exit(1);
                    }
                    written = write(fd,&vvvfd[k],sizeof(float));
                    if ( written != sizeof(float) )
                    {
                            fprintf(stderr,"write has failed.\n");
                            exit(1);
                    }
                    k++;
            }
    }
} initpr(dd,dn,ki,kj,ni,nj,kx,ky,nx,ny,kh,kv,mh,mv,nh,nv,
            kp,levels,reps,feps,kmax,itmax,itmax1)
long *dd, *dn, *ki, *kj, *ni, *nj, *kx, *ky, *nx, *ny, *kh, *kv;
long *mh, *mv, *nh, *nv, *kp, *levels, *kmax, *itmax, *itmax1;
float *reps, *feps;
{
        float scl, temp;
        register long k, i, j;
        long ii,jj, nxny1, ninj1, kk1sq, ktemp;
        if ( PATCHS < 0 )
        {
                fprintf(stderr,"The PATCHS is too small.\n");
                return(0);
        }
        kptch = PATCHS; temp = 0.0;
        for ( jj = - kptch; jj <= kptch; jj++ )
        {
                for ( ii = - kptch; ii <= kptch; ii++ )
                {
                        ktemp = ii * ii + jj * jj;
                        if ( ktemp <= (long)(SCLCRS) )
                                temp = temp + 1.0;
                }
        }
        rsq = temp * temp * RRPP * RRPP; dki = DKKI;
        psq = temp * temp * PPPP * PPPP; dkj = DKKJ;
        qsq = temp * temp * QQPP * QQPP / 8.0;
        fprintf(stdout, "temp = %f", temp);
        temp = GAMA0; fprintf(stdout, " gama = %f\n", temp);
        rho = RHOP; tau = TAUP; *levels = LEVELS;
        *nh = NHPP; *kx = KXPP; *nx = tau * (*nh - 1.0) + (*kx) + (*kx) - 1.0;
        *nv = NVPP; *ky = KYPP; *ny = tau * (*nv - 1.0) + (*ky) + (*ky) - 1.0;
        scl = 1.0; dsgm = DSGM; sgm = SGMP;
        for ( k = 1; k < *levels; k++ )
        {
                scl = scl * sqrt((double)2.0);
                sgm = sgm * sqrt((double)dsgm);
        }
        omeg = 3.0; thre = 2.0;
        zero = 0.0; *kp = thre * ceil((double)sgm) * scl;
        *ni = rho * (*nx - 1.0) + *kp + *kp + 1.0;
        *nj = rho * (*ny - 1.0) + *kp + *kp + 1.0;
        *dd = scl; *dn = scl; *ki = *kp + 1; *kj = *kp + 1;
        *kh = KHPP; *mh = (*nh - 1.0) / scl + 1.0;
        *kv = KVPP; *mv = (*nv - 1.0) / scl + 1.0;
        temp = AAPP; fprintf(stdout, "a = %f  ", temp);
        temp = CCPP; fprintf(stdout, "c = %f  ", temp);
        temp = BBPP; fprintf(stdout, "b = %f\n", temp);
```

```
        temp = RRPP; fprintf(stdout, "r = %f  ", temp);
        temp = PPPP; fprintf(stdout, "p = %f  ", temp);
        temp = QQPP; fprintf(stdout, "q = %f\n", temp);
        dsq = DDPP;
        gama = GAMA0; gama1 = GAMA1;
        *reps = REPS; *feps = FEPS; *kmax = KMAX;
        *itmax = ITMAX0; *itmax1 = ITMAX1;
        kk1sq = (*kp + *kp + 1) * (*kp + *kp + 1) + 1;
        if ( kk1sq > KPKP )
        {
                fprintf(stderr,"The KPKP is not large enough, ");
                fprintf(stderr,"it should be equal to %d\n", kk1sq);
                return(0);
        }
        kk1sq = (*nh) * (*nv) + 1;
        if ( kk1sq > NHNV )
        {
                fprintf(stderr,"The NHNV is not large enough, ");
                fprintf(stderr,"it should be equal to %d\n", kk1sq);
                return(0);
        }
        nxny1 = (*nx) * (*ny) + 1;
        if ( nxny1 > NXNY )
        {
                fprintf(stderr,"The NXNY is not large enough, %d\n", nxny1);
                return(0);
        }
        ninj1 = (*ni + dki + dki) * (*nj + dkj + dkj) + 1;
        if ( ninj1 > NINJ )
        {
                fprintf(stderr,"The NINJ is not large enough, %d\n", ninj1);
                return(0);
        }
        k = 1;
        for ( j = 1; j <= *nv; j++ )
        {
                for ( i = 1; i <= *nh; i++ )
                {
                        hv0h0[k] = i;
                        vv0h0[k] = j;
                        uuvfd[k] = U0VFD;
                        vvvfd[k] = V0VFD;
                        u0vfd[k] = U0VFD;
                        v0vfd[k] = V0VFD;
                        k++;
                }
        }
        return(1);
} rdbtim(filein,cgr,cgg,cgb,kki,kkj,ni,nj)
char *filein;
unsigned char *cgr, *cgg, *cgb;
long kki, kkj, ni, nj;
{
        unsigned char buff_r[BUFEL], buff_g[BUFEL], buff_b[BUFEL];
        long pixels, lines, bands, form, line, band, imgin;
        long i, arrtyp, dline, dpixel, nimd, njmd;
        register long kr, kg, kb, pixel, nipk;
        nipk = ni + kki - 1;
        nimd = ni - dki - dki;
        njmd = nj - dkj - dkj;
        arrtyp = IDBYTE; imgin = 0;
        i = opnimg(&imgin,filein,0,FALSE);
        if ( i != SYSNRM ) return(0);
        getdef(&imgin,&pixels,&lines,&bands,&form);
        if ( form != arrtyp )
        {
                fprintf(stderr,"The input is the wrong data type\n");
                return(0);
        }
        if ( bands != 3 )
        {
                fprintf(stderr,"The input is the wrong band type\n");
```

```
                return(0);
}
if ( pixels + dki + dki > BUFEL )
{
        fprintf(stderr,"The buffer is not large enough\n");
        return(0);
}
if ( pixels < kki + nimd )
{
        fprintf(stderr,"The image is not large enough:  ");
        fprintf(stderr,"pix = %d,  ",pixels);
        fprintf(stderr,"pix should be = %d\n",kki + nimd);
        return(0);
}
if ( lines < kkj + njmd )
{
        fprintf(stderr,"The image is not large enough:  ");
        fprintf(stderr,"lin = %d  ",lines);
        fprintf(stderr,"lin should be = %d\n",kkj + njmd);
        return(0);
}
kr = 1; kg = 1; kb = 1;
for ( line = kkj - 1; line < njmd + kkj - 1; line++ )
{
   band = 0; rdline(&imgin,line,band,buff_r,BUFEL,arrtyp);
   band = 1; rdline(&imgin,line,band,buff_g,BUFEL,arrtyp);
   band = 2; rdline(&imgin,line,band,buff_b,BUFEL,arrtyp);
   for ( pixel = kki - 1; pixel < nimd + kki - 1; pixel++ )
   {
      cgr[kr++] = buff_r[pixel];
      cgg[kg++] = buff_g[pixel];
      cgb[kb++] = buff_b[pixel];
      if ( dki > 0 )
      {
         if ( (pixel == kki - 1) || (pixel == nimd + kki - 2) )
         {
            for ( dpixel = 0; dpixel < dki; dpixel++ )
            {
               cgr[kr++] = buff_r[pixel];
               cgg[kg++] = buff_g[pixel];
               cgb[kb++] = buff_b[pixel];
            }
         }
      }
   }
}
if ( dkj > 0 )
{
   if ( (line == kkj - 1) || (line == njmd + kkj - 2) )
   {
      for ( dline = 0; dline < dkj; dline++ )
      {
         for ( pixel = kki - 1; pixel < nimd + kki - 1; pixel++ )
         {
            cgr[kr++] = buff_r[pixel];
            cgg[kg++] = buff_g[pixel];
            cgb[kb++] = buff_b[pixel];
            if ( dki > 0 )
            {
               if ( (pixel == kki - 1) || (pixel == nimd + kki - 2) )
               {
                  for ( dpixel = 0; dpixel < dki; dpixel++ )
                  {
                     cgr[kr++] = buff_r[pixel];
                     cgg[kg++] = buff_g[pixel];
                     cgb[kb++] = buff_b[pixel];
                  }
               }
            }
         }
      }
   }
}
)
```

```
        clsimg(&imgin);
        return(1);

setdrl(dd,dn,ki,kj,ni,nx,ny,cgr,ggr,gxr,gyr,cgg,ggg,gxg,gyg,cgb,ggb,gxb,gyb)
long dd, dn, ki, kj, ni, nx, ny;
unsigned char *cgr, *cgg, *cgb;
float *ggr, *gxr, *gyr, *ggg, *gxg, *gyg, *ggb, *gxb, *gyb;
{
        register long k, kk, ix, jy;
        long i, j, ks, kss, ds, kgl, ksl, nxtdn, nitds, kg, kp, nitdd, mark;
        double rcctmp, cgrtmp, ggrtmp, gxrtmp, gyrtmp, *rcc;
        double rcxtmp, cggtmp, gggtmp, gxgtmp, gygtmp, *rcx;
        double rcytmp, cgbtmp, ggbtmp, gxbtmp, gybtmp, *rcy;
        double tmpsq, sgmgsq, thrgsq, omegsq, tmpqb, tempc, dtros;
        double dtemp, scl, sgmg, thrg, cnst, x, y, xsq, ysq;
        rcc = rccvf; rcx = rcxvf; rcy = rcyvf;
        nxtdn = nx * dn;
        ds = dn * rho;
        nitds = ni * ds;
        if ( dn == ( dd + dd ) )
                scl = dd * sqrt((double)2.0);
        else
                scl = dn;
        sgmg = omeg * sgm * scl; /* omeg = 3.0 */
        thrg = thre * sgm * scl; /* thre = 2.0 */
        sgmgsq = sgmg * sgmg;
        thrgsq = thrg * thrg;
        omegsq = omeg * omeg;
        kp = thre * ceil((double)(sgm)) * dn;
        nitdd = ni * dd;
        cnst = zero; k = 1; mark = 1;
        for ( jy = - kp; jy <= kp; jy += dd )
        {
                y = jy; ysq = y * y;
                for ( ix = - kp; ix <= kp; ix += dd )
                {
                        x = ix; xsq = x * x;
                        tmpsq = xsq + ysq;
                        if ( (tmpsq <= thrgsq) && (mark >= 0) )
                        {
                                dtemp = - 0.5 * omegsq * tmpsq / (sgmgsq - tmpsq);
                                rcc[k] = exp(dtemp);
                                cnst = cnst + rcc[k];
                        }
                        if ( dn != dd ) mark = - mark;
                        k++;
                }
        }
        dtemp = IMSCL; cnst = dtemp / cnst; k = 1;
        dtros = tau * rho * omegsq * sgmgsq; mark = 1;
        for ( jy = - kp; jy <= kp; jy += dd )
        {
                y = jy; ysq = y * y;
                for ( ix = - kp; ix <= kp; ix += dd )
                {
                        x = ix; xsq = x * x;
                        tmpsq = xsq + ysq;
                        if ( (tmpsq <= thrgsq) && (mark >= 0) )
                        {
                                rcc[k] = rcc[k] * cnst;
                                tmpsq  = sgmgsq - tmpsq;
                                tmpqb  = tmpsq * tmpsq;
                                tempc  = dtros * rcc[k] / tmpqb;
                                rcx[k] = x * tempc;
                                rcy[k] = y * tempc;
                        } else {
                                rcc[k] = zero;
                                rcx[k] = zero;
                                rcy[k] = zero;
                        }
                        if ( dn != dd ) mark = - mark;
                        k++;
```

```
        }
kgl = 1; ksl = ni * (kj - kp - 1) + ki - kp;
for ( j = 0; j < ny; j += dn )
{
        kg = kgl; ks = ksl;
        for ( i = 0; i < nx; i += dn )
        {
                kss = ks; k = 1;
                ggrtmp = zero; gxrtmp = zero; gyrtmp = zero;
                gggtmp = zero; gxgtmp = zero; gygtmp = zero;
                ggbtmp = zero; gxbtmp = zero; gybtmp = zero;
                for ( jy = - kp; jy <= kp; jy += dd )
                {
                        kk = kss;
                        for ( ix = - kp; ix <= kp; ix += dd )
                        {
                                if ( rcc[k] )
                                {
                                        cgrtmp = cgr[kk];
                                        cggtmp = cgg[kk];
                                        cgbtmp = cgb[kk];
                                        rcctmp = rcc[k];
                                        rcxtmp = rcx[k];
                                        rcytmp = rcy[k];
                                        ggrtmp = ggrtmp + cgrtmp * rcctmp;
                                        gxrtmp = gxrtmp + cgrtmp * rcxtmp;
                                        gyrtmp = gyrtmp + cgrtmp * rcytmp;
                                        gggtmp = gggtmp + cggtmp * rcctmp;
                                        gxgtmp = gxgtmp + cggtmp * rcxtmp;
                                        gygtmp = gygtmp + cggtmp * rcytmp;
                                        ggbtmp = ggbtmp + cgbtmp * rcctmp;
                                        gxbtmp = gxbtmp + cgbtmp * rcxtmp;
                                        gybtmp = gybtmp + cgbtmp * rcytmp;
                                }
                                k++; kk += dd;
                        }
                        kss += nitdd;
                }
                ggr[kg] = ggrtmp; gxr[kg] = gxrtmp; gyr[kg] = gyrtmp;
                ggg[kg] = gggtmp; gxg[kg] = gxgtmp; gyg[kg] = gygtmp;
                ggb[kg] = ggbtmp; gxb[kg] = gxbtmp; gyb[kg] = gybtmp;
                kg += dn; ks += ds;
        }
        kgl += nxtdn; ksl += nitds;
}
if ( dd == dn ) return;
kgl = nx * dd + dd + 1;
ksl = ni * (rho * dd + kj - kp - 1) + rho * dd + ki - kp;
for ( j = dd; j < ny; j += dn )
{
        kg = kgl; ks = ksl;
        for ( i = dd; i < nx; i += dn )
        {
                kss = ks; k = 1;
                ggrtmp = zero; gxrtmp = zero; gyrtmp = zero;
                gggtmp = zero; gxgtmp = zero; gygtmp = zero;
                ggbtmp = zero; gxbtmp = zero; gybtmp = zero;
                for ( jy = - kp; jy <= kp; jy += dd )
                {
                        kk = kss;
                        for ( ix = - kp; ix <= kp; ix += dd )
                        {
                                if ( rcc[k] )
                                {
                                        cgrtmp = cgr[kk];
                                        cggtmp = cgg[kk];
                                        cgbtmp = cgb[kk];
                                        rcctmp = rcc[k];
                                        rcxtmp = rcx[k];
                                        rcytmp = rcy[k];
                                        ggrtmp = ggrtmp + cgrtmp * rcctmp;
```

```
                    gxrtmp = gxrtmp + cgrtmp * rcxtmp;
                    gyrtmp = gyrtmp + cgrtmp * rcytmp;
                    gggtmp = gggtmp + cggtmp * rcctmp;
                    gxgtmp = gxgtmp + cggtmp * rcxtmp;
                    gygtmp = gygtmp + cggtmp * rcytmp;
                    ggbtmp = ggbtmp + cgbtmp * rcctmp;
                    gxbtmp = gxbtmp + cgbtmp * rcxtmp;
                    gybtmp = gybtmp + cgbtmp * rcytmp;
                }
                k++; kk += dd;
            }
            kss += nitdd;
        }
        ggr[kg] = ggrtmp; gxr[kg] = gxrtmp; gyr[kg] = gyrtmp;
        ggg[kg] = gggtmp; gxg[kg] = gxgtmp; gyg[kg] = gygtmp;
        ggb[kg] = ggbtmp; gxb[kg] = gxbtmp; gyb[kg] = gybtmp;
        kg += dn; ks += ds;
    }
    kgl += nxtdn; ksl += nitds;
}
} corres(dd,dn,kx,ky,nx,ny,kh,kv,mh,mv,nh,reps,feps,itmax,itmax1,kmax)
long dd, dn, kx, ky, nx, ny, kh, kv, mh, mv, nh, itmax, itmax1, kmax;
float reps, feps;
{
    register long k;
    long flag, flagb, iter, iter1, itemp;
    float rknf, rnf0, rnf1, rnf2, dtp, dtm;
    float repsg, fepsg, step, stp1, stpd;
    dtp = 0.5; dtm = 0.5; flag = 1; stpd = STPD;
    itemp = setin1(dd,dn,kh,kv,mh,mv,nh);
    if ( itemp == 0 )
    {
        fprintf(stderr,"Subroutine corres: ");
        fprintf(stderr,"setin1 returnes value equal to zero.\n");
        return(0);
    }
    itemp = setdr2(dd,dn,kx,ky,nx,ny,dtp,dtm,flag);
    if ( itemp == 0 )
    {
        fprintf(stderr,"Subroutine corres: ");
        fprintf(stderr,"setdr2 returnes value equal to zero.\n");
        return(0);
    }
    setmtx(dd,dn,&rknf,flag);
    repsg = reps * rknf;
    for ( iter = 0; iter < itmax; iter++ )
    {
        rnf0 = rknf;
        step = STEP;
        fepsg = feps * rknf;
        conjgr(&rknf,fepsg,kmax,iter,flag);
        {register long *rmv0h0;
         register float *rusvfd, *ruuvfd;
         register float *rvsvfd, *rvvvfd;
         rmv0h0 = mv0h0;
         rusvfd = usvfd; ruuvfd = uuvfd;
         rvsvfd = vsvfd; rvvvfd = vvvfd;
         for ( k = kv0h0; k; k-- )
         {
            rusvfd[rmv0h0[k]] = ruuvfd[rmv0h0[k]];
            rvsvfd[rmv0h0[k]] = rvvvfd[rmv0h0[k]];
         }}
        {register long *rmv0h0;
         register float *ruuvfd, *rudvfd;
         register float *rvvvfd, *rvdvfd;
         rmv0h0 = mv0h0;
         ruuvfd = uuvfd; rudvfd = udvfd;
         rvvvfd = vvvfd; rvdvfd = vdvfd;
         for ( k = kv0h0; k; k-- )
         {
```

```
                        ruuvfd[rmv0h0[k]] = ruuvfd[rmv0h0[k]]
                                + step * rudvfd[rmv0h0[k]];
                        rvvvfd[rmv0h0[k]] = rvvvfd[rmv0h0[k]]
                                + step * rvdvfd[rmv0h0[k]];
        }}
        if ( flag == 1 ) flag = -1; else flag = 1;
        itemp = setdr2(dd,dn,kx,ky,nx,ny,dtp,dtm,flag);
        if ( itemp == 0 )
        {
                fprintf(stderr,"Subroutine corres: ");
                fprintf(stderr,"setdr2 returnes value equal to zero.\n");
                return(0);
        }
        setmtx(dd,dn,&rnf2,flag);
        for ( iter1 = 0; iter1 < itmax1; iter1++ )
        {
                stp1 = step * stpd;
                {register long *rmv0h0;
                 register float *rusvfd, *rudvfd;
                 register float *rvsvfd, *rvdvfd;
                 rmv0h0 = mv0h0;
                 rusvfd = usvfd; rudvfd = udvfd;
                 rvsvfd = vsvfd; rvdvfd = vdvfd;
                 for ( k = kv0h0; k; k-- )
                 {
                        uuvfd[rmv0h0[k]] = rusvfd[rmv0h0[k]]
                                + stp1 * rudvfd[rmv0h0[k]];
                        vvvfd[rmv0h0[k]] = rvsvfd[rmv0h0[k]]
                                + stp1 * rvdvfd[rmv0h0[k]];
                }}
                if ( flag == 1 ) flag = -1; else flag = 1;
                itemp = setdr2(dd,dn,kx,ky,nx,ny,dtp,dtm,flag);
                if ( itemp == 0 )
                {
                        fprintf(stderr,"Subroutine corres: ");
                        fprintf(stderr,"setdr2 returnes value ");
                        return(0);
                }
                setmtx(dd,dn,&rnf1,flag);
                fprintf(stdout,"    rnf0 = %10.5f",rnf0);
                fprintf(stdout,"    rnf1 = %10.5f",rnf1);
                fprintf(stdout,"    rnf2 = %10.5f",rnf2);
                fprintf(stdout,"    step = %8.6f\n", step);
                if ( ( rnf0 > rnf1 ) && ( rnf1 > rnf2 ) )
                {
                        {register long *rmv0h0;
                         register float *rusvfd, *rudvfd;
                         register float *rvsvfd, *rvdvfd;
                         rmv0h0 = mv0h0;
                         rusvfd = usvfd; rudvfd = udvfd;
                         rvsvfd = vsvfd; rvdvfd = vdvfd;
                         for ( k = kv0h0; k; k-- )
                         {
                                uuvfd[rmv0h0[k]] = rusvfd[rmv0h0[k]]
                                        + step * rudvfd[rmv0h0[k]];
                                vvvfd[rmv0h0[k]] = rvsvfd[rmv0h0[k]]
                                        + step * rvdvfd[rmv0h0[k]];
                        }}
                        if ( flag == 1 ) flag = -1; else flag = 1;
                        flagb = 1;
                        break;
                }
                step = step * stpd;
                rnf2 = rnf1;
                flagb = -1;
        }
        if ( flagb == 0 )
        {
                fprintf(stderr,"Subroutine corres: ");
                fprintf(stderr,"flagb is set to zero.\n");
                return(0);
        }
```

```
                        if ( flagb == -1 )
                        {
                                {register long *rmv0h0;
                                 register float *ruuvfd, *rusvfd;
                                 register float *rvvvfd, *rvsvfd;
                                 rmv0h0 = mv0h0;
                                 ruuvfd = uuvfd; rusvfd = usvfd;
                                 rvvvfd = vvvfd; rvsvfd = vsvfd;
                                 for ( k = kv0h0; k; k-- )
                                 {
                                        ruuvfd[rmv0h0[k]] = rusvfd[rmv0h0[k]];
                                        rvvvfd[rmv0h0[k]] = rvsvfd[rmv0h0[k]];
                                 }}
                                 return(flagb);
                        }
                        rknf = rnf2;
                        if ( rknf < repsg ) break;
                }
                return(1);
        } prctof(dd,dn,kh,kv,mh,mv,nh)
long *dd, *dn, kh, kv, *mh, *mv, nh;
{
        register long k, k11, k12, k21, k22;
        register float *uu, *vv, *u0, *v0;
        long nhp1, k1, i, j, dntnh, ddtnh, ddtnhp1;
        uu = uuvfd; vv = vvvfd;
        u0 = u0vfd; v0 = v0vfd;
        nhp1 = nh + 1; dntnh = *dn * nh;
        if ( *dn == *dd )
        {
                *dd = *dn * 0.5;
                k1 = (kv - 1) * nh + kh;
                        for ( j = 0; j < *mv; j++ )
                        {
                                k = k1; k1 += dntnh;
                                for( i = 0; i < *mh; i++ )
                                {
                                        u0[k] = uu[k];
                                        v0[k] = vv[k];
                                        k += *dn;
                                }
                        }
                ddtnhp1 = *dd * nhp1;
                k1 = (kv - 1 + *dd) * nh + kh + *dd;
                for ( j = 1; j < *mv; j++ )
                {
                        k = k1; k1 += dntnh;
                        for( i = 1; i < *mh; i++ )
                        {
                                k11 = k - ddtnhp1; k12 = k11 + *dn;
                                k22 = k + ddtnhp1; k21 = k22 - *dn;
                                uu[k] = 0.25 * (uu[k11] + uu[k12]
                                                + uu[k21] + uu[k22]);
                                vv[k] = 0.25 * (vv[k11] + vv[k12]
                                                + vv[k21] + vv[k22]);
                                u0[k] = uu[k]; v0[k] = vv[k];
                                k += *dn;
                        }
                }
                return(1);
        }
        if ( *dn == ( *dd + *dd ) )
        {
                ddtnh = *dd * nh;
                k1 = (kv - 1) * nh + kh + *dd;
                k = k1; k1 += dntnh;
                for( i = 1; i < *mh; i++ )
                {
                        k11 = k - *dd; k22 = k + *dd;
                        uu[k] = 0.5 * (uu[k11] + uu[k22]);
```

```
                                vv[k] = 0.5 * (vv[k11] + vv[k22]);
                                k += *dn;
                        }
                        for ( j = 2; j < *mv; j++ )
                        {
                                k = k1; k1 += dntnh;
                                for( i = 1; i < *mh; i++ )
                                {
                                        k12 = k - ddtnh; k11 = k - *dd;
                                        k21 = k + ddtnh; k22 = k + *dd;
                                        uu[k] = 0.25 * (uu[k11] + uu[k12]
                                                      + uu[k21] + uu[k22]);
                                        vv[k] = 0.25 * (vv[k11] + vv[k12]
                                                      + vv[k21] + vv[k22]);
                                        k += *dn;
                                }
                        }
                        k = k1;
                        for( i = 1; i < *mh; i++ )
                        {
                                k11 = k - *dd; k22 = k + *dd;
                                uu[k] = 0.5 * (uu[k11] + uu[k22]);
                                vv[k] = 0.5 * (vv[k11] + vv[k22]);
                                k += *dn;
                        }
                        k1 = (kv - 1 + *dd) * nh + kh;
                        for ( j = 1; j < *mv; j++ )
                        {
                                k = k1; k1 += dntnh;
                                k12 = k - ddtnh; k21 = k + ddtnh;
                                uu[k] = 0.5 * (uu[k12] + uu[k21]);
                                vv[k] = 0.5 * (vv[k12] + vv[k21]);
                                k += *dn;
                                for( i = 2; i < *mh; i++ )
                                {
                                        k12 = k - ddtnh; k11 = k - *dd;
                                        k21 = k + ddtnh; k22 = k + *dd;
                                        uu[k] = 0.25 * (uu[k11] + uu[k12]
                                                      + uu[k21] + uu[k22]);
                                        vv[k] = 0.25 * (vv[k11] + vv[k12]
                                                      + vv[k21] + vv[k22]);
                                        k += *dn;
                                }
                                k12 = k - ddtnh; k21 = k + ddtnh;
                                uu[k] = 0.5 * (uu[k12] + uu[k21]);
                                vv[k] = 0.5 * (vv[k12] + vv[k21]);
                        }
                        *dn = *dd; dntnh = *dn * nh;
                        *mh = 2.0 * (*mh - 1) + 1;
                        *mv = 2.0 * (*mv - 1) + 1;
                        k1 = (kv - 1) * nh + kh;
                        for ( j = 0; j < *mv; j++ )
                        {
                                k = k1; k1 += dntnh;
                                for( i = 0; i < *mh; i++ )
                                {
                                        u0[k] = uu[k];
                                        v0[k] = vv[k];
                                        k += *dn;
                                }
                        }
                        return(1);
                }
                return(0);
        } setdr2(dd,dn,kx,ky,nx,ny,dtp,dtm,flag)
long dd, dn, kx, ky, nx, ny, flag;
float dtp, dtm;
{
        register long k;
        double dtemp;
```

```
long kk, ii, jj, kvvhh, *mpvph, *mmvmh, itest, ktemp;
float tempw, tempu, tempv, deltah, deltav;
float *hcp, *vcp, *hcm, *vcm, *auul, *cuvl, *bvvl, *duul, *dvvl;
float *dxlp, *dylp, *dx2p, *dy2p, *dxlm, *dylm, *dx2m, *dy2m;
float *ggm, *ggp, *gxm, *gxp, *gym, *gyp, *tmpgt, *tgtsq, *dgtsq;
float *templ, *temp2, *tmpgp, *tmpgm, *tmpgx, *tmpgy, *giisq;
float *gusq, *gugv, *gvsq, *gugt, *gvgt, *gtsq, *tmpl, *tmp2, *temp;
hcp   = zucvf; vcp  = zvcvf; hcm  = qucvf; vcm  = qvcvf;
dxlp  = rucvf; dylp = rvcvf; dx2p = zucvf; dy2p = zvcvf;
dxlm  = pucvf; dylm = pvcvf; dx2m = qucvf; dy2m = qvcvf;
templ = wrk06; temp2 = wrk07; tmpgp = wrk08; tmpgm = wrk09;
tmpgt = wrk10; tmpgx = wrk11; tmpgy = wrk06; gusq  = wrk07;
gugv  = wrk08; gvsq  = wrk09; gugt  = wrk11; gvgt  = wrk06;
gtsq  = wrk10; tmpl  = wrk03; tmp2  = wrk04; temp  = wrk05;
{register long *rmv0h0; register float *rwrk02;
 rmv0h0 = mv0h0; rwrk02 = wrk02;
 for ( k = kv0h0; k; k-- )
 {
        rwrk02[rmv0h0[k]] = zero;
 }}
{register long *rmvmhm, *rmvphp;
 register float *rwrk02, *ruuvfd, *rvvvfd;
 rmvmhm = mvmhm; rmvphp = mvphp;
 rwrk02 = wrk02; ruuvfd = uuvfd; rvvvfd = vvvfd;
 for ( k = kvphp; k; k-- )
 {
        tempu = ruuvfd[rmvmhm[k]] - ruuvfd[rmvphp[k]];
        tempv = rvvvfd[rmvmhm[k]] - rvvvfd[rmvphp[k]];
        tempw = tempu * tempu + tempv * tempv;
        rwrk02[rmvmhm[k]] = rwrk02[rmvmhm[k]] + tempw;
        rwrk02[rmvphp[k]] = rwrk02[rmvphp[k]] + tempw;
 }}
{register long *rmv0hm, *rmv0hp;
 register float *rwrk02, *ruuvfd, *rvvvfd;
 rmv0hm = mv0hm; rmv0hp = mv0hp;
 rwrk02 = wrk02; ruuvfd = uuvfd; rvvvfd = vvvfd;
 for ( k = kv0hp; k; k-- )
 {
        tempu = ruuvfd[rmv0hm[k]] - ruuvfd[rmv0hp[k]];
        tempv = rvvvfd[rmv0hm[k]] - rvvvfd[rmv0hp[k]];
        tempw = tempu * tempu + tempv * tempv;
        rwrk02[rmv0hm[k]] = rwrk02[rmv0hm[k]] + tempw;
        rwrk02[rmv0hp[k]] = rwrk02[rmv0hp[k]] + tempw;
 }}
{register long *rmvphm, *rmvmhp;
 register float *rwrk02, *ruuvfd, *rvvvfd;
 rmvphm = mvphm; rmvmhp = mvmhp;
 rwrk02 = wrk02; ruuvfd = uuvfd; rvvvfd = vvvfd;
 for ( k = kvmhp; k; k-- )
 {
        tempu = ruuvfd[rmvphm[k]] - ruuvfd[rmvmhp[k]];
        tempv = rvvvfd[rmvphm[k]] - rvvvfd[rmvmhp[k]];
        tempw = tempu * tempu + tempv * tempv;
        rwrk02[rmvphm[k]] = rwrk02[rmvphm[k]] + tempw;
        rwrk02[rmvmhp[k]] = rwrk02[rmvmhp[k]] + tempw;
 }}
{register long *rmvph0, *rmvmh0;
 register float *rwrk02, *ruuvfd, *rvvvfd;
 rmvph0 = mvph0; rmvmh0 = mvmh0;
 rwrk02 = wrk02; ruuvfd = uuvfd; rvvvfd = vvvfd;
 for ( k = kvmh0; k; k-- )
 {
        tempu = ruuvfd[rmvph0[k]] - ruuvfd[rmvmh0[k]];
        tempv = rvvvfd[rmvph0[k]] - rvvvfd[rmvmh0[k]];
        tempw = tempu * tempu + tempv * tempv;
        rwrk02[rmvph0[k]] = rwrk02[rmvph0[k]] + tempw;
        rwrk02[rmvmh0[k]] = rwrk02[rmvmh0[k]] + tempw;
 }}
{register long *rmv0h0;
 register float *rwrk02, *rwrk12;
 rmv0h0 = mv0h0; rwrk02 = wrk02; rwrk12 = wrk12;
 for ( k = kv0h0; k; k-- )
 {
```

```
            rwrk12[k] = qsq * rwrk02[rmv0h0[k]];
}}
if ( flag == 1 )
{
        auul = auulp;
        cuvl = cuvlp;
        bvvl = bvvlp;
        duul = duufp;
        dvvl = dvvfp;
} else {
        auul = auulm;
        cuvl = cuvlm;
        bvvl = bvvlm;
        duul = duufm;
        dvvl = dvvfm;
}
{register long *rmv0h0; register float *rauul, *rcuvl, *rbvvl;
 rmv0h0 = mv0h0; rauul = auul; rcuvl = cuvl; rbvvl = bvvl;
for ( k = kv0h0; k; k-- )
{
        rauul[rmv0h0[k]] = zero;
        rcuvl[rmv0h0[k]] = zero;
        rbvvl[rmv0h0[k]] = zero;
}}
{register long *rmv0h0; register float *rduul, *rdvvl;
 rmv0h0 = mv0h0; rduul = duul; rdvvl = dvvl;
for ( k = kv0h0; k; k-- )
{
        rduul[rmv0h0[k]] = zero;
        rdvvl[rmv0h0[k]] = zero;
}}
for ( jj = - kptch; jj <= kptch; jj++ ) {
for ( ii = - kptch; ii <= kptch; ii++ ) {
ktemp = ii * ii + jj * jj;
if ( ktemp <= (long)(SCLCRS) ) {
deltah = ii * sqrt((double)(dd * dn));
deltav = jj * sqrt((double)(dd * dn));
{register long *rmv0h0; register float *rhcp, *rhcm, *rhv0h0, *ruuvfd;
 rmv0h0 = mv0h0; rhcp = hcp; rhcm = hcm; rhv0h0 = hv0h0; ruuvfd = uuvfd;
for ( k = kv0h0; k; k-- )
{
        rhcp[k] = rhv0h0[rmv0h0[k]] + deltah + dtp * ruuvfd[rmv0h0[k]];
        rhcm[k] = rhv0h0[rmv0h0[k]] + deltah - dtm * ruuvfd[rmv0h0[k]];
}}
{register long *rmv0h0; register float *rvcp, *rvcm, *rvv0h0, *rvvvfd;
 rmv0h0 = mv0h0; rvcp = vcp; rvcm = vcm; rvv0h0 = vv0h0; rvvvfd = vvvfd;
for ( k = kv0h0; k; k-- )
{
        rvcp[k] = rvv0h0[rmv0h0[k]] + deltav + dtp * rvvvfd[rmv0h0[k]];
        rvcm[k] = rvv0h0[rmv0h0[k]] + deltav - dtm * rvvvfd[rmv0h0[k]];
}}
itest = setin2(hcp,vcp,m11p,m12p,m21p,m22p,dx1p,dy1p,dx2p,dy2p,
                                        dd,dn,kx,ky,nx,ny);
if ( itest == 0 ) return(0);
itest = setin2(hcm,vcm,m11m,m12m,m21m,m22m,dx1m,dy1m,dx2m,dy2m,
                                        dd,dn,kx,ky,nx,ny);
if ( itest == 0 ) return(0);
for ( kk = 0; kk < 3; kk++ )
{
        switch.(kk)
        {
        case 0:
                ggm = ggmrf;
                ggp = ggprf;
                gxm = gxmrf;
                gxp = gxprf;
                gym = gymrf;
                gyp = gyprf;
                tgtsq = wrk00;
                break;
        case 1:
                ggm = ggmgf;
                ggp = ggpgf;
```

```
                gxm = gxmgf;
                gxp = gxpgf;
                gym = gymgf;
                gyp = gypgf;
                tgtsq = wrk01;
                break;
        case 2:
                ggm = ggmbf;
                ggp = ggpbf;
                gxm = gxmbf;
                gxp = gxpbf;
                gym = gymbf;
                gyp = gypbf;
                tgtsq = wrk02;
                break;
}
{register long *rm11p, *rm12p;
 register float *rdx2p, *rdx1p, *rggp;
 rm11p = m11p; rm12p = m12p;
 rdx2p = dx2p; rdx1p = dx1p; rggp = ggp;
 for ( k = kv0h0; k; k-- )
 {
        temp1[k] = rdx2p[k] * rggp[rm11p[k]]
                 + rdx1p[k] * rggp[rm12p[k]];
 }}
{register long *rm21p, *rm22p;
 register float *rdx2p, *rdx1p, *rggp;
 rm21p = m21p; rm22p = m22p;
 rdx2p = dx2p; rdx1p = dx1p; rggp = ggp;
 for ( k = kv0h0; k; k-- )
 {
        temp2[k] = rdx2p[k] * rggp[rm21p[k]]
                 + rdx1p[k] * rggp[rm22p[k]];
 }}
{register float *rdy2p, *rdy1p, *rtmpgp, *rtemp1, *rtemp2;
 rdy2p = dy2p; rdy1p = dy1p; rtmpgp = tmpgp;
 rtemp1 = temp1; rtemp2 = temp2;
 for ( k = kv0h0; k; k-- )
 {
        rtmpgp[k] = rdy2p[k] * rtemp1[k] + rdy1p[k] * rtemp2[k];
 }}
{register long *rm11m, *rm12m;
 register float *rdx2m, *rdx1m, *rggm;
 rm11m = m11m; rm12m = m12m;
 rdx2m = dx2m; rdx1m = dx1m; rggm = ggm;
 for ( k = kv0h0; k; k-- )
 {
        temp1[k] = rdx2m[k] * rggm[rm11m[k]]
                 + rdx1m[k] * rggm[rm12m[k]];
 }}
{register long *rm21m, *rm22m;
 register float *rdx2m, *rdx1m, *rggm;
 rm21m = m21m; rm22m = m22m;
 rdx2m = dx2m; rdx1m = dx1m; rggm = ggm;
 for ( k = kv0h0; k; k-- )
 {
        temp2[k] = rdx2m[k] * rggm[rm21m[k]]
                 + rdx1m[k] * rggm[rm22m[k]];
 }}
{register float *rdy2m, *rdy1m, *rtmpgm, *rtemp1, *rtemp2;
 rdy2m = dy2m; rdy1m = dy1m; rtmpgm = tmpgm;
 rtemp1 = temp1; rtemp2 = temp2;
 for ( k = kv0h0; k; k-- )
 {
        rtmpgm[k] = rdy2m[k] * rtemp1[k] + rdy1m[k] * rtemp2[k];
 }}
{register float *rtmpgt, *rtmpgp, *rtmpgm;
 rtmpgt = tmpgt; rtmpgp = tmpgp; rtmpgm = tmpgm;
 for ( k = kv0h0; k; k-- )
 {
        rtmpgt[k] = rtmpgp[k] - rtmpgm[k];
 }}
{register long *rm11p, *rm12p;
 register float *rdx2p, *rdx1p, *rgxp;
```

```
  rm11p = m11p; rm12p = m12p;
  rdx2p = dx2p; rdx1p = dx1p; rgxp = gxp;
  for ( k = kv0h0; k; k-- )
  {
          temp1[k] = rdx2p[k] * rgxp[rm11p[k]]
                   + rdx1p[k] * rgxp[rm12p[k]];
  }}
  {register long *rm21p, *rm22p;
   register float *rdx2p, *rdx1p, *rgxp;
   rm21p = m21p; rm22p = m22p;
   rdx2p = dx2p; rdx1p = dx1p; rgxp = gxp;
   for ( k = kv0h0; k; k-- )
   {
          temp2[k] = rdx2p[k] * rgxp[rm21p[k]]
                   + rdx1p[k] * rgxp[rm22p[k]];
  }}
  {register float *rdy2p, *rdy1p, *rtmpgp, *rtemp1, *rtemp2;
   rdy2p = dy2p; rdy1p = dy1p; rtmpgp = tmpgp;
   rtemp1 = temp1; rtemp2 = temp2;
   for ( k = kv0h0; k; k-- )
   {
          rtmpgp[k] = rdy2p[k] * rtemp1[k] + rdy1p[k] * rtemp2[k];
  }}
  {register long *rm11m, *rm12m;
   register float *rdx2m, *rdx1m, *rgxm;
   rm11m = m11m; rm12m = m12m;
   rdx2m = dx2m; rdx1m = dx1m; rgxm = gxm;
   for ( k = kv0h0; k; k-- )
   {
          temp1[k] = rdx2m[k] * rgxm[rm11m[k]]
                   + rdx1m[k] * rgxm[rm12m[k]];
  }}
  {register long *rm21m, *rm22m;
   register float *rdx2m, *rdx1m, *rgxm;
   rm21m = m21m; rm22m = m22m;
   rdx2m = dx2m; rdx1m = dx1m; rgxm = gxm;
   for ( k = kv0h0; k; k-- )
   {
          temp2[k] = rdx2m[k] * rgxm[rm21m[k]]
                   + rdx1m[k] * rgxm[rm22m[k]];
  }}
  {register float *rdy2m, *rdy1m, *rtmpgm, *rtemp1, *rtemp2;
   rdy2m = dy2m; rdy1m = dy1m; rtmpgm = tmpgm;
   rtemp1 = temp1; rtemp2 = temp2;
   for ( k = kv0h0; k; k-- )
   {
          rtmpgm[k] = rdy2m[k] * rtemp1[k] + rdy1m[k] * rtemp2[k];
  }}
  {register float *rtmpgx, *rtmpgp, *rtmpgm;
   rtmpgx = tmpgx; rtmpgp = tmpgp; rtmpgm = tmpgm;
   for ( k = kv0h0; k; k-- )
   {
          rtmpgx[k] = dtp * rtmpgp[k] + dtm * rtmpgm[k];
  }}
  {register long *rm11p, *rm12p;
   register float *rdx2p, *rdx1p, *rgyp;
   rm11p = m11p; rm12p = m12p;
   rdx2p = dx2p; rdx1p = dx1p; rgyp = gyp;
   for ( k = kv0h0; k; k-- )
   {
          temp1[k] = rdx2p[k] * rgyp[rm11p[k]]
                   + rdx1p[k] * rgyp[rm12p[k]];
  }}
  {register long *rm21p, *rm22p;
   register float *rdx2p, *rdx1p, *rgyp;
   rm21p = m21p; rm22p = m22p;
   rdx2p = dx2p; rdx1p = dx1p; rgyp = gyp;
   for ( k = kv0h0; k; k-- )
   {
          temp2[k] = rdx2p[k] * rgyp[rm21p[k]]
                   + rdx1p[k] * rgyp[rm22p[k]];
  };
  {register float *rdy2p, *rdy1p, *rtmpgp, *rtemp1, *rtemp2;
```

```
rdy2p = dy2p; rdylp = dylp; rtmpgp = tmpgp;
rtempl = templ; rtemp2 = temp2;
for ( k = kv0h0; k; k-- )
{
        rtmpgp[k] = rdy2p[k] * rtempl[k] + rdylp[k] * rtemp2[k];
}}
{register long *rm11m, *rm12m;
 register float *rdx2m, *rdxlm, *rgym;
 rm11m = m11m; rm12m = m12m;
 rdx2m = dx2m; rdxlm = dxlm; rgym = gym;
for ( k = kv0h0; k; k-- )
{
        templ[k] = rdx2m[k] * rgym[rm11m[k]]
                 + rdxlm[k] * rgym[rm12m[k]];
}}
{register long *rm21m, *rm22m;
 register float *rdx2m, *rdxlm, *rgym;
 rm21m = m21m; rm22m = m22m;
 rdx2m = dx2m; rdxlm = dxlm; rgym = gym;
for ( k = kv0h0; k; k-- )
{
        temp2[k] = rdx2m[k] * rgym[rm21m[k]]
                 + rdxlm[k] * rgym[rm22m[k]];
}}
{register float *rdy2m, *rdylm, *rtmpgm, *rtempl, *rtemp2;
 rdy2m = dy2m; rdylm = dylm; rtmpgm = tmpgm;
 rtempl = templ; rtemp2 = temp2;
for ( k = kv0h0; k; k-- )
{
        rtmpgm[k] = rdy2m[k] * rtempl[k] + rdylm[k] * rtemp2[k];
}}
{register float *rtmpgy, *rtmpgp, *rtmpgm;
 rtmpgy = tmpgy; rtmpgp = tmpgp; rtmpgm = tmpgm;
for ( k = kv0h0; k; k-- )
{
        rtmpgy[k] = dtp * rtmpgp[k] + dtm * rtmpgm[k];
}}
{register float *rgusq, *rgugv, *rgvsq, *rtmpgx, *rtmpgy;
 rgusq = gusq; rgugv = gugv; rgvsq = gvsq;
 rtmpgx = tmpgx; rtmpgy = tmpgy;
for ( k = kv0h0; k; k-- )
{
        rgusq[k] = rtmpgx[k] * rtmpgx[k];
        rgugv[k] = rtmpgx[k] * rtmpgy[k];
        rgvsq[k] = rtmpgy[k] * rtmpgy[k];
}}
{register float *rgugt, *rgvgt, *rtmpgx, *rtmpgy, *rtmpgt;
 rgugt = gugt; rgvgt = gvgt;
 rtmpgx = tmpgx; rtmpgy = tmpgy; rtmpgt = tmpgt;
for ( k = kv0h0; k; k-- )
{
        rgugt[k] = rtmpgx[k] * rtmpgt[k];
        rgvgt[k] = rtmpgy[k] * rtmpgt[k];
}}
{register float *rgtsq, *rtmpgt;
 rgtsq = gtsq; rtmpgt = tmpgt;
for ( k = kv0h0; k; k-- )
{
        rgtsq[k] = rtmpgt[k] * rtmpgt[k];
}}
{register float *rtgtsq, *rgtsq, *rtmp2, *rwrk12;
 rtgtsq = tgtsq; rgtsq = gtsq;
 rtmp2 = tmp2; rwrk12 = wrk12;
for ( k = kv0h0; k; k-- )
{
        rtgtsq[k] = 2.0 * rgtsq[k];
        rtmp2[k] = rsq + psq * rtgtsq[k] + rwrk12[k];
}}
{register float *rtmpl, *rtmp2;
 rtmpl = tmpl; rtmp2 = tmp2;
for ( k = kv0h0; k; k-- )
{
        rtmpl[k] = sqrt( (double) rtmp2[k] );
```

```
}}
{register float *rtemp, *rtmp1, *rtmp2;
 rtemp = temp; rtmp1 = tmp1; rtmp2 = tmp2;
 for ( k = kv0h0; k; k-- )
 {
         rtemp[k] = rsq / (rtmp1[k] * rtmp2[k]);
}}
{register long *rmv0h0;
 register float *rauul, *rgusq, *rtemp;
 rmv0h0 = mv0h0; rauul = auul; rgusq = gusq; rtemp = temp;
 for ( k = kv0h0; k; k-- )
 {
         rauul[rmv0h0[k]] = rauul[rmv0h0[k]] + rgusq[k] * rtemp[k];
}}
{register long *rmv0h0;
 register float *rcuvl, *rgugv, *rtemp;
 rmv0h0 = mv0h0; rcuvl = cuvl; rgugv = gugv; rtemp = temp;
 for ( k = kv0h0; k; k-- )
 {
         rcuvl[rmv0h0[k]] = rcuvl[rmv0h0[k]] + rgugv[k] * rtemp[k];
}}
{register long *rmv0h0;
 register float *rbvvl, *rgvsq, *rtemp;
 rmv0h0 = mv0h0; rbvvl = bvvl; rgvsq = gvsq; rtemp = temp;
 for ( k = kv0h0; k; k-- )
 {
         rbvvl[rmv0h0[k]] = rbvvl[rmv0h0[k]] + rgvsq[k] * rtemp[k];
}}
{register long *rmv0h0;
 register float *rduul, *rgugt, *rtmp1;
 rmv0h0 = mv0h0; rduul = duul; rgugt = gugt; rtmp1 = tmp1;
 for ( k = kv0h0; k; k-- )
 {
         rduul[rmv0h0[k]] = rduul[rmv0h0[k]] - rgugt[k] / rtmp1[k];
}}
{register long *rmv0h0;
 register float *rdvvl, *rgvgt, *rtmp1;
 rmv0h0 = mv0h0; rdvvl = dvvl; rgvgt = gvgt; rtmp1 = tmp1;
 for ( k = kv0h0; k; k-- )
 {
         rdvvl[rmv0h0[k]] = rdvvl[rmv0h0[k]] - rgvgt[k] / rtmp1[k];
}}
}}}}
for ( ii = 2; ii < 6; ii++ )
{
        switch (ii)
        {
        case 2:
                giisq = g2sqf;
                mpvph = mvphp;
                mmvmh = mvmhm;
                kvvhh = kvphp;
                deltah = dd * dsq / sqrt( (double) 2.0 );
                deltav = deltah;
                break;
        case 3:
                giisq = g3sqf;
                mpvph = mv0hp;
                mmvmh = mv0hm;
                kvvhh = kv0hp;
                deltah = dn * dsq;
                deltav = zero;
                break;
        case 4:
                giisq = g4sqf;
                mpvph = mvmhp;
                mmvmh = mvphm;
                kvvhh = kvmhp;
                deltah = dd * dsq / sqrt( (double) 2.0 );
                deltav = - deltah;
                break;
        case 5:
                giisq = g5sqf;
```

```
                    mpvph = mvmh0;
                    mnvmh = mvph0;
                    kvvhh = kvmh0;
                    deltah = zero;
                    deltav = - dn * dsq;
                    break;
            }
            {register float *rwrk03, *rwrk00;
             rwrk03 = wrk03; rwrk00 = wrk00;
             for ( k = kv0h0; k; k-- )
             {
                    rwrk03[k] = - rwrk00[k];
            }}
            {register float *rwrk04, *rwrk01;
             rwrk04 = wrk04; rwrk01 = wrk01;
             for ( k = kv0h0; k; k-- )
             {
                    rwrk04[k] = - rwrk01[k];
            }}
            {register float *rwrk05, *rwrk02;
             rwrk05 = wrk05; rwrk02 = wrk02;
             for ( k = kv0h0; k; k-- )
             {
                    rwrk05[k] = - rwrk02[k];
            }}
            for ( jj = -1; jj < 2; jj += 2 )
            {
                    {register long *rmv0h0;
                     register float *rhcp, *rhcm, *rhv0h0, *ruuvfd;
                     rmv0h0 = mv0h0; rhcp = hcp; rhcm = hcm;
                     rhv0h0 = hv0h0; ruuvfd = uuvfd;
                     for ( k = kv0h0; k; k-- )
                     {
                            rhcp[k] = rhv0h0[rmv0h0[k]]
                                    + dtp * (ruuvfd[rmv0h0[k]] + jj * deltah);
                            rhcm[k] = rhv0h0[rmv0h0[k]]
                                    - dtm * (ruuvfd[rmv0h0[k]] + jj * deltah);
                    }}
                    {register long *rmv0h0;
                     register float *rvcp, *rvcm, *rvv0h0, *rvvvfd;
                     rmv0h0 = mv0h0; rvcp = vcp; rvcm = vcm;
                     rvv0h0 = vv0h0; rvvvfd = vvvfd;
                     for ( k = kv0h0; k; k-- )
                     {
                            rvcp[k] = rvv0h0[rmv0h0[k]]
                                    + dtp * (rvvvfd[rmv0h0[k]] + jj * deltav);
                            rvcm[k] = rvv0h0[rmv0h0[k]]
                                    - dtm * (rvvvfd[rmv0h0[k]] + jj * deltav);
            }}
            itest = setin2(hcp,vcp,m11p,m12p,m21p,m22p,dx1p,
                            dy1p,dx2p,dy2p,dd,dn,kx,ky,nx,ny);
            if ( itest == 0 ) return(0);
            itest = setin2(hcm,vcm,m11m,m12m,m21m,m22m,dx1m,
                            dy1m,dx2m,dy2m,dd,dn,kx,ky,nx,ny);
            if ( itest == 0 ) return(0);
            for ( kk = 0; kk < 3; kk++ )
            {
                    switch (kk)
                    {
                    case 0:
                            ggm = ggmrf;
                            ggp = ggprf;
                            dgtsq = wrk03;
                            break;
                    case 1:
                            ggm = ggmgf;
                            ggp = ggpgf;
                            dgtsq = wrk04;
                            break;
                    case 2:
                            ggm = ggmbf;
                            ggp = ggpbf;
```

```
                    dgtsq = wrk05;
                    break;
        }
        {register long *rm11p, *rm12p;
         register float *rdx2p, *rdx1p, *rggp;
         rm11p = m11p; rm12p = m12p;
         rdx2p = dx2p; rdx1p = dx1p; rggp = ggp;
         for ( k = kv0h0; k; k-- )
         {
                    temp1[k] = rdx2p[k] * rggp[rm11p[k]]
                             + rdx1p[k] * rggp[rm12p[k]];
         }}
        {register long *rm21p, *rm22p;
         register float *rdx2p, *rdx1p, *rggp;
         rm21p = m21p; rm22p = m22p;
         rdx2p = dx2p; rdx1p = dx1p; rggp = ggp;
         for ( k = kv0h0; k; k-- )
         {
                    temp2[k] = rdx2p[k] * rggp[rm21p[k]]
                             + rdx1p[k] * rggp[rm22p[k]];
         }}
        {register float *rtmpgp, *rdy2p, *rdy1p;
         register float *rtemp1, *rtemp2;
         rtmpgp = tmpgp; rdy2p = dy2p; rdy1p = dy1p;
         rtemp1 = temp1; rtemp2 = temp2;
         for ( k = kv0h0; k; k-- )
         {
                    rtmpgp[k] = rdy2p[k] * rtemp1[k]
                              + rdy1p[k] * rtemp2[k];
         }}
        {register long *rm11m, *rm12m;
         register float *rdx2m, *rdx1m, *rggm;
         rm11m = m11m; rm12m = m12m;
         rdx2m = dx2m; rdx1m = dx1m; rggm = ggm;
         for ( k = kv0h0; k; k-- )
         {
                    temp1[k] = rdx2m[k] * rggm[rm11m[k]]
                             + rdx1m[k] * rggm[rm12m[k]];
         }}
        {register long *rm21m, *rm22m;
         register float *rdx2m, *rdx1m, *rggm;
         rm21m = m21m; rm22m = m22m;
         rdx2m = dx2m; rdx1m = dx1m; rggm = ggm;
         for ( k = kv0h0; k; k-- )
         {
                    temp2[k] = rdx2m[k] * rggm[rm21m[k]]
                             + rdx1m[k] * rggm[rm22m[k]];
         }}
        {register float *rtmpgm, *rdy2m, *rdy1m;
         register float *rtemp1, *rtemp2;
         rtmpgm = tmpgm; rdy2m = dy2m; rdy1m = dy1m;
         rtemp1 = temp1; rtemp2 = temp2;
         for ( k = kv0h0; k; k-- )
         {
                    rtmpgm[k] = rdy2m[k] * rtemp1[k]
                              + rdy1m[k] * rtemp2[k];
         }}
        {register float *rtmpgt, *rtmpgp, *rtmpgm;
         rtmpgt = tmpgt; rtmpgp = tmpgp; rtmpgm = tmpgm;
         for ( k = kv0h0; k; k-- )
         {
                    rtmpgt[k] = rtmpgp[k] - rtmpgm[k];
         }}
        {register float *rdgtsq, *rtmpgt;
         rdgtsq = dgtsq; rtmpgt = tmpgt;
         for ( k = kv0h0; k; k-- )
         {
                    rdgtsq[k] = rdgtsq[k]
                              + rtmpgt[k] * rtmpgt[k];
         }}
    }
}
```

```
{register float *rwrk03; rwrk03 = wrk03;
for ( k = kv0h0; k; k-- )
{
        if ( rwrk03[k] < zero ) rwrk03[k] = zero;
}}
{register float *rwrk04; rwrk04 = wrk04;
for ( k = kv0h0; k; k-- )
{
        if ( rwrk04[k] < zero ) rwrk04[k] = zero;
}}
{register float *rwrk05; rwrk05 = wrk05;
for ( k = kv0h0; k; k-- )
{
        if ( rwrk05[k] < zero ) rwrk05[k] = zero;
}}
{register long *rmv0h0;
 register float *rwrk11, *rwrk03, *rwrk04, *rwrk05;
 rmv0h0 = mv0h0; rwrk11 = wrk11; rwrk03 = wrk03;
 rwrk04 = wrk04; rwrk05 = wrk05;
for ( k = kv0h0; k; k-- )
{
        rwrk11[rmv0h0[k]] = rwrk03[k] + rwrk04[k] + rwrk05[k];
}}
{register long *rmpvph, *rmmvmh;
 register float *rgiisq, *rwrk11;
 rmpvph = mpvph; rmmvmh = mmvmh;
 rgiisq = giisq; rwrk11 = wrk11;
for ( k = kvvhh; k; k-- )
{
        rgiisq[rmpvph[k]] = rwrk11[rmpvph[k]] + rwrk11[rmmvmh[k]];
}}
}
return(1);
} setin2(hc,vc,m11,m12,m21,m22,dx1,dy1,dx2,dy2,dd,dn,kx,ky,nx,ny)
long *m11, *m12, *m21, *m22, dd, dn, kx, ky, nx, ny;
float *hc, *vc, *dx1, *dy1, *dx2, *dy2;
/*
/*      This subroutine perform the following functions.
/*
/*              1. The vector field
/*
/*                      { (hc[k],vc[k]) | k = 0, ..., kv0h0 - 1 }
/*
/*      is transformed into the vector field
/*
/*                      { (xc[k],yc[k]) | k = 0, ..., kv0h0 - 1 }
/*
/*      using the relations
/*
/*              xc[k] = kx + tau * (hc[k] - 1.0); k = 0, ..., kv0h0 - 1,
/*
/*              yc[k] = ky + tau * (vc[k] - 1.0); k = 0, ..., kv0h0 - 1.
/*
/*              2. Integer valued fields
/*
/*                      { m11[k], m12[k], m21[k], m22[k] | k = 0, ..., kv0h0 - 1 }
/*
/*      are determined such that the metrix
/*
/*                              m21[k]   m22[k]
/*
/*                              m11[k]   m12[k]
/*
/*      forms a grid cell for every k = 0, ..., kv0h0 - 1.
/*
/*              3. Real valued fields
/*
/*                      { dx1[k], dy1[k], dx2[k], dy2[k] | k = 0, ..., kv0h0 - 1 }
/*
/*      are determined such that the function value f(xc[k],yc[k])
```

```
/*      is a bilinear interpolation of its values at the grid points
/*
/*              f(m11[k]), f(m12[k]), f(m21[k]), f(m22[k])
/*
/*      defined by the relations
/*
/*      f(xc[k],yc[k]) = dy2[k] * (dx2[k] * f(m11[k]) + dx1[k] * f(m12[k]))
/*
/*                    + dy1[k] * (dx2[k] * f(m21[k]) + dx1[k] * f(m22[k])).
*/
{
        register long k;
        long kym1, nx12, nx21, nx22, *mx, *my;
        float xmin, xmax, ymin, ymax, *xc, *yc, *xcr, *ycr;
        xc = dx1; yc = dy1; xcr = dx2; ycr = dy2;
        mx = m21; my = m22; kym1 = ky - 1;
        {register float *rxc, *rhc, *ryc, *rvc;
         rxc = xc; rhc = hc; ryc = yc; rvc = vc;
         for ( k = kv0h0; k; k-- )
         {
                rxc[k] = tau * (rhc[k] - 1.0);
                ryc[k] = tau * (rvc[k] - 1.0);
         }}
        if ( dn == dd )
        {
                xmin = 1 - kx; xmax = nx - kx;
                ymin = 1 - ky; ymax = ny - ky;
                nx12 = dn; nx21 = nx * dn; nx22 = nx * dn + dn;
                {register float *rxc, *ryc;
                 rxc = xc; ryc = yc;
                 for ( k = kv0h0; k; k-- )
                 {
                        if ( rxc[k] < xmin ) rxc[k] = xmin;
                        else if ( rxc[k] > xmax ) rxc[k] = xmax;
                        if ( ryc[k] < ymin ) ryc[k] = ymin;
                        else if ( ryc[k] > ymax ) ryc[k] = ymax;
                 }}
                {register float *rxcr, *rxc, *rycr, *ryc;
                 rxcr = xcr; rxc = xc; rycr = ycr; ryc = yc;
                 for ( k = kv0h0; k; k-- )
                 {
                        rxcr[k] = rxc[k] / dn;
                        rycr[k] = ryc[k] / dn;
                 }}
                {register long *rmx, *rmy;
                 register float *rxcr, *rycr;
                 rmx = mx; rmy = my;
                 rxcr = xcr; rycr = ycr;
                 for ( k = kv0h0; k; k-- )
                 {
                        rmx[k] = floor( (double) rxcr[k] );
                        rmy[k] = floor( (double) rycr[k] );
                 }}
                {register long *rmx;
                 register float *rxcr, *rdx1;
                 rmx = mx; rxcr = xcr; rdx1 = dx1;
                 for ( k = kv0h0; k; k-- )
                 {
                        rdx1[k] = rxcr[k] - rmx[k];
                 }}
                {register long *rmy;
                 register float *rycr, *rdy1;
                 rmy = my; rycr = ycr; rdy1 = dy1;
                 for ( k = kv0h0; k; k-- )
                 {
                        rdy1[k] = rycr[k] - rmy[k];
                 }}
                {register float *rdx2, *rdx1, *rdy2, *rdy1;
                 rdx2 = dx2; rdx1 = dx1; rdy2 = dy2; rdy1 = dy1;
                 for ( k = kv0h0; k; k-- )
                 {
                        rdx2[k] = 1.0 - rdx1[k];
```

```
                rdy2[k] = 1.0 - rdy1[k];
        }}
        {register long rkxm0, rkym1;
         register long *rmx, *rmy;
         rkxm0 = kx; rkym1 = kym1;
         rmx = mx; rmy = my;
         for ( k = kv0h0; k; k-- )
         {
                rmx[k] = rkxm0 + dn * rmx[k];
                rmy[k] = rkym1 + dn * rmy[k];
        }}
        {register long *rm11, *rmx, *rmy, rnx;
         rm11 = m11; rmx = mx; rmy = my; rnx = nx;
         for ( k = kv0h0; k; k-- )
         {
                rm11[k] = rmy[k] * rnx + rmx[k];
        }}
        {register long *rm12, *rm11, rnx12;
         rm12 = m12; rm11 = m11; rnx12 = nx12;
         for ( k = kv0h0; k; k-- )
         {
                rm12[k] = rm11[k] + rnx12;
        }}
        {register long *rm21, *rm11, rnx21;
         rm21 = m21; rm11 = m11; rnx21 = nx21;
         for ( k = kv0h0; k; k-- )
         {
                rm21[k] = rm11[k] + rnx21;
        }}
        {register long *rm22, *rm11, rnx22;
         rm22 = m22; rm11 = m11; rnx22 = nx22;
         for ( k = kv0h0; k; k-- )
         {
                rm22[k] = rm11[k] + rnx22;
        }}
        return(1);
}
if ( dn == (dd + dd) )
{
        xmin = 1 + dd - kx; xmax = nx - dd - kx;
        ymin = 1 + dd - ky; ymax = ny - dd - ky;
        nx12 = nx * dd + dd; nx21 = nx * dd - dd; nx22 = nx * dn;
        {register float *rxc, *ryc;
         rxc = xc; ryc = yc;
         for ( k = kv0h0; k; k-- )
         {
                if ( rxc[k] < xmin ) rxc[k] = xmin;
                else if ( rxc[k] > xmax ) rxc[k] = xmax;
                if ( ryc[k] < ymin ) ryc[k] = ymin;
                else if ( ryc[k] > ymax ) ryc[k] = ymax;
        }}
        {register float *rxcr, *rxc, *rycr, *ryc;
         rxcr = xcr; rxc = xc; rycr = ycr; ryc = yc;
         for ( k = kv0h0; k; k-- )
         {
                rxcr[k] = (ryc[k] + rxc[k]) / dn;
                rycr[k] = (ryc[k] - rxc[k]) / dn;
        }}
        {register long *rmx, *rmy;
         register float *rxcr, *rycr;
         rmx = mx; rmy = my;
         rxcr = xcr; rycr = ycr;
         for ( k = kv0h0; k; k-- )
         {
                rmx[k] = floor( (double) rxcr[k] );
                rmy[k] = floor( (double) rycr[k] );
        }}
        {register long *rmx;
         register float *rxcr, *rdx1;
         rmx = mx; rxcr = xcr; rdx1 = dx1;
         for ( k = kv0h0; k; k-- )
         {
```

```
                        rdx1[k] = rxcr[k] - rmx[k];
                }}
                {register long *rmy;
                 register float *rycr, *rdy1;
                 rmy = my; rycr = ycr; rdy1 = dy1;
                 for ( k = kv0h0; k; k-- )
                 {
                        rdy1[k] = rycr[k] - rmy[k];
                }}
                {register float *rdx2, *rdx1, *rdy2, *rdy1;
                 rdx2 = dx2; rdx1 = dx1; rdy2 = dy2; rdy1 = dy1;
                 for ( k = kv0h0; k; k-- )
                 {
                        rdx2[k] = 1.0 - rdx1[k];
                        rdy2[k] = 1.0 - rdy1[k];
                }}
                {register long rkxm0, rkym1;
                 register long *rmx, *rmy;
                 register long *rmxx, *rmyy;
                 rkxm0 = kx; rkym1 = kym1;
                 rmx = mx; rmy = my;
                 rmxx = m11; rmyy = m12;
                 for ( k = kv0h0; k; k-- )
                 {
                        rmxx[k] = rkxm0 + dd * (rmx[k] - rmy[k]);
                        rmyy[k] = rkym1 + dd * (rmx[k] + rmy[k]);
                }}
                {register long *rm11, *rmxx, *rmyy, rnx;
                 rm11 = m11; rmxx = m11; rmyy = m12; rnx = nx;
                 for ( k = kv0h0; k; k-- )
                 {
                        rm11[k] = rmyy[k] * rnx + rmxx[k];
                }}
                {register long *rm12, *rm11, rnx12;
                 rm12 = m12; rm11 = m11; rnx12 = nx12;
                 for ( k = kv0h0; k; k-- )
                 {
                        rm12[k] = rm11[k] + rnx12;
                }}
                {register long *rm21, *rm11, rnx21;
                 rm21 = m21; rm11 = m11; rnx21 = nx21;
                 for ( k = kv0h0; k; k-- )
                 {
                        rm21[k] = rm11[k] + rnx21;
                }}
                {register long *rm22, *rm11, rnx22;
                 rm22 = m22; rm11 = m11; rnx22 = nx22;
                 for ( k = kv0h0; k; k-- )
                 {
                        rm22[k] = rm11[k] + rnx22;
                }}
                return(1);
        }
        return(0);
} setin1(dd,dn,kh,kv,mh,mv,nh)
long dd, dn, kh, kv, mh, mv, nh;
{
        register long i, j, ix, jy, j1;
        long nhtdn, nhp1, nhm1;
        nhtdn = nh * dn;
        nhp1 = nh + 1;
        nhm1 = nh - 1;
        if ( dn == dd ) {
                kv0h0 =   mv       *  mh;
                kvphp = (mv - 1)   * (mh - 1);
                kv0hp =   mv       * (mh - 1);
                kvmhp = (mv - 1)   * (mh - 1);
                kvmh0 = (mv - 1)   *  mh;
                kvmhm = (mv - 1)   * (mh - 1);
                kv0hm =   mv       * (mh - 1);
```

```
            kvphm = (mv - 1) * (mh - 1);
            kvph0 = (mv - 1) *  mh;
} else if ( dn == (dd + dd) ) {
            kv0h0 =  mv       *  mh      + (mv - 1) * (mh - 1);
            kvphp = (mv - 1) * (mh - 1) + (mv - 1) * (mh - 1);
            kv0hp =  mv       * (mh - 1) + (mv - 1) * (mh - 2);
            kvmhp = (mv - 1) * (mh - 1) + (mv - 1) * (mh - 1);
            kvmh0 = (mv - 1) *  mh      + (mv - 2) * (mh - 1);
            kvmhm = (mv - 1) * (mh - 1) + (mv - 1) * (mh - 1);
            kv0hm =  mv       * (mh - 1) + (mv - 1) * (mh - 2);
            kvphm = (mv - 1) * (mh - 1) + (mv - 1) * (mh - 1);
            kvph0 = (mv - 1) *  mh      + (mv - 2) * (mh - 1);
} else return(0);
i = 1; jl = (kv - 1) * nh + kh;
for ( jy = 0; jy < mv; jy++ )
{
        j = jl; jl += nhtdn;
        for ( ix = 0; ix < mh; ix++ )
        {
                mv0h0[i] = j;
                hv0h0[i] = kh + ix * dn;
                vv0h0[i] = kv + jy * dn;
                i++; j += dn;
        }
}
i = 1; jl = (kv - 1) * nh + kh;
for ( jy = 1; jy < mv; jy++ )
{
        j = jl; jl += nhtdn;
        for ( ix = 1; ix < mh; ix++ )
        {
                mvmhm[i] = j;
                mvphp[i] = j + nhp1 * dd;
                i++; j += dn;
        }
}
i = 1; jl = (kv - 1) * nh + kh;
for ( jy = 0; jy < mv; jy++ )
{
        j = jl; jl += nhtdn;
        for ( ix = 1; ix < mh; ix++ )
        {
                mv0hm[i] = j;
                mv0hp[i] = j + dn;
                i++; j += dn;
        }
}
i = 1; jl = (kv - 1 + dn) * nh + kh;
for ( jy = 1; jy < mv; jy++ )
{
        j = jl; jl += nhtdn;
        for ( ix = 1; ix < mh; ix++ )
        {
                mvphm[i] = j;
                mvmhp[i] = j - nhm1 * dd;
                i++; j += dn;
        }
}
i = 1; jl = (kv - 1 + dn) * nh + kh;
for ( jy = 1; jy < mv; jy++ )
{
        j = jl; jl += nhtdn;
        for ( ix = 0; ix < mh; ix++ )
        {
                mvph0[i] = j;
                mvmh0[i] = j - nhtdn;
                i++; j += dn;
        }
}
if ( dn == dd ) return(1);
i = mv * mh + 1;
jl = (kv - 1 + dd) * nh + kh + dd;
```

```c
                for ( jy = 1; jy < mv; jy++ )
                {
                        j = jl; jl += nhtdn;
                        for ( ix = 1; ix < mh; ix++ )
                        {
                                mv0h0[i] = j;
                                hv0h0[i] = kh + ix * dn - dd;
                                vv0h0[i] = kv + jy * dn - dd;
                                i++; j += dn;
                        }
                }
                i = (mv - 1) * (mh - 1) + 1;
                jl = (kv - 1 + dd) * nh + kh + dd;
                for ( jy = 1; jy < mv; jy++ )
                {
                        j = jl; jl += nhtdn;
                        for ( ix = 1; ix < mh; ix++ )
                        {
                                mvmhm[i] = j;
                                mvphp[i] = j + nhp1 * dd;
                                i++; j += dn;
                        }
                }
                i = mv * (mh - 1) + 1;
                jl = (kv - 1 + dd) * nh + kh + dd;
                for ( jy = 1; jy < mv; jy++ )
                {
                        j = jl; jl += nhtdn;
                        for ( ix = 2; ix < mh; ix++ )
                        {
                                mv0hm[i] = j;
                                mv0hp[i] = j + dn;
                                i++; j += dn;
                        }
                }
                i = (mv - 1) * (mh - 1) + 1;
                jl = (kv - 1 + dd) * nh + kh + dd;
                for ( jy = 1; jy < mv; jy++ )
                {
                        j = jl; jl += nhtdn;
                        for ( ix = 1; ix < mh; ix++ )
                        {
                                mvphm[i] = j;
                                mvmhp[i] = j - nhm1 * dd;
                                i++; j += dn;
                        }
                }
                i = (mv - 1) * mh + 1;
                jl = (kv - 1 + dn + dd) * nh + kh + dd;
                for ( jy = 2; jy < mv; jy++ )
                {
                        j = jl; jl += nhtdn;
                        for ( ix = 1; ix < mh; ix++ )
                        {
                                mvph0[i] = j;
                                mvmh0[i] = j - nhtdn;
                                i++; j += dn;
                        }
                }
                return(1);
} conjgr(rknf,feps,kmax,iter,flag)
long kmax, iter, flag;
float *rknf, feps;
{
        register long k;
        long kit;
        double ak, akm1, bk, dtemp;
float alphak, betak, *du, *dv, *ainv, *cinv, *binv;
if ( flag == 1 )
{
```

```
                du = duufp;
                dv = dvvfp;
                ainv = ainvp;
                cinv = cinvp;
                binv = binvp;
        } else {
                du = duufm;
                dv = dvvfm;
                ainv = ainvm;
                cinv = cinvm;
                binv = binvm;
        }
        {register long *rmv0h0;
         register float *ud, *vd;
         rmv0h0 = mv0h0; ud = udvfd; vd = vdvfd;
        for ( k = kv0h0; k; k-- )
        {
                ud[rmv0h0[k]] = zero;
                vd[rmv0h0[k]] = zero;
        }}
        {register long *rmv0h0;
         register float *ru, *rv;
         register float *rdu, *rdv;
         rmv0h0 = mv0h0;
         ru = rucvf; rv = rvcvf;
         rdu = du; rdv = dv;
        for ( k = kv0h0; k; k-- )
        {
                ru[rmv0h0[k]] = rdu[rmv0h0[k]];
                rv[rmv0h0[k]] = rdv[rmv0h0[k]];
        }}
        {register long *rmv0h0;
         register float *ru, *rv;
         register float *rainv, *rcinv;
         rmv0h0 = mv0h0;
         ru = rucvf; rv = rvcvf;
         rainv = ainv; rcinv = cinv;
        for ( k = kv0h0; k; k-- )
        {
                zucvf[rmv0h0[k]] = rainv[rmv0h0[k]] * ru[rmv0h0[k]]
                                 + rcinv[rmv0h0[k]] * rv[rmv0h0[k]];
        }}
        {register long *rmv0h0;
         register float *ru, *rv;
         register float *rbinv, *rcinv;
         rmv0h0 = mv0h0;
         ru = rucvf; rv = rvcvf;
         rbinv = binv; rcinv = cinv;
        for ( k = kv0h0; k; k-- )
        {
                zvcvf[rmv0h0[k]] = rcinv[rmv0h0[k]] * ru[rmv0h0[k]]
                                 + rbinv[rmv0h0[k]] * rv[rmv0h0[k]];
        }}
        for ( kit = 0; kit <= kmax; kit++ )
        {
                if ( ( *rknf < feps ) || ( kit == kmax ) ) return;
                {register long *rmv0h0;
                 register float *ru, *rv;
                 register float *zu, *zv;
                 rmv0h0 = mv0h0;
                 ru = rucvf; rv = rvcvf;
                 zu = zucvf; zv = zvcvf;
                ak = zero;
                for ( k = kv0h0; k; k-- )
                {
                        ak = ak + ru[rmv0h0[k]] * zu[rmv0h0[k]]
                                + rv[rmv0h0[k]] * zv[rmv0h0[k]];
                }}
                if ( kit > 0 )
                {
                        betak = ak / akm1;
                        {register long *rmv0h0;
```

```
         register float *pu, *pv;
         register float *zu, *zv;
         rmv0h0 = mv0h0;
         pu = pucvf; pv = pvcvf;
         zu = zucvf; zv = zvcvf;
         for ( k = kv0h0; k; k-- )
         {
                 pu[rmv0h0[k]] = pu[rmv0h0[k]] * betak
                                 + zu[rmv0h0[k]];
                 pv[rmv0h0[k]] = pv[rmv0h0[k]] * betak
                                 + zv[rmv0h0[k]];
         }}
} else {
        {register long *rmv0h0;
         register float *pu, *pv;
         register float *zu, *zv;
         rmv0h0 = mv0h0;
         pu = pucvf; pv = pvcvf;
         zu = zucvf; zv = zvcvf;
         for ( k = kv0h0; k; k-- )
         {
                 pu[rmv0h0[k]] = zu[rmv0h0[k]];
                 pv[rmv0h0[k]] = zv[rmv0h0[k]];
         }}
}
mattvr(pucvf,pvcvf,qucvf,qvcvf,flag);
{register long *rmv0h0;
 register float *pu, *pv;
 register float *qu, *qv;
 rmv0h0 = mv0h0;
 pu = pucvf; pv = pvcvf;
 qu = qucvf; qv = qvcvf;
 bk = zero;
 for ( k = kv0h0; k; k-- )
 {
         bk = bk + pu[rmv0h0[k]] * qu[rmv0h0[k]]
                 + pv[rmv0h0[k]] * qv[rmv0h0[k]];
}}
alphak = ak / bk;
{register long *rmv0h0;
 register float *pu, *pv;
 register float *ud, *vd;
 rmv0h0 = mv0h0;
 pu = pucvf; pv = pvcvf;
 ud = udvfd; vd = vdvfd;
 for ( k = kv0h0; k; k-- )
 {
         ud[rmv0h0[k]] = ud[rmv0h0[k]] + alphak * pu[rmv0h0[k]];
         vd[rmv0h0[k]] = vd[rmv0h0[k]] + alphak * pv[rmv0h0[k]];
}}
{register long *rmv0h0;
 register float *ru, *rv;
 register float *qu, *qv;
 rmv0h0 = mv0h0;
 ru = rucvf; rv = rvcvf;
 qu = qucvf; qv = qvcvf;
 for ( k = kv0h0; k; k-- )
 {
         ru[rmv0h0[k]] = ru[rmv0h0[k]] - alphak * qu[rmv0h0[k]];
         rv[rmv0h0[k]] = rv[rmv0h0[k]] - alphak * qv[rmv0h0[k]];
}}
akm1 = ak;
{register long *rmv0h0;
 register float *ru, *rv;
 register float *rainv, *rcinv;
 rmv0h0 = mv0h0;
 ru = rucvf; rv = rvcvf;
 rainv = ainv; rcinv = cinv;
 for ( k = kv0h0; k; k-- )
 {
         zucvf[rmv0h0[k]] = rainv[rmv0h0[k]] * ru[rmv0h0[k]]
                          + rcinv[rmv0h0[k]] * rv[rmv0h0[k]];
```

```
                })
                {register long *rmv0h0;
                 register float *ru, *rv;
                 register float *rbinv, *rcinv;
                 rmv0h0 = mv0h0;
                 ru = rucvf; rv = rvcvf;
                 rbinv = binv; rcinv = cinv;
                 for ( k = kv0h0; k; k-- )
                 {
                        zvcvf[rmv0h0[k]] = rcinv[rmv0h0[k]] * ru[rmv0h0[k]]
                                         + rbinv[rmv0h0[k]] * rv[rmv0h0[k]];
                }}
                {register long *rmv0h0;
                 register float *ru, *rv;
                 rmv0h0 = mv0h0;
                 ru = rucvf; rv = rvcvf;
                 dtemp = zero;
                 for ( k = kv0h0; k; k-- )
                 {
                        dtemp = dtemp + ru[rmv0h0[k]] * ru[rmv0h0[k]]
                                      + rv[rmv0h0[k]] * rv[rmv0h0[k]];
                }}
                *rknf = sqrt(dtemp);
        }
} setmtx(dd,dn,rknf,flag)
long dd, dn, flag;
float *rknf;
{
        register long k;
        double dtemp;
        long s, k1, *m1, *m2;
        float scn, scd, scl, sclsq;
        float *gg, *auu, *cuv, *bvv, *duv, *du, *dv;
        float *suma, *sumc, *sumb, *sumd, *u, *v, *u0, *v0;
        float *auu1, *cuv1, *bvv1, *ainv, *cinv, *binv;
        float *dutmp, *dvtmp, *tmpgu, *tmpgv, *tempg;
        float *tmpuu, *tmpuv, *tmpvv, *temp1, *temp2, *temp3;
        suma = rucvf; sumc = rvcvf; u = uuvfd; u0 = u0vfd;
        sumb = zucvf; sumd = zvcvf; v = vvvfd; v0 = v0vfd;
        dutmp = pucvf; dvtmp = pvcvf;   duv = wrk00;
        tmpgu = qucvf; tmpgv = qvcvf; tempg = wrk01;
        tmpuu = wrk02; tmpuv = wrk03; tmpvv = wrk04;
        temp1 = wrk05; temp2 = wrk06; temp3 = wrk07;
        if ( flag == 1 ) {
                du   = duufp;
                dv   = dvvfp;
                ainv = ainvp;
                cinv = cinvp;
                binv = binvp;
                auu1 = auu1p;
                cuv1 = cuv1p;
                bvv1 = bvv1p;
        } else {
                du   = duufm;
                dv   = dvvfm;
                ainv = ainvm;
                cinv = cinvm;
                binv = binvm;
                auu1 = auu1m;
                cuv1 = cuv1m;
                bvv1 = bvv1m;
        }
        {register long *rmv0h0, k0h0;
         register float *rsuma, *rsumc, *rsumb, *rsumd;
         rmv0h0 = mv0h0;
         rsuma = suma; rsumc = sumc;
         rsumb = sumb; rsumd = sumd;
         for ( k = kv0h0; k; k-- )
         {
                k0h0 = rmv0h0[k];
```

```
                    rsuma[k0h0] = gama1;
                    rsumc[k0h0] =  zero;
                    rsumb[k0h0] = gama1;
                    rsumd[k0h0] = -gama;
    }}
    scn = 1.0 / dn;
    scd = sqrt((double)0.5) / dd;
    for ( s = 2; s < 6; s++ )
    {
            switch (s)
            {
            case 2:
                    k1 = kvphp;
                    m1 = mvmhm;
                    m2 = mvphp;
                    gg = g2sqf;
                    if ( flag == 1 ) {
                            auu = auu2p;
                            cuv = cuv2p;
                            bvv = bvv2p;
                    } else {
                            auu = auu2m;
                            cuv = cuv2m;
                            bvv = bvv2m;
                    }
                    scl = scd;
                    break;
            case 3:
                    k1 = kv0hp;
                    m1 = mv0hm;
                    m2 = mv0hp;
                    gg = g3sqf;
                    if ( flag == 1 ) {
                            auu = auu3p;
                            cuv = cuv3p;
                            bvv = bvv3p;
                    } else {
                            auu = auu3m;
                            cuv = cuv3m;
                            bvv = bvv3m;
                    }
                    scl = scn;
                    break;
            case 4:
                    k1 = kvmhp;
                    m1 = mvphm;
                    m2 = mvmhp;
                    gg = g4sqf;
                    if ( flag == 1 ) {
                            auu = auu4p;
                            cuv = cuv4p;
                            bvv = bvv4p;
                    } else {
                            auu = auu4m;
                            cuv = cuv4m;
                            bvv = bvv4m;
                    }
                    scl = scd;
                    break;
            case 5:
                    k1 = kvmh0;
                    m1 = mvph0;
                    m2 = mvmh0;
                    gg = g5sqf;
                    if ( flag == 1 ) {
                            auu = auu5p;
                            cuv = cuv5p;
                            bvv = bvv5p;
                    } else {
                            auu = auu5m;
                            cuv = cuv5m;
                            bvv = bvv5m;
```

```
                }
                scl = scn;
                break;
        }
}
sclsq = scl * scl;
{register long *rm1, *rm2;
 register float *ru, *rv, *rgg;
 register float *rdutmp, *rdvtmp, *rtempg;
 rm1 = m1; rm2 = m2;
 ru = u; rv = v; rgg = gg;
 rdutmp = dutmp; rdvtmp = dvtmp; rtempg = tempg;
 for ( k = k1; k; k-- )
 {
        rdutmp[k] = scl * (ru[rm2[k]] - ru[rm1[k]]);
        rdvtmp[k] = scl * (rv[rm2[k]] - rv[rm1[k]]);
        rtempg[k] = csq + bsq * rgg[rm2[k]];
}}
{register float *rtmpgu, *rtmpgv, *rtempg, *rdutmp, *rdvtmp;
 rtmpgu = tmpgu; rtmpgv = tmpgv; rtempg = tempg;
 rdutmp = dutmp; rdvtmp = dvtmp;
 for ( k = k1; k; k-- )
 {
        rtmpgu[k] = rtempg[k] * rdutmp[k];
        rtmpgv[k] = rtempg[k] * rdvtmp[k];
}}
{register float *rtmpuu, *rtmpvv, *rtmpgu;
 register float *rtmpgv, *rdutmp, *rdvtmp;
 rtmpuu = tmpuu; rtmpvv = tmpvv; rtmpgu = tmpgu;
 rtmpgv = tmpgv; rdutmp = dutmp; rdvtmp = dvtmp;
 for ( k = k1; k; k-- )
 {
        rtmpuu[k] = rtmpgu[k] * rdutmp[k];
        rtmpvv[k] = rtmpgv[k] * rdvtmp[k];
}}
{register float *rtmpuv, *rtmpgu, *rdvtmp;
 register float *rtemp2, *rtmpuu, *rtmpvv;
 rtmpuv = tmpuv; rtmpgu = tmpgu; rdvtmp = dvtmp;
 rtemp2 = temp2; rtmpuu = tmpuu; rtmpvv = tmpvv;
 for ( k = k1; k; k-- )
 {
        rtmpuv[k] = rtmpgu[k] * rdvtmp[k];
        rtemp2[k] = asq + rtmpuu[k] + rtmpvv[k];
}}
{register float *rtemp1, *rtemp2;
 rtemp1 = temp1; rtemp2 = temp2;
 for ( k = k1; k; k-- )
 {
        rtemp1[k] = sqrt( (double) rtemp2[k] );
}}
{register float *rtemp1, *rtemp2, *rtemp3, *rtmpuu, *rtmpvv;
 rtemp1 = temp1; rtemp2 = temp2; rtemp3 = temp3;
 rtmpuu = tmpuu; rtmpvv = tmpvv;
 for ( k = k1; k; k-- )
 {
        rtemp3[k] = rtemp1[k] * rtemp2[k];
        rtmpuu[k] = asq       + rtmpuu[k];
        rtmpvv[k] = asq       + rtmpvv[k];
}}
{register long *rm2;
 register float *rauu, *rcuv, *rtemp3, *rtmpvv, *rtmpuv;
 rm2 = m2; rauu = auu; rcuv = cuv; rtemp3 = temp3;
 rtmpvv = tmpvv; rtmpuv = tmpuv;
 for ( k = k1; k; k-- )
 {
        rauu[rm2[k]] = - sclsq * rtmpvv[k] / rtemp3[k];
        rcuv[rm2[k]] =   sclsq * rtmpuv[k] / rtemp3[k];
}}
{register long *rm2;
 register float *rbvv, *rduv, *rtemp3, *rtemp1, *rtmpuu;
 rm2 = m2; rbvv = bvv; rduv = duv; rtemp3 = temp3;
 rtemp1 = temp1; rtmpuu = tmpuu;
 for ( k = k1; k; k-- )
 {
```

```
                    rbvv[rm2[k]] = - sclsq * rtmpuu[k] / rtemp3[k];
                    rduv[rm2[k]] =   sclsq            / rtempl[k];
            }}
            {register long *rm1, *rm2;
             register float *rsuma, *rsumc, *rauu, *rcuv;
             rm1 = m1; rm2 = m2;
             rsuma = suma; rsumc = sumc;
             rauu = auu; rcuv = cuv;
             for ( k = kl; k; k-- )
             {
                    rsuma[rm1[k]] = rsuma[rm1[k]] - rauu[rm2[k]];
                    rsuma[rm2[k]] = rsuma[rm2[k]] - rauu[rm2[k]];
                    rsumc[rm1[k]] = rsumc[rm1[k]] - rcuv[rm2[k]];
                    rsumc[rm2[k]] = rsumc[rm2[k]] - rcuv[rm2[k]];
            }}
            {register long *rm1, *rm2;
             register float *rsumb, *rsumd, *rbvv, *rduv;
             rm1 = m1; rm2 = m2;
             rsumb = sumb; rsumd = sumd;
             rbvv = bvv; rduv = duv;
             for ( k = kl; k; k-- )
             {
                    rsumb[rm1[k]] = rsumb[rm1[k]] - rbvv[rm2[k]];
                    rsumb[rm2[k]] = rsumb[rm2[k]] - rbvv[rm2[k]];
                    rsumd[rm1[k]] = rsumd[rm1[k]] - rduv[rm2[k]];
                    rsumd[rm2[k]] = rsumd[rm2[k]] - rduv[rm2[k]];
            }}
            {register long *rm1, *rm2;
             register float *rdu, *ru, *rduv;
             rm1 = m1; rm2 = m2;
             rdu = du; ru = u; rduv = duv;
             for ( k = kl; k; k-- )
             {
                    rdu[rm1[k]] = rdu[rm1[k]] + ru[rm2[k]] * rduv[rm2[k]];
                    rdu[rm2[k]] = rdu[rm2[k]] + ru[rm1[k]] * rduv[rm2[k]];
            }}
            {register long *rm1, *rm2;
             register float *rdv, *rv, *rduv;
             rm1 = m1; rm2 = m2;
             rdv = dv; rv = v; rduv = duv;
             for ( k = kl; k; k-- )
             {
                    rdv[rm1[k]] = rdv[rm1[k]] + rv[rm2[k]] * rduv[rm2[k]];
                    rdv[rm2[k]] = rdv[rm2[k]] + rv[rm1[k]] * rduv[rm2[k]];
            }}
    }
    {register long *rmv0h0;
     register float *rsuma, *rsumc, *rauul, *rcuvl;
     rmv0h0 = mv0h0;
     rsuma = suma; rsumc = sumc;
     rauul = auul; rcuvl = cuvl;
     for ( k = kv0h0; k; k-- )
     {
            rauul[rmv0h0[k]] = rauul[rmv0h0[k]] + rsuma[rmv0h0[k]];
            rcuvl[rmv0h0[k]] = rcuvl[rmv0h0[k]] + rsumc[rmv0h0[k]];
    }}
    {register long *rmv0h0;
     register float *rsumb, *rbvvl;
     rmv0h0 = mv0h0;
     rsumb = sumb; rbvvl = bvvl;
     for ( k = kv0h0; k; k-- )
     {
            rbvvl[rmv0h0[k]] = rbvvl[rmv0h0[k]] + rsumb[rmv0h0[k]];
    }}
    {register long *rmv0h0;
     register float *rdu, *rsumd, *ru, *ru0;
     rmv0h0 = mv0h0; rdu = du; rsumd = sumd; ru = u; ru0 = u0;
     for ( k = kv0h0; k; k-- )
     {
            rdu[rmv0h0[k]] = rdu[rmv0h0[k]] + gama * ru0[rmv0h0[k]]
                           + rsumd[rmv0h0[k]] * ru[rmv0h0[k]];
    }}
```

```
        {register long *rmv0h0;
         register float *rdv, *rsumd, *rv, *rv0;
         rmv0h0 = mv0h0; rdv = dv; rsumd = sumd; rv = v; rv0 = v0;
         for ( k = kv0h0; k; k-- )
         {
                 rdv[rmv0h0[k]] = rdv[rmv0h0[k]] + gama * rv0[rmv0h0[k]]
                                 + rsumd[rmv0h0[k]] * rv[rmv0h0[k]];
        }}
        dtemp = zero;
        {register long *rmv0h0;
         register float *rdu, *rdv;
         rmv0h0 = mv0h0;
         rdu = du; rdv = dv;
         for ( k = kv0h0; k; k-- )
         {
                 dtemp = dtemp + rdu[rmv0h0[k]] * rdu[rmv0h0[k]]
                               + rdv[rmv0h0[k]] * rdv[rmv0h0[k]];
        }}
        *rknf = sqrt(dtemp);
        {register long *rmv0h0;
         register float *rtemp1, *rauu1, *rcuv1, *rbvv1;
         rmv0h0 = mv0h0;
         rtemp1 = temp1; rauu1 = auu1;
         rcuv1 = cuv1; rbvv1 = bvv1;
         for ( k = kv0h0; k; k-- )
         {
                 rtemp1[rmv0h0[k]] = rauu1[rmv0h0[k]] * rbvv1[rmv0h0[k]]
                                   - rcuv1[rmv0h0[k]] * rcuv1[rmv0h0[k]];
        }}
        {register long *rmv0h0;
         register float *rainv, *rbvv1, *rtemp1;
         rmv0h0 = mv0h0;
         rainv = ainv; rbvv1 = bvv1; rtemp1 = temp1;
         for ( k = kv0h0; k; k-- )
         {
                 rainv[rmv0h0[k]] = rbvv1[rmv0h0[k]] / rtemp1[rmv0h0[k]];
        }}
        {register long *rmv0h0;
         register float *rcinv, *rcuv1, *rtemp1;
         rmv0h0 = mv0h0;
         rcinv = cinv; rcuv1 = cuv1; rtemp1 = temp1;
         for ( k = kv0h0; k; k-- )
         {
                 rcinv[rmv0h0[k]] = - rcuv1[rmv0h0[k]] / rtemp1[rmv0h0[k]];
        }}
        {register long *rmv0h0;
         register float *rbinv, *rauu1, *rtemp1;
         rmv0h0 = mv0h0;
         rbinv = binv; rauu1 = auu1; rtemp1 = temp1;
         for ( k = kv0h0; k; k-- )
         {
                 rbinv[rmv0h0[k]] = rauu1[rmv0h0[k]] / rtemp1[rmv0h0[k]];
        }}
} mattvr(u1,v1,u2,v2,flag)
long flag;
float *u1, *v1, *u2, *v2;
{
        register long k;
        float *av0h0, *avphp, *av0hp, *avmhp, *avmh0;
        float *cv0h0, *cvphp, *cv0hp, *cvmhp, *cvmh0;
        float *bv0h0, *bvphp, *bv0hp, *bvmhp, *bvmh0;
        if ( flag == 1 ) {
                av0h0 = auu1p;
                cv0h0 = cuv1p;
                bv0h0 = bvv1p;
                avphp = auu2p;
                cvphp = cuv2p;
                bvphp = bvv2p;
                av0hp = auu3p;
                cv0hp = cuv3p;
```

```
                bv0hp = bvv3p;
                avmhp = auu4p;
                cvmhp = cuv4p;
                bvmhp = bvv4p;
                avmh0 = auu5p;
                cvmh0 = cuv5p;
                bvmh0 = bvv5p;
        } else {
                av0h0 = auu1m;
                cv0h0 = cuv1m;
                bv0h0 = bvv1m;
                avphp = auu2m;
                cvphp = cuv2m;
                bvphp = bvv2m;
                av0hp = auu3m;
                cv0hp = cuv3m;
                bv0hp = bvv3m;
                avmhp = auu4m;
                cvmhp = cuv4m;
                bvmhp = bvv4m;
                avmh0 = auu5m;
                cvmh0 = cuv5m;
                bvmh0 = bvv5m;
        }
        {register long *rmv0h0, k0h0;
         register float *rav0h0, *rcv0h0, *ru2, *ru1, *rv1;
         rmv0h0 = mv0h0;
         rav0h0 = av0h0; rcv0h0 = cv0h0;
         ru2 = u2; ru1 = u1; rv1 = v1;
         for ( k = kv0h0; k; k-- )
         {
                k0h0 = rmv0h0[k];
                ru2[k0h0] = rav0h0[k0h0] * ru1[k0h0] + rcv0h0[k0h0] * rv1[k0h0];
        }}
        {register long *rmv0h0, k0h0;
         register float *rbv0h0, *rcv0h0, *rv2, *ru1, *rv1;
         rmv0h0 = mv0h0;
         rbv0h0 = bv0h0; rcv0h0 = cv0h0;
         rv2 = v2; ru1 = u1; rv1 = v1;
         for ( k = kv0h0; k; k-- )
         {
                k0h0 = rmv0h0[k];
                rv2[k0h0] = rcv0h0[k0h0] * ru1[k0h0] + rbv0h0[k0h0] * rv1[k0h0];
        }}
        {register long *rmvmhm, *rmvphp, kmhm, kphp;
         register float *ravphp, *rcvphp, *ru2, *ru1, *rv1;
         rmvmhm = mvmhm; rmvphp = mvphp;
         ravphp = avphp; rcvphp = cvphp;
         ru2 = u2; ru1 = u1; rv1 = v1;
         for ( k = kvphp; k; k-- )
         {
                kmhm = rmvmhm[k]; kphp = rmvphp[k];
                ru2[kmhm] = ru2[kmhm] + ravphp[kphp] * ru1[kphp]
                                      + rcvphp[kphp] * rv1[kphp];
        }}
        {register long *rmvmhm, *rmvphp, kmhm, kphp;
         register float *rbvphp, *rcvphp, *rv2, *ru1, *rv1;
         rmvmhm = mvmhm; rmvphp = mvphp;
         rbvphp = bvphp; rcvphp = cvphp;
         rv2 = v2; ru1 = u1; rv1 = v1;
         for ( k = kvphp; k; k-- )
         {
                kmhm = rmvmhm[k]; kphp = rmvphp[k];
                rv2[kmhm] = rv2[kmhm] + rcvphp[kphp] * ru1[kphp]
                                      + rbvphp[kphp] * rv1[kphp];
        }}
        {register long *rmv0hm, *rmv0hp, k0hm, k0hp;
         register float *rav0hp, *rcv0hp, *ru2, *ru1, *rv1;
         rmv0hm = mv0hm; rmv0hp = mv0hp;
         rav0hp = av0hp; rcv0hp = cv0hp;
         ru2 = u2; ru1 = u1; rv1 = v1;
         for ( k = kv0hp; k; k-- )
```

```
{
        k0hm = rmv0hm[k]; k0hp = rmv0hp[k];
        ru2[k0hm] = ru2[k0hm] + rav0hp[k0hp] * rul[k0hp]
                             + rcv0hp[k0hp] * rvl[k0hp];
}}
{register long *rmv0hm, *rmv0hp, k0hm, k0hp;
 register float *rbv0hp, *rcv0hp, *rv2, *rul, *rvl;
 rmv0hm = mv0hm; rmv0hp = mv0hp;
 rbv0hp = bv0hp; rcv0hp = cv0hp;
 rv2 = v2; rul = ul; rvl = vl;
for ( k = kv0hp; k; k-- )
{
        k0hm = rmv0hm[k]; k0hp = rmv0hp[k];
        rv2[k0hm] = rv2[k0hm] + rcv0hp[k0hp] * rul[k0hp]
                             + rbv0hp[k0hp] * rvl[k0hp];
}}
{register long *rmvphm, *rmvmhp, kphm, kmhp;
 register float *ravmhp, *rcvmhp, *ru2, *rul, *rvl;
 rmvphm = mvphm; rmvmhp = mvmhp;
 ravmhp = avmhp; rcvmhp = cvmhp;
 ru2 = u2; rul = ul; rvl = vl;
for ( k = kvmhp; k; k-- )
{
        kphm = rmvphm[k]; kmhp = rmvmhp[k];
        ru2[kphm] = ru2[kphm] + ravmhp[kmhp] * rul[kmhp]
                             + rcvmhp[kmhp] * rvl[kmhp];
}}
{register long *rmvphm, *rmvmhp, kphm, kmhp;
 register float *rbvmhp, *rcvmhp, *rv2, *rul, *rvl;
 rmvphm = mvphm; rmvmhp = mvmhp;
 rbvmhp = bvmhp; rcvmhp = cvmhp;
 rv2 = v2; rul = ul; rvl = vl;
for ( k = kvmhp; k; k-- )
{
        kphm = rmvphm[k]; kmhp = rmvmhp[k];
        rv2[kphm] = rv2[kphm] + rcvmhp[kmhp] * rul[kmhp]
                             + rbvmhp[kmhp] * rvl[kmhp];
}}
{register long *rmvph0, *rmvmh0, kph0, kmh0;
 register float *ravmh0, *rcvmh0, *ru2, *rul, *rvl;
 rmvph0 = mvph0; rmvmh0 = mvmh0;
 ravmh0 = avmh0; rcvmh0 = cvmh0;
 ru2 = u2; rul = ul; rvl = vl;
for ( k = kvmh0; k; k-- )
{
        kph0 = rmvph0[k]; kmh0 = rmvmh0[k];
        ru2[kph0] = ru2[kph0] + ravmh0[kmh0] * rul[kmh0]
                             + rcvmh0[kmh0] * rvl[kmh0];
}}
{register long *rmvph0, *rmvmh0, kph0, kmh0;
 register float *rbvmh0, *rcvmh0, *rv2, *rul, *rvl;
 rmvph0 = mvph0; rmvmh0 = mvmh0;
 rbvmh0 = bvmh0; rcvmh0 = cvmh0;
 rv2 = v2; rul = ul; rvl = vl;
for ( k = kvmh0; k; k-- )
{
        kph0 = rmvph0[k]; kmh0 = rmvmh0[k];
        rv2[kph0] = rv2[kph0] + rcvmh0[kmh0] * rul[kmh0]
                             + rbvmh0[kmh0] * rvl[kmh0];
}}
{register long *rmvmhm, *rmvphp, kmhm, kphp;
 register float *ravphp, *rcvphp, *ru2, *rul, *rvl;
 rmvmhm = mvmhm; rmvphp = mvphp;
 ravphp = avphp; rcvphp = cvphp;
 ru2 = u2; rul = ul; rvl = vl;
for ( k = kvmhm; k; k-- )
{
        kmhm = rmvmhm[k]; kphp = rmvphp[k];
        ru2[kphp] = ru2[kphp] + ravphp[kphp] * rul[kmhm]
                             + rcvphp[kphp] * rvl[kmhm];
}}
{register long *rmvmhm, *rmvphp, kmhm, kphp;
 register float *rbvphp, *rcvphp, *rv2, *rul, *rvl;
 rmvmhm = mvmhm; rmvphp = mvphp;
```

```
    rbvphp = bvphp; rcvphp = cvphp;
    rv2 = v2; ru1 = u1; rv1 = v1;
for ( k = kvmhm; k; k-- )
{
        kmhm = rmvmhm[k]; kphp = rmvphp[k];
        rv2[kphp] = rv2[kphp] + rcvphp[kphp] * ru1[kmhm]
                              + rbvphp[kphp] * rv1[kmhm];
}}
{register long *rmv0hm, *rmv0hp, k0hm, k0hp;
 register float *rav0hp, *rcv0hp, *ru2, *ru1, *rv1;
 rmv0hm = mv0hm; rmv0hp = mv0hp;
 rav0hp = av0hp; rcv0hp = cv0hp;
 ru2 = u2; ru1 = u1; rv1 = v1;
for ( k = kv0hm; k; k-- )
{
        k0hm = rmv0hm[k]; k0hp = rmv0hp[k];
        ru2[k0hp] = ru2[k0hp] + rav0hp[k0hp] * ru1[k0hm]
                              + rcv0hp[k0hp] * rv1[k0hm];
}}
{register long *rmv0hm, *rmv0hp, k0hm, k0hp;
 register float *rbv0hp, *rcv0hp, *rv2, *ru1, *rv1;
 rmv0hm = mv0hm; rmv0hp = mv0hp;
 rbv0hp = bv0hp; rcv0hp = cv0hp;
 rv2 = v2; ru1 = u1; rv1 = v1;
for ( k = kv0hm; k; k-- )
{
        k0hm = rmv0hm[k]; k0hp = rmv0hp[k];
        rv2[k0hp] = rv2[k0hp] + rcv0hp[k0hp] * ru1[k0hm]
                              + rbv0hp[k0hp] * rv1[k0hm];
}}
{register long *rmvphm, *rmvmhp, kphm, kmhp;
 register float *ravmhp, *rcvmhp, *ru2, *ru1, *rv1;
 rmvphm = mvphm; rmvmhp = mvmhp;
 ravmhp = avmhp; rcvmhp = cvmhp;
 ru2 = u2; ru1 = u1; rv1 = v1;
for ( k = kvphm; k; k-- )
{
        kphm = rmvphm[k]; kmhp = rmvmhp[k];
        ru2[kmhp] = ru2[kmhp] + ravmhp[kmhp] * ru1[kphm]
                              + rcvmhp[kmhp] * rv1[kphm];
}}
{register long *rmvphm, *rmvmhp, kphm, kmhp;
 register float *rbvmhp, *rcvmhp, *rv2, *ru1, *rv1;
 rmvphm = mvphm; rmvmhp = mvmhp;
 rbvmhp = bvmhp; rcvmhp = cvmhp;
 rv2 = v2; ru1 = u1; rv1 = v1;
for ( k = kvphm; k; k-- )
{
        kphm = rmvphm[k]; kmhp = rmvmhp[k];
        rv2[kmhp] = rv2[kmhp] + rcvmhp[kmhp] * ru1[kphm]
                              + rbvmhp[kmhp] * rv1[kphm];
}}
{register long *rmvph0, *rmvmh0, kph0, kmh0;
 register float *ravmh0, *rcvmh0, *ru2, *ru1, *rv1;
 rmvph0 = mvph0; rmvmh0 = mvmh0;
 ravmh0 = avmh0; rcvmh0 = cvmh0;
 ru2 = u2; ru1 = u1; rv1 = v1;
for ( k = kvph0; k; k-- )
{
        kph0 = rmvph0[k]; kmh0 = rmvmh0[k];
        ru2[kmh0] = ru2[kmh0] + ravmh0[kmh0] * ru1[kph0]
                              + rcvmh0[kmh0] * rv1[kph0];
}}
{register long *rmvph0, *rmvmh0, kph0, kmh0;
 register float *rbvmh0, *rcvmh0, *rv2, *ru1, *rv1;
 rmvph0 = mvph0; rmvmh0 = mvmh0;
 rbvmh0 = bvmh0; rcvmh0 = cvmh0;
 rv2 = v2; ru1 = u1; rv1 = v1;
for ( k = kvph0; k; k-- )
{
        kph0 = rmvph0[k]; kmh0 = rmvmh0[k];
        rv2[kmh0] = rv2[kmh0] + rcvmh0[kmh0] * ru1[kph0]
                              + rbvmh0[kmh0] * rv1[kph0];
}}
```

I claim:

1. A method for modifying a time-varying image sequence comprising the steps of:
   a. estimating a velocity vector field from a time-varying image sequence, said step of estimating including:
      i. forming a matrix of image irradiance function values for each image of a time-varying image sequence;
      ii. forming a multilevel resolution pyramid for each image of a time-varying image sequence by correlating on each level the matrix of image irradiance function values with a matrix of weights obtained by sampling a measurement function corresponding to that level and then by sampling on each level the function that resulted from the correlation at specific image locations;
      iii. defining these specific images locations of each coarser level of the resolution pyramid by subsampling the specific image locations of the preceding finer level;
      iv. selecting an initial estimate of the velocity vector field for the coarsest level of said multilevel pyramid and determining an improved estimate of the velocity vector field based on the initial estimate of the velocity vector;
      v. projecting the improved estimate of the velocity vector field from the coarsest level of said multilevel pyramid to the next finer level of said multilevel resolution pyramid to obtain the initial estimate for that level and determining the improved estimate of the velocity vector of this level based on the initial estimate of the velocity vector;
      vi. continuing the projection and determining step for each of the remaining levels of the multilevel resolution pyramid; and
      vii. utilizing the improved estimate of the velocity vector field from the finest level of said multilevel resolution pyramid as the determined estimate of the velocity vector field; and;
   b. applying the determined estimate to modify at least one image in the time-varying sequence.

2. The method for estimating a velocity vector field from a time-varying image sequence according to claim 1 wherein the number of levels of said multilevel resolution pyramid are selected as a function of the degree of accuracy and the range with which the initial estimate of the velocity vector field can deviate from the unknown velocity vector field.

3. The method for estimating a velocity vector field from a time-varying image sequence according to claim 1 wherein at each level of said multilevel resolution pyramid, image functions and their first-order partial derivatives are computed from given successive digital images of the time-varying image sequence and the improved estimate of the velocity vector field is obtained by an iterative process applied to the initial estimate of the velocity vector field.

4. The method for estimating a velocity vector field from a time-varying image sequence according to claim 3 wherein each successive improvement of the initial estimate of the velocity vector field is obtained by adding an increment of the velocity vector field to the preceding improvement of the initial estimate of the velocity vector field with such increment being equal to a scaled factor of a solution of a system of linear equations.

5. The method for estimating a velocity vector field from a time-varying image sequence according to claim 1 wherein the measurement function of step ii is an infinitely differentiable function that is equal to zero at all points that are outside of a closed bounded subset of an image irradiance function.

6. The method for estimating a velocity vector field from a time-varying image sequence according to claim 4 and further comprising the step of:
   using a basic iterative method to obtain the solution of the system of the linear equations.

7. The method for estimating a velocity vector field from a time-varying image sequence according to claim 4 and further comprising the step of:
   using a conjugate gradient polynomial acceleration iterative method to obtain the solution of the system of linear equations.

8. The method for estimating a velocity vector field from a time-varying image sequence according to claim 4 and further comprising the step of:
   using a Chebyshev polynomial acceleration iterative method to obtain the solution of the system of linear equations.

9. The method for estimating a velocity vector field from a time-varying image sequence according to claim 8 comprising the step of:
   preconditioning the linear function arising from the system of linear equations.

10. The method for converting a time-varying image sequence from a first frame rate to a second frame rate comprising:
    a. digitizing a time-varying image sequence taken at a first frame rate;
    b. estimating a velocity vector field from the time-varying image sequence, said step of estimating including the steps of:
       i. forming a matrix of image irradiance function values for each image of the time-varying image sequence;
       ii. forming a multilevel resolution pyramid for each image of a time-varying image sequence by correlating on each level the matrix of image irradiance function values with a matrix of weights obtained by sampling a measurement function corresponding to that level and then by sampling on each level the function that resulted from the correlation at specific image locations;
       iii. defining these specific image locations of each coarser level of the resolution pyramid by subsampling the specific image locations of the preceding finer level;
       iv. selecting an initial estimate of the velocity vector field for the coarsest level of said multilevel pyramid and determining an improved estimate of the velocity vector field based on the initial estimate of the velocity vector;
       v. projecting the improving estimate of the velocity vector field from the coarsest level of said multilevel pyramid to the next finer level of said multilevel resolution pyramid to obtain the initial estimate for that level and determining the improved estimate of the velocity vector of this level based on the initial estimate of the velocity vector;
       vi. continuing the projection and determining step for each of the remaining levels of the multilevel resolution pyramid; and vii. utilizing the improved estimate of the velocity vector field from the finest level of said multilevel resolution pyramid as the determined estimate of the velocity vector field;
c. predicting from two successive frames of the time-varying image sequence at least one intermediate frame from the determined estimate of the velocity vector field for the two successive frames; and
d. modifying the time-varying image sequence to include the intermediate frame.

11. A method for converting a time-varying image sequence from a first frame rate to a second frame rate comprising:
  a. digitizing a time-varying image sequence taken at a first frame rate;
  b. estimating a velocity vector field from the time-varying image sequence, said step of estimating including the steps of:
    i. forming a matrix of image irradiance function values for each image of the time-varying image sequence;
    ii. forming a multilevel resolution pyramid for each image of a time-varying image sequence by correlating on each level the matrix of image irradiance function values with a matrix of weights obtained by sampling a measurement function corresponding to that level and then by sampling on each level the function that resulted from the correlation at specific image locations;
    iii. defining these specific image locations of each coarser level of the resolution pyramid by subsampling the specific image locations of the preceding finer level;
    iv. selecting an initial estimate of the velocity vector field for the coarsest level of said multilevel pyramid and determining an improved estimate of the velocity vector field based on the initial estimate of the velocity vector;
    v. projecting the improved estimate of the velocity vector field from the coarsest level of said multilevel pyramid to the next finer level of said multilevel resolution pyramid to obtain the initial estimate for that level and determining the improved estimate of the velocity vector of this level based on the initial estimate of the velocity vector;
    vi. continuing the projection and determining step for each of the remaining levels of the multilevel resolution pyramid; and
    vii. utilizing the improved estimate of the velocity vector field from the finest level of said multilevel resolution pyramid as the determined estimate of the velocity vector field;
  c. deleting frames of the time-varying image sequence;
  d. modifying the remaining frames of the time-varying image sequence based on the determined estimate of the velocity vector field to account for the deleted frames.

12. A method for enhancing a time-varying image sequence comprising:
  a. digitizing a time-varying image sequence;
  b. estimating a velocity vector field from the time-varying image sequence, said step of estimating including the steps of:
    i. forming a matrix of image irradiance function values for each image of the time-varying image sequence;
    ii. forming a multilevel resolution pyramid for each image of a time-varying image sequence by correlating on each level the matrix of image irradiance function values with a matrix of weights obtained by sampling a measurement function corresponding to that level and then by sampling on each level the function that resulted from the correlation at specific image locations;
    iii. defining these specific image locations of each coarser level of the resolution pyramid by subsampling the specific image locations of the preceding finer level;
    iv. selecting an initial estimate of the velocity vector field for the coarsest level of said multilevel pyramid and determining an improved estimate of the velocity vector field based on the initial estimate of the velocity vector;
    v. projecting the improved estimate of the velocity vector field from the coarsest level of said multilevel pyramid to the next finer level of said multilevel resolution pyramid to obtain the initial estimate for that level and determining the improved estimate of the velocity vector of this level based on the initial estimate of the velocity vector;
    vi. continuing the projection and determining step for each of the remaining levels of the multilevel resolution pyramid; and
    vii. utilizing the improved estimate of the velocity vector field from the finest level of said multilevel resolution pyramid as the determined estimate of the velocity vector field;
  c. averaging the determined estimate of the velocity vector field for three successive images in the time-varying image sequence and enhancing an intermediate image of the three successive images; and
  d. repeating step c for each of the images in the time-varying image sequence and regenerating the time-varying image sequence with the enhanced images.

13. A method for motion compensated restoration of a time-varying image sequence comprising:
  a. digitizing a time-varying image sequence;
  b. estimating a velocity vector field from the time-varying image sequence, said step of estimating including the steps of:
    i. forming a matrix of image irradiance function values for each image of the time-varying image sequence;
    ii. forming a multilevel resolution pyramid for each image of a time-varying image sequence by correlating on each level the matrix of image irradiance function values with a matrix of weights obtained by sampling a measurement function corresponding to that level and then by sampling on each level the function that resulted from the correlation at specific image locations;
    iii. defining these specific image locations of each coarser level of the resolution pyramid by subsampling the specific image locations of the preceding finer level;
    iv. selecting an initial estimate of the velocity vector field for the coarses level of said multilevel pyramid and determining an improved estimate of the velocity vector field based on the initial estimate of the velocity vector;
    v. projecting the improved estimate of the velocity vector field from the coarsest level of said multilevel pyramid to the next finer level of said multilevel resolution pyramid to obtain the initial estimate for that level and determining the improved estimate of the velocity vector of this level based on the initial estimate of the velocity vector;

vi. continuing the projection and determining step for each of the remaining levels of the multilevel resolution pyramid; and vii. utilizing the improved estimate of the velocity vector field from the finest level of said multilevel resolution pyramid as the determined estimate of the velocity vector field;

c. determining from the determined estimate of the velocity vector field and a frame rate of the time-varying image sequence an amount of motion blur for an image in the time-varying image sequence; and d. restoring said image using the determined amount of motion blur for said image.

14. A method for estimating velocity vector field from a time-varying image sequence, comprising for each velocity vector field the steps of:

a. forming a multi-level image resolution pyramid of image values utilizing the image irradiance values of at least a pair of images of a time-varying image sequence;

b. selecting an initial estimate of the velocity vector field for the first level of the image resolution pyramid;

c. forming a system of nonlinear equations utilizing the image values of the first level of the multi-level image resolution pyramid and the initial estimate of the velocity vector field for the first level of the multi-level image resolution pyramid;

d. taking the initial estimate as the current estimate of the velocity vector field for the first level of the multi-level image resolution pyramid;

e. forming a system of linear equations by linearizing the system of nonlinear equations about said current estimate;

f. determining an improved estimate of the velocity vector field for the first level of the multi-level image resolution pyramid by solving the system of linear equations of step e;

g. taking the improve estimate as the current estimate repeat steps e through g until the desired degree of improvement in the estimate of the velocity vector field for the first level of the multi-level image resolution pyramid is achieved;

h. projecting the resultant estimate of step g as the initial estimate of the next level of the multilevel image resolution pyramid and repeating steps c through g to obtain the resultant estimate for that level; and i. repeating step h until the final level of the multi-level image resolution pyramid is reached with the resultant estimate being the desired estimate of the velocity vector field.

* * * * *